United States Patent
Brown et al.

(10) Patent No.: US 11,972,431 B2
(45) Date of Patent: Apr. 30, 2024

(54) SYSTEMS AND METHODS FOR VIRTUAL CERTIFICATION NUMBER REGISTRATION

(71) Applicant: Capital One Services, LLC, McLean, VA (US)

(72) Inventors: Kelly Jo Brown, Rockville, MD (US); Jesse Emery, Arlington, VA (US); Jonathan Blocksom, Reston, VA (US); Swapna Mandala, Glen Allen, VA (US); Todd Safford, Bethesda, MD (US); Victoria Yang, Fairfax, VA (US); Brian Glowniak, McLean, VA (US); Edward Husa, McLean, VA (US); Calvin Sun, McLean, VA (US); Audrey Zhang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/058,456

(22) Filed: Nov. 23, 2022

(65) Prior Publication Data
US 2024/0078553 A1 Mar. 7, 2024

Related U.S. Application Data

(60) Provisional application No. 63/374,693, filed on Sep. 6, 2022.

(51) Int. Cl.
*G06Q 20/40* (2012.01)
*G06F 21/33* (2013.01)
(Continued)

(52) U.S. Cl.
CPC ......... *G06Q 20/4016* (2013.01); *G06F 21/33* (2013.01); *G06F 21/6218* (2013.01);
(Continued)

(58) Field of Classification Search
CPC ..... H04L 2209/56; G06F 21/31; G06Q 20/10; G06Q 30/06
See application file for complete search history.

(56) References Cited

U.S. PATENT DOCUMENTS 10,296,901 B1   5/2019   Zarakas et al.
10,496,984 B1   12/2019  Zarakas et al.
(Continued)

FOREIGN PATENT DOCUMENTS

WO   2015013522 A1   1/2015

OTHER PUBLICATIONS

G. K. Arun et al., "Convolutional Long Short Term Memory Model for Credit Card Detection" dated Dec. 28, 2020, IEEE, https://ieeexplore.ieee.org/stamp/stamp.jsp?tp=&arnumber=9297606 (Year: 2020).
(Continued)

*Primary Examiner* — Mohammad A. Nilforoush
*Assistant Examiner* — Sima Asgari
(74) *Attorney, Agent, or Firm* — Bookoff McAndrews, PLLC

(57) ABSTRACT

Systems and methods include registering use of a virtual certification number (VCN) at a secure entity by receiving, at an external gateway, a registration request comprising an external request code and a primary account number (PAN), wherein the external request code is unique to the secure entity, determining that the external request code is an unregistered external request code, receiving a tokenized PAN based on the PAN, receiving an account identifier by applying the tokenized PAN to a certification mechanism tool application programing interface (API), generating a certification mechanism reference identifier by encrypting a certification mechanism associated with the account identifier and the tokenized PAN, updating a database to associate
(Continued)

the certification mechanism reference identifier with the external request code, and transmitting, via the external gateway, a registration authentication to an external entity, the registration authentication comprising the external request code.

14 Claims, 23 Drawing Sheets

(51) Int. Cl.
    *G06F 21/62*         (2013.01)
    *G06Q 30/018*      (2023.01)
    *H04L 9/32*          (2006.01)

(52) U.S. Cl.
    CPC ......... *G06Q 30/018* (2013.01); *H04L 9/3213* (2013.01); *H04L 9/3263* (2013.01)

(56) References Cited

U.S. PATENT DOCUMENTS

| | | | |
|---|---|---|---|
| 11,134,075 B2* | 9/2021 | Ebrahimi | H04L 9/3271 |
| 2002/0049676 A1* | 4/2002 | Maeda | G06Q 20/1235 |
| | | | 705/50 |
| 2002/0161707 A1* | 10/2002 | Cole | G06Q 30/06 |
| | | | 705/42 |
| 2011/0040686 A1* | 2/2011 | Carlson | G06Q 20/4012 |
| | | | 705/44 |
| 2012/0303813 A1* | 11/2012 | Bell | H04L 67/1097 |
| | | | 709/226 |
| 2014/0129435 A1 | 5/2014 | Pardo et al. | |
| 2015/0156111 A1* | 6/2015 | Tsiatsis | H04L 49/10 |
| | | | 370/392 |
| 2016/0028550 A1* | 1/2016 | Gaddam | H04L 63/0823 |
| | | | 713/173 |
| 2017/0076007 A1* | 3/2017 | Knoll | G06Q 30/0255 |
| 2017/0201498 A1 | 7/2017 | Baig et al. | |
| 2017/0213215 A1 | 7/2017 | Lee et al. | |
| 2018/0285864 A1 | 10/2018 | Dill et al. | |
| 2019/0266605 A1 | 8/2019 | Plomske et al. | |
| 2019/0295054 A1 | 9/2019 | Purves et al. | |
| 2019/0385175 A1 | 12/2019 | Chamberlain et al. | |
| 2020/0151726 A1 | 5/2020 | Song et al. | |
| 2020/0273022 A1 | 8/2020 | McFarren et al. | |
| 2020/0327538 A1 | 10/2020 | Shrivastava | |
| 2020/0364712 A1 | 11/2020 | Jamison et al. | |
| 2021/0105277 A1 | 4/2021 | Epstein et al. | |
| 2021/0133710 A1 | 5/2021 | Kohli et al. | |
| 2021/0133741 A1 | 5/2021 | Spiegel et al. | |
| 2021/0174352 A1 | 6/2021 | Kenney et al. | |
| 2021/0174355 A1 | 6/2021 | Gupta et al. | |
| 2021/0185008 A1 | 6/2021 | Nagaraja et al. | |
| 2021/0226867 A1* | 7/2021 | Ovadia | H04L 43/065 |
| 2021/0243198 A1 | 8/2021 | Naumann Zu Koenigsbrueck et al. | |
| 2022/0114190 A1 | 4/2022 | Pattar | |
| 2022/0138182 A1 | 5/2022 | Yang | |
| 2022/0245652 A1 | 8/2022 | Nonni et al. | |
| 2022/0247579 A1* | 8/2022 | Bester | H04W 12/06 |
| 2022/0327504 A1 | 10/2022 | Koren et al. | |

OTHER PUBLICATIONS

M. Siek et al., "Developing Automated Optical Character Recognition System Using Machine Learning Algorithm to Solve Payment Verification Issues," dated Dec. 28, 2021, IEEE, https://ieeexplore.ieee.org/stamp/stamp.jsp?tp=&arnumber=9649514 (Year: 2021).

R. Bygari et al., "An AI-powered Smart Routing Solution for Payment Systems," dated Jan. 13, 2022, IEEE, https://ieeexplore.ieee.org/stamp/stamp.jsp?tp=&arnumber=9671961 (Year: 2022).

* cited by examiner

SYSTEMS AND METHODS FOR VIRTUAL CERTIFICATION NUMBER REGISTRATION

CROSS-REFERENCE TO RELATED APPLICATIONS

This application claims the benefit of U.S. Provisional Patent Application 63/374,693, filed Sep. 6, 2022, the entire contents of which are incorporated herein by reference.

TECHNICAL FIELD

Various embodiments of the present disclosure relate generally to use of a virtual certification number (VCN), and more particularly, to systems and methods for associating one or more VCNs with a user account and/or a primary account number (PAN), generating one or more VCNs, authorizing transaction sources based on VCNs, and facilitating third party transaction data use.

BACKGROUND

Users often use one or more certification sources (e.g., payment mechanisms) such as credit cards, debit cards, or the like, to make purchases such as online purchases via merchant websites and applications. There has been an increase in fraud, spam, and/or theft related to payment mechanisms. Such fraud, spam, and/or theft is often related to a fraudulent party obtaining access to payment mechanisms (e.g., credit card numbers). Such access is often obtained as a result of a user using a payment mechanism where the fraudulent party can capture and/or use information associated with the payment mechanism.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for virtual certification number (VCN) registration, generation, use, and authorization transmission.

According to an aspect, a method for registering use of a virtual certification number (VCN) at a secure entity is disclosed. The method includes receiving, at an external gateway, a registration request comprising an external request code and a primary account number (PAN), wherein the external request code is unique to the secure entity; determining that the external request code is an unregistered external request code; receiving a tokenized PAN based on the PAN; receiving an account identifier by applying the tokenized PAN to a certification mechanism tool application programing interface (API); generating a certification mechanism reference identifier by encrypting a certification mechanism associated with the account identifier and the tokenized PAN; updating a database to associate the certification mechanism reference identifier with the external request code; and transmitting, via the external gateway, a registration authentication to an external entity, the registration authentication comprising the external request code.

According to another aspect, a method for registering use of a virtual certification number (VCN) at a secure entity is disclosed and includes receiving a registration request comprising a primary account number (PAN) from a secure account, wherein the registration request is generated after accessing the secure account using secure account credentials; determining that the PAN is an unregistered PAN; receiving an account identifier by applying the PAN to a certification mechanism tool application programming interface (API); generating a certification mechanism reference identifier by encrypting a certification mechanism identifier associated with the account identifier and the PAN; updating a database to associate the certification mechanism reference identifier with the secure account; and transmitting a registration authentication to the secure account.

According to another aspect, a system for registering use of a virtual certification number (VCN) at a secure entity includes a memory configured to store processor-readable instructions; and a processor operatively connected to the memory, and configured to execute the instructions to perform operations that include: receiving, at an external gateway, a registration request comprising an external request code and a primary account number (PAN), wherein the external request code is unique to the secure entity; determining that the external request code is an unregistered external request code; receiving a tokenized PAN based on the PAN; receiving an account identifier by applying the tokenized PAN to a certification mechanism tool application programing interface (API); generating a certification mechanism reference identifier by encrypting a certification mechanism identifier associated with the account identifier and the tokenized PAN; updating a database to associate the certification mechanism reference identifier with the external request code; and transmitting, via the external gateway, a registration authentication to an external entity, the registration authentication comprising the external request code.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
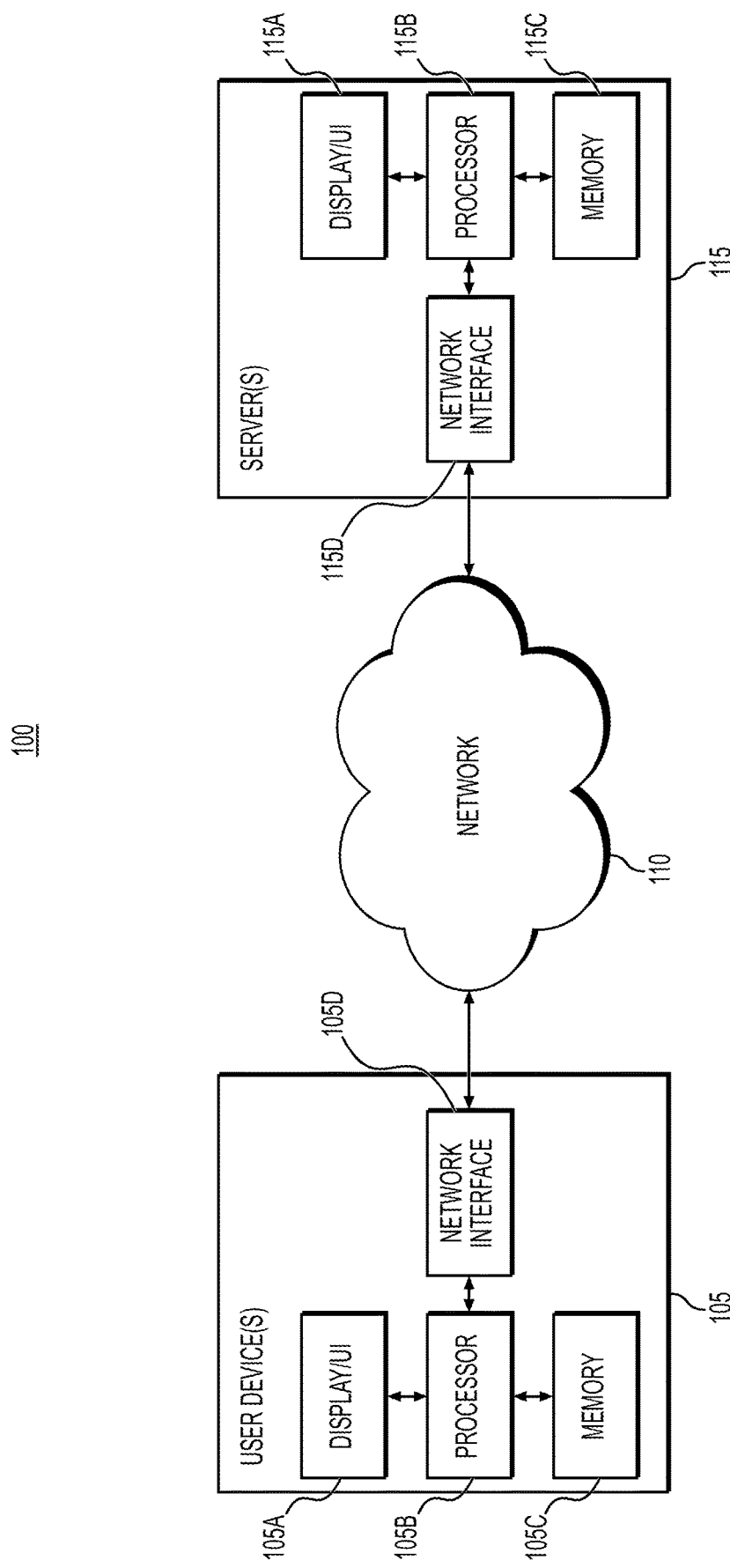
FIG. 1 depicts an exemplary setting for virtual card number (VCN) registration and use, according to one or more embodiments.

According to certain aspects of the disclosure, methods and systems are disclosed for enrolling a user account for virtual certification number (VCN) use, management of VCNs, mapping primary account number(s) (PANs) to VCNs, facilitating checkout procedures with VCNs, associating sources with VCNs, and transaction data sharing.

The techniques disclosed herein provide technical benefits including automated secure access to one or more certification mechanisms (e.g., payment mechanisms such as credit cards, debit cards, charge cards, credit accounts, debit accounts, etc.) without transmitting certification mechanism credentials (e.g., PANs), automated security verification, risk-based registration, and secure checkouts. Technical effects of the techniques disclosed herein include securely generating VCNs that pair PANs with specific sources, modifying one or more databases based on VCN generation, automatically authenticating VCNs based on source mapping and risk factors, and denying unauthorized use of VCNs. As disclosed herein, VCNs may be generated by tokenizing and/or encrypting a PAN, retrieving account identifiers based on the tokenized and/or encrypted PAN, generating reference identifiers, and conducting a risk analysis. A user may trigger VCN generation at a source (e.g., a merchant, a brand, an organization, a marketplace, etc.) portal, where such use triggers a source verification process, PAN retrieval process, and transaction authentication based on the generated VCN. Accordingly, a technical effect of generating and/or using a VCN includes securely using a PAN without the PAN being provided by the user and/or being received by a source. This technical effect has an effect on a transaction process of securely authorizing transactions without risk of PAN distribution to fraudulent parties.

The technical effects provided by the techniques disclosed herein include evoking and updating database structures to generate and/or use VCNs. Such database structures are traditionally configured to store and/or access PANs, resulting in a security risk. However, techniques provided herein can be used to implement VCN-based authentication by evoking and/or updating database structures to authorize transactions without PANs, on a per source basis. For example, authorizing a source for VCN use provides security effects by using a VCN and further adds security controls based on source authentication. Accordingly, both the access to such database structures and the information stored and/or accessed using such database structures require the database structures to operate in a new way.

As disclosed herein, secure access to one or more payment mechanisms may be provided by registering a user account and a PAN associated with the user account for VCN use for a specific source. The registration and/or use of VCNs may be implemented via one or more of an external gateway, a registration serverless function (e.g., a registration lambda function), an authorization serverless function (e.g., an authorization lambda function), a dynamic database, a token service, a VCN service provider, and/or a risk module.

VCNs, as used herein, provide a secure way to transact with sources using source portals (e.g., source websites, source applications, source extensions, etc.). Such secure transactions are facilitated by using VCNs without disclosure, transmission, and/or use of PANs that can be otherwise used by a fraudulent entity. A VCN may be linked to a PAN and/or a user account as well as a given source, such that a given VCN may be authenticated for use for a given source, mitigating the risk of a fraudulent entity using a user's PAN at any other source. Accordingly, techniques disclosed herein add one or more layers of protection when using certification mechanisms.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

Terms like "source," "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser" or "extension" may be used interchangeably with other terms like "program," "electronic application," or the like, and generally encompasses software that is configured to interact with, modify, override, supplement, or operate in conjunction with other software.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistic regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve certain types of machine learning, it should be understood that techniques according to this disclosure may be adapted to any suitable type of machine learning. It should also be understood that the examples above are illustrative only. The techniques and technologies of this disclosure may be adapted to any suitable activity.

A secure account may be any account that is associated with a secure entity, as further described herein, and one or more users and includes information about the one or more users. For example, a secure account may be an account associated with a certification mechanism (e.g., payment mechanisms such as credit cards, debit cards, charge cards, credit accounts, debit accounts, etc.). A secure account may be accessed using credentials such as, for example, login credentials, biometric credentials, or the like. As further disclosed herein, features associated with a secure account may be accessed using an external account.

An external entity may be or may include a user-facing entity such that a user may interact with an external entity interface. An external entity interface may be a web browser, an extension (e.g., a browser extension), a website, an operating system, an application, or the like. A user may access one or more sources (e.g., merchants, brands, organizations, marketplaces, etc.) using an external entity interface. The external entity may communicate with a secure entity via an external gateway. The secure entity may be an entity that hosts, controls, and/or has access to a secure account.

A user may register use of a VCN at a secure entity, by requesting the registration of the use via the secure entity or via the external entity. For example, a user may register use of a VCN using a secure entity portal after accessing a secure account via the secure entity portal. The user may access the secure account using credentials such as, for example, login credentials, biometric credentials, or the like.

A user may register use of a VCN using an external entity portal configured to receive VCN registration requests. Alternatively, the user may register use of a VCN via a source portal (e.g., a source website, a source application, a source application programming interface (API), etc.) accessed using an external entity platform (e.g., an external entity browser, an external entity application, an external entity operating system, an external entity API, etc.). For example, the user may direct to a source website using an external entity browser. As another example, a user may direct to a source application using an external entity operating system.

According to implementations of the disclosed subject matter, a user may trigger a registration request for registering use of a VCN associated with a PAN associated with the user. The user may provide the PAN via an external entity portal or via a source portal accessed using an external entity platform. The external entity may generate the registration request including an external request code and the PAN. The external request code may be unique to a secure entity that receives the registration request and is the secure entity that issued, generated, or approved the PAN for the user. The external request code may further be unique to the user (e.g., an external entity user account). For example, a user may use an external entity website or a brand website accessed using an external entity browser to trigger the registration request. The user requesting the registration request may request the registration request after accessing a user external entity account. Accordingly, the external entity may associate the external request code with both the secure entity and the user external entity account. The registration request may be transmitted to the secure entity via an external gateway connecting the external entity and the secure entity. The external request code may be unique to the secure entity connected to the external entity via the external gateway such that a different external request code may be generated for a registration request associated with a different secure entity (e.g., a different secure entity associated with a different PAN).

The secure entity may determine that the external request code is an unregistered external request code. For example, the secure entity may determine that the PAN associated with the registration request is not previously registered for VCN use. An encrypted or tokenized PAN may be generated based on the registration request and the determination that the external request code is an unregistered request code. Encrypting or tokenizing the PAN may prevent further distribution of the PAN (e.g., at the secure entity). An account identifier for the user and the PAN may be received based on applying the encrypted or tokenized PAN to a certification mechanism tool API. A certification mechanism reference identifier may be generated based on encrypting a portion or transformation of the account identifier and a portion of the PAN (e.g., the PAN or the encrypted/tokenized PAN). A database may be updated to associate the certification mechanism reference identifier with the external request code. As further disclosed below, a VCN may be generated by the secure entity, and may be associated with a certification mechanism reference identifier and a source. Accordingly, the secure entity may generate a secure association between the PAN, VCN, source, and the external request code, by using the certification mechanism reference identifier. The secure association may be stored in the same secure entity database that stores an association between the certification mechanism reference identifier with the external request code or may be a different secure entity database.

The secure entity may transmit, using the external gateway, a registration authentication to the external entity along with the external request code. The secure entity may trigger a flag indicating that the user (e.g., an external entity user account) is registered for VCN use based on the registration authentication and the external request code.

According to implementations of the disclosed subject matter, a user (e.g., a user associated with an external entity user account) registered for VCN use may trigger VCN generation for use with a source. The user may trigger the VCN generation from a source portal accessed using an external platform while the user has accessed the user's external entity user account. The external entity may generate the VCN generation request including the user's unencrypted/non-tokenized PAN, the user's external request code, external risk signals, and source data for the source. The source data for the source may include identification information of the source, source category, source history, source identifiers, etc. The secure entity may receive a VCN generation request from the external entity and may verify the registration authentication of the user (e.g., a user associated with an external entity user account) associated with the external request code. The secure entity may verify the registration authentication by comparing the external request code and PAN (e.g., the unencrypted or encrypted/tokenized PAN) to a database entry. The secure entity may identify the certification mechanism reference identifier associated with the external request code.

The secure entity may conduct a risk analysis based at least in part on mapping all or a portion of the external risk signals provided by the external entity to secure entity risk criteria. A risk authentication may be generated if the output of the risk analysis meets thresholds associated with each or a relevant subset of the secure entity risk criteria.

A source identifier may be determined based on the one or more source data. The source identifier may be determined based on a previous source registration or may be determined by generating a new source identifier, as further disclosed herein. The secure entity may generate a VCN based on the certification mechanism reference identifier and the source identifier. An association between the VCN and the source identifier may be stored in a database, designating the source identifier as a VCN source identifier. The VCN may be transmitted to the external entity with the external request code. The external entity may associate the VCN with the external request code and the source.

According to implementations of the disclosed subject matter, a source for VCN use may be authenticated by the secure entity. The authentication may be based on receiving a VCN use request from the external entity. The VCN use request may include the VCN and transaction data associated with the VCN use request. For example, a user may access a source portal using an external entity platform. The user (e.g., a user associated with an external entity user account) may have accessed (e.g., logged into) an external entity user account and may access the source portal using the external entity platform, after having accessed the external entity user account. The user may initiate a transaction at the source portal (e.g., a purchase of a good, a purchase of a service, a subscription, etc.). Transaction data may be generated based on the initiation of the transaction at the source portal. The transaction data may be generated by the external entity, a transaction processor (e.g., a certification mechanism network, a financial institution, etc.), or the like, or a combination thereof. The transaction data may include transaction identifiers, encrypted data, or the like and may be or may include a hash value.

The secure entity may determine a binding type associated with the VCN. The binding type may be one of a strict binding, a first authorization binding, or an unbound binding. The binding type may be identified based on a component of the VCN, a lookup, or the like. Binding types are further disclosed herein.

If the binding type is a strict binding, then the transaction data may be mapped to a transaction source having a transaction source identifier. One or more components (e.g., text, alphanumeric characters, encrypted data, payloads, headers, etc.) of the transaction data may be identified. The one or more components of the transaction data may be mapped to stored or retrieved information that results in the mapping. For example, the source may be an electronics brand and the transaction data may include a portion of the electronic brand's name, a common term used in transactions initiated by the electronic brand, or the like. Based on this information, the source may be identified as the electronics brand having a source identifier.

A VCN source identifier associated with the VCN may be determined based on the registration authentication of the VCN (e.g., as determined and stored during generation of the VCN). The VCN source identifier may be compared to the transaction source identifier to determine an overlap, a match, or an association. If the comparison results in a confirmation that the VCN source identifier maps to the transaction source identifier, then an approved authorization may be output. The approved authorization may indicate that the VCN provided in the VCN use request is associated with the source associated with the transaction data (e.g., is the transaction source).

According to implementations of the disclosed subject matter, transaction data collected by the secure entity may be shared with the external entity. A streaming platform such as a distributed event streaming platform may output secure entity authorizations (e.g., in real-time or near real-time). The secure entity authorizations may include VCN related authorizations (e.g., transaction authorizations for transactions made using a VCN), PAN related authorizations (e.g., non-VCN authorizations), and/or the like.

A subset of the secure entity authorizations that are both VCN related authorizations and associated with a given external entity may be identified from the secure entity authorizations, as further discussed herein. Accordingly, the subset of the secure entity authorizations may include transaction authorizations generated based on a VCN and that are related to the given external entity. The subset of the secure entity authorizations may be compared to authorizations that were previously sent to the given external entity, to identify unsent VCN authorizations related to the external entity. The unsent VCN authorizations may be stripped to generate transmittable unsent VCN authorizations such that one or more data fields of the unsent VCN authorizations are removed. The transmittable unsent VCN authorizations may be provided to the given external entity.

The given external entity may, for example, provide the transmittable unsent VCN authorizations to a user via an external entity portal associated with a user account for the VCN associated with a respective transmittable unsent VCN authorization.

FIG. 1 depicts an exemplary setting 100 which may be used with the techniques presented herein. The setting 100 may include one or more user device(s) 105 (hereinafter "user device 105" for ease of reference), a network 110, one or more server(s) 115 (hereinafter "server 115" for ease of reference). While only one of each of user device 105 and server 115 are depicted, the disclosure is not limited to one of each and two or more of each of user device 105 and server 115 may be implemented in accordance with the techniques disclosed herein.

User device 105 may be used to, for example, access a secure account or portal, access an external entity account, portal, or platform, access a source portal, or the like. User device 105 may be used to trigger a registration request for registering use of a VCN, to trigger a VCN generation, to initiate a transaction at a source, to access transaction data (e.g., at a secure portal or an external entity portal), or the like. Server 115 may be a secure entity server (e.g., may host a secure account, a secure entity system, etc.), an external entity server (e.g., may host an external account, an external entity system, etc.), a source server (e.g., a brand server), or the like.

The user device 105 and the server 115 may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S). The memory 115C may also store one or more instances of a machine learning model (e.g. an authentication machine learning model, etc.), instructions to perform operations, or the like. The display/UI 115A may be a touch screen or a display with other input systems (e.g., mouse, keyboard, etc.) for an operator of the server 115 to control the functions of the server 115. The network interface 115D may be a TCP/IP network interface for, e.g., Ethernet or wireless communications with the network 110.

User device 105 may include a display/UI 115A, a processor 105б, a memory 105C, and/or a network interface 105D. User device 105 may be an electronic and/or mobile device, such as a cell phone, a tablet, a laptop, a computer, a wearable device, a terminal, etc. User device 105 may execute, by the processor 105б, an operating system (O/S), a machine learning training component, a portal, a platform, or the like. One or more components shown in FIG. 1 may generate or may cause to be generated one or more graphic user interfaces (GUIs) based on instructions/information stored in memory 105C, instructions/information received from server 115, and/or one or more user devices 105. The GUIs may be portal interfaces, platform interfaces, mobile application interfaces, for example.

In various embodiments, the network 110 may be a wide area network ("WAN"), a local area network ("LAN"), personal area network, or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the one or more components of exemplary setting 100 may one or more of (i) generate, store, train, or use a machine learning model or its applicable components or attributes such as nodes, model states, weights, layers, biases, or the like. The exemplary setting 100 or one of its components may include a machine learning model and/or instructions associated with the machine learning model, e.g., instructions for generating a machine learning model, training the machine learning model, using the machine learning model, etc. The exemplary setting 100 or one of its components may include instructions for retrieving data, adjusting data, e.g., based on the output of the machine learning model, and/or operating a display to output data, e.g., as adjusted based on the machine learning model. The exemplary setting 100 or one of its components may include, provide, and/or generate training data.

In some embodiments, a system or device other than the components shown in exemplary setting 100 may be used to generate and/or train the machine learning model. For example, such a system may include instructions for generating the machine learning model, the training data and ground truth, and/or instructions for training the machine learning model. A resulting trained machine learning model may then be provided to exemplary setting 100 or one of its components. The machine learning model may be stored in any applicable location such as in memory 115C or memory 105C, in a location other than setting 100 in operable communication with setting 100, or the like.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Alternatively or in addition, unsupervised learning and/or semi-supervised learning may be used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data (e.g., secure user data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include image-processing architecture that is configured to identify, isolate, and/or extract features, geometry, and/or structure. For example, the machine learning model may include one or more convolutional neural networks ("CNN") configured to identify features in the data, and may include further architecture, e.g., a connected layer, neural network, etc., configured to determine a relationship between the identified features in order to determine a location in the data.

In some instances, different samples of training data and/or input data may not be independent. Thus, in some embodiments, the machine learning model may be configured to account for and/or determine relationships between multiple samples.

For example, in some embodiments, the machine learning models referenced herein may include a CNN, or Recurrent Neural Network ("RNN"). Generally, RNNs are a class of feed-forward neural networks that may be well adapted to processing a sequence of inputs. In some embodiments, the machine learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of items (e.g., words, letters, time series, images) as input, and generate another sequence items (e.g., where they may convert sequences of one domain to sequences of another domain). For example, a Seq2Seq model may, for example, be configured to receive image data and output location data associated with the received image data (e.g., a location where an image was captured).

Although depicted as separate components in FIG. 1, it should be understood that a component or portion of a component in the exemplary setting 100 may, in some embodiments, be integrated with or incorporated into one or more other components. For example, a portion of the display 115A may be integrated into the user device 105 or the like. In another example, the server 115 may be integrated in a data storage system. In some embodiments, operations or aspects of one or more of the components discussed above may be distributed amongst one or more other components. Any suitable arrangement and/or integration of the various systems and devices of the exemplary setting 100 may be used.

Further aspects of the machine learning model and/or how it may be utilized to authorize an external account, generate certainty scores, etc. are described herein. In the following methods, various acts may be performed or executed by a component from FIG. 1, such as the server 115, the user device 105, or components thereof. However, it should be understood that in various embodiments, various components of the exemplary setting 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2A:
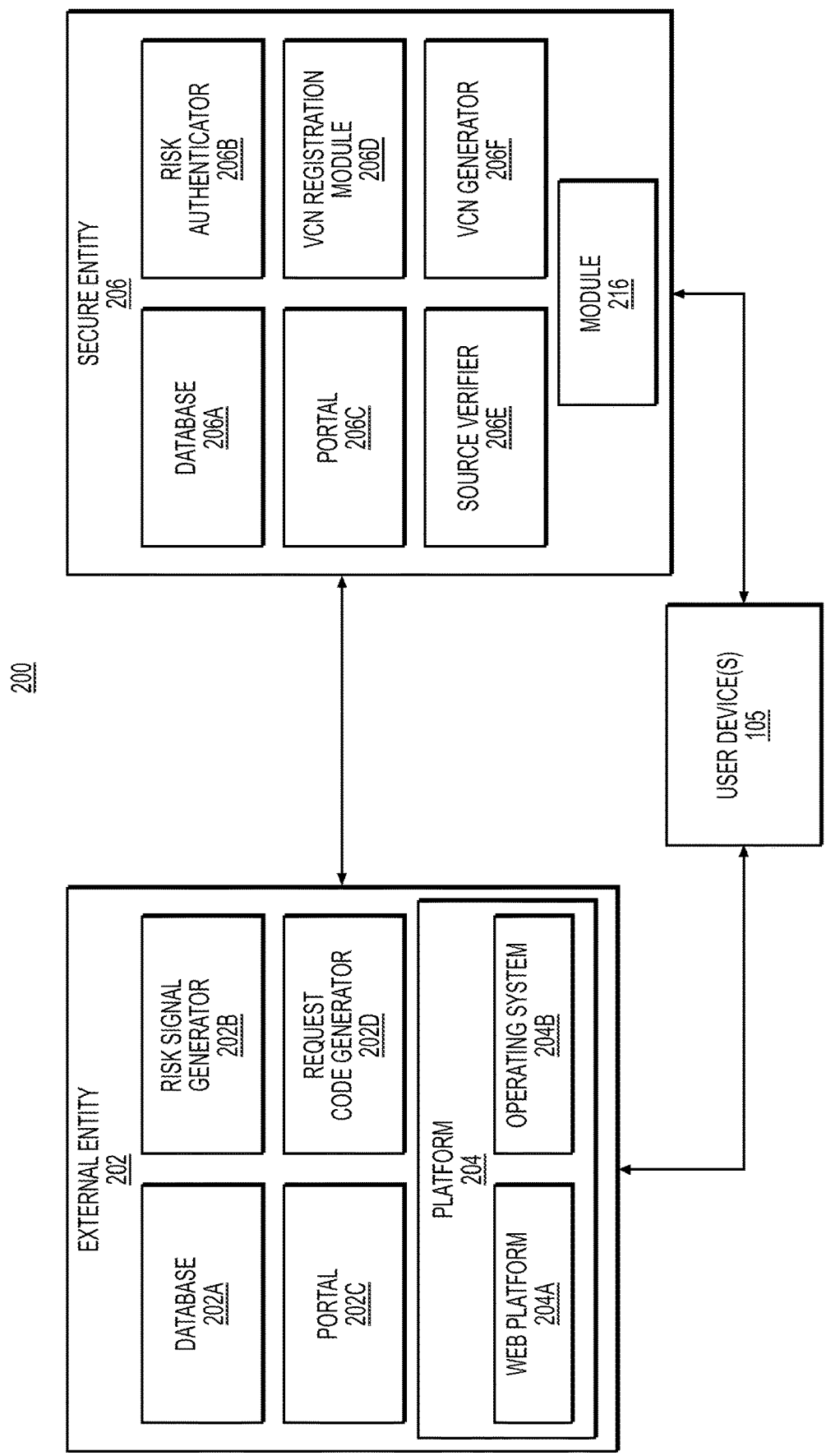
FIG. 2A depicts an environment for VCN registration and use, according to one or more embodiments.

FIG. 2A depicts an exemplary environment 200 which may be used with the systems and techniques presented herein. External entity 202 may include, provide, communicate with, or be associated with an external entity database 202A, risk signal generator 202B, external entity portal 202C, external request code generator 202D, and/or platform 204 which may include web platform 204A and/or operating system 204B. It will be understood that external entity 202 may include more or less components than those shown in exemplary environment 200.

Secure entity 206 may include, provide, communicate with, or be associated with a secure entity database 206A, a risk authenticator 206B, a portal 206C, a VCN registration Module 206D, a source verifier 206E, a VCN generator 206F, and/or modules 216. It will be understood that external entity 202 may include more or less components than those shown in exemplary environment 200.

User device 105, as shown in FIG. 1, may communicate with external entity 202 and/or secure entity 206. External entity 202 may communicate with user device 105 and/or secure entity 206. Secure entity 206 may communicate with user device 105 and/or external entity 202. The communication referenced herein may be implemented in accordance with the communication discussed in reference to FIG. 1 (e.g., via network 110, via wired communication, etc.). One or more components shown in system environment 200 and/or any components associated with external entity 202, secure entity 206, and/or user device 105 may use, may include, or may be implemented using a remote or cloud component such as a cloud server, cloud database, or the like. Components of system setting 100 are further referenced herein.

Figure 2B:
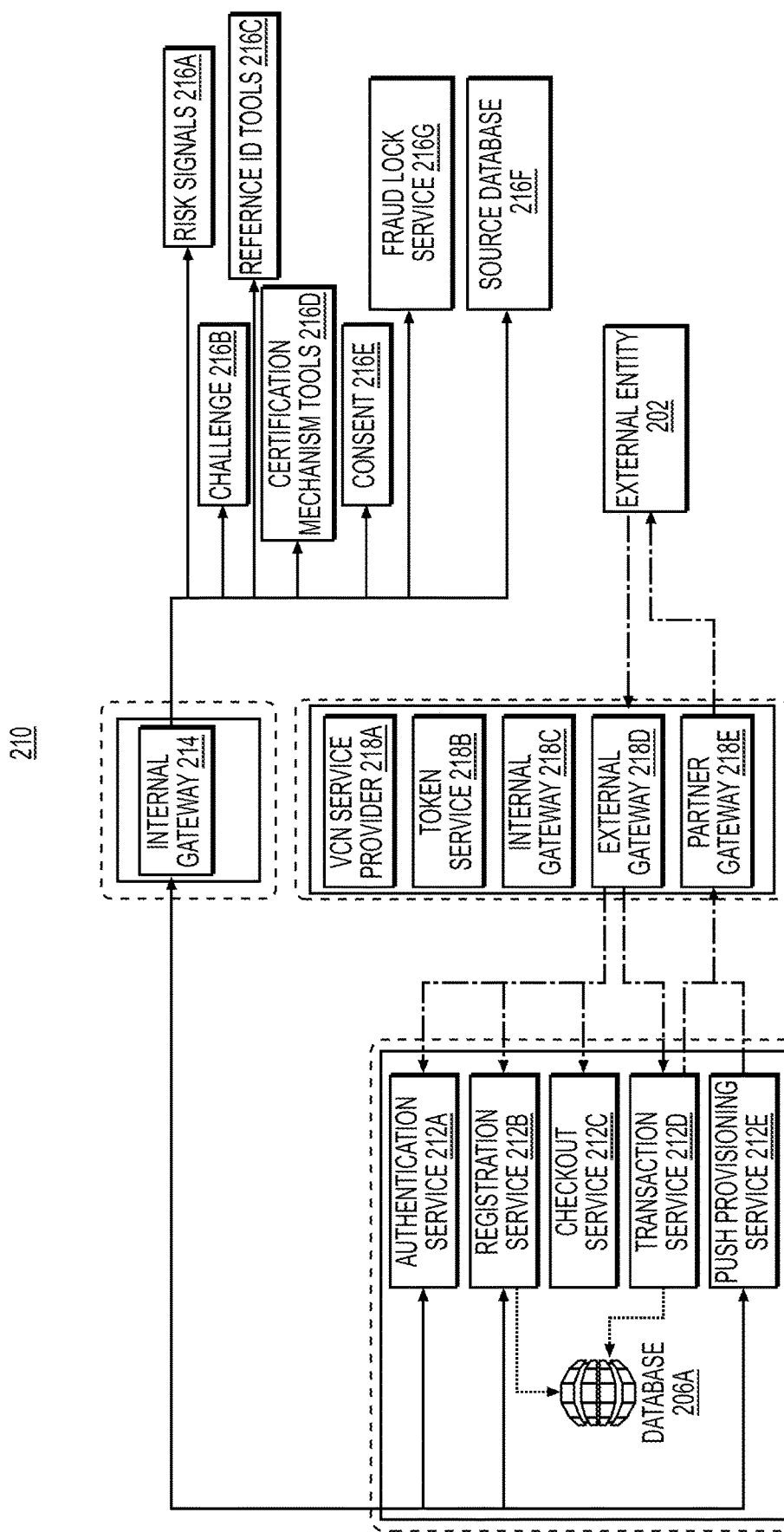
FIG. 2B depicts another environment for VCN registration and use, according to one or more embodiments.

FIG. 2B depicts an exemplary environment 210 which may be used with the systems and techniques presented herein. As shown, a database 206A may be a managed, server-less, relational, and/or key-value NoSQL database designed to run high-performance applications at any scale. Database 206A may be a secure entity database configured to store and provide data associated with secure entity 206 and/or external entity triggers. Database 206A may be configured to provide reliable performance (e.g., at or above a reliability threshold based on success, failure and/or error rates). Database 206A may be configured to manage Structured Query Language (SQL) operations (e.g., JOINs) at any applicable scale with predictable latency. Database 206A may be configured for use with one or more serverless functions disclosed herein auto-scaling, stateless, ephemeral computation in response to event triggers. Database 206A may be accessible via pulls, calls, and/or via applicable APIs.

Database 206A may be configured to receive and/or provide data based on requests or submissions submitted by an authentication service 212A, registration service 212B, checkout service 212C, transaction service 212D, and/or push provisioning service 212E. Database 206A may be in communication with an internal gateway 214 configured to direct communication within the secure entity's systems. Internal gateway 214 may be configured to communicate with secure entity modules 216 such as risk signals module 216A, challenge module 216B, reference ID tools module 216C, certification mechanism tools module 216D, consent module 216E, and/or source database 216F.

Database 206A may communicate with a VCN service provider 218A, a token service 218B, and an internal gateway 218C. VCN service provider 218A may generate and/or manage VCNs. The token service 218B may tokenize a PAN. Tokenizing the PAN may generate a value associated with a PAN such that the value may be used as a reference to the PAN, as discussed herein. Database 206A may further be configured to communicate with external gateway 218D, and partner gateway 218E to facilitate communication with external party 220.

Figure 3:
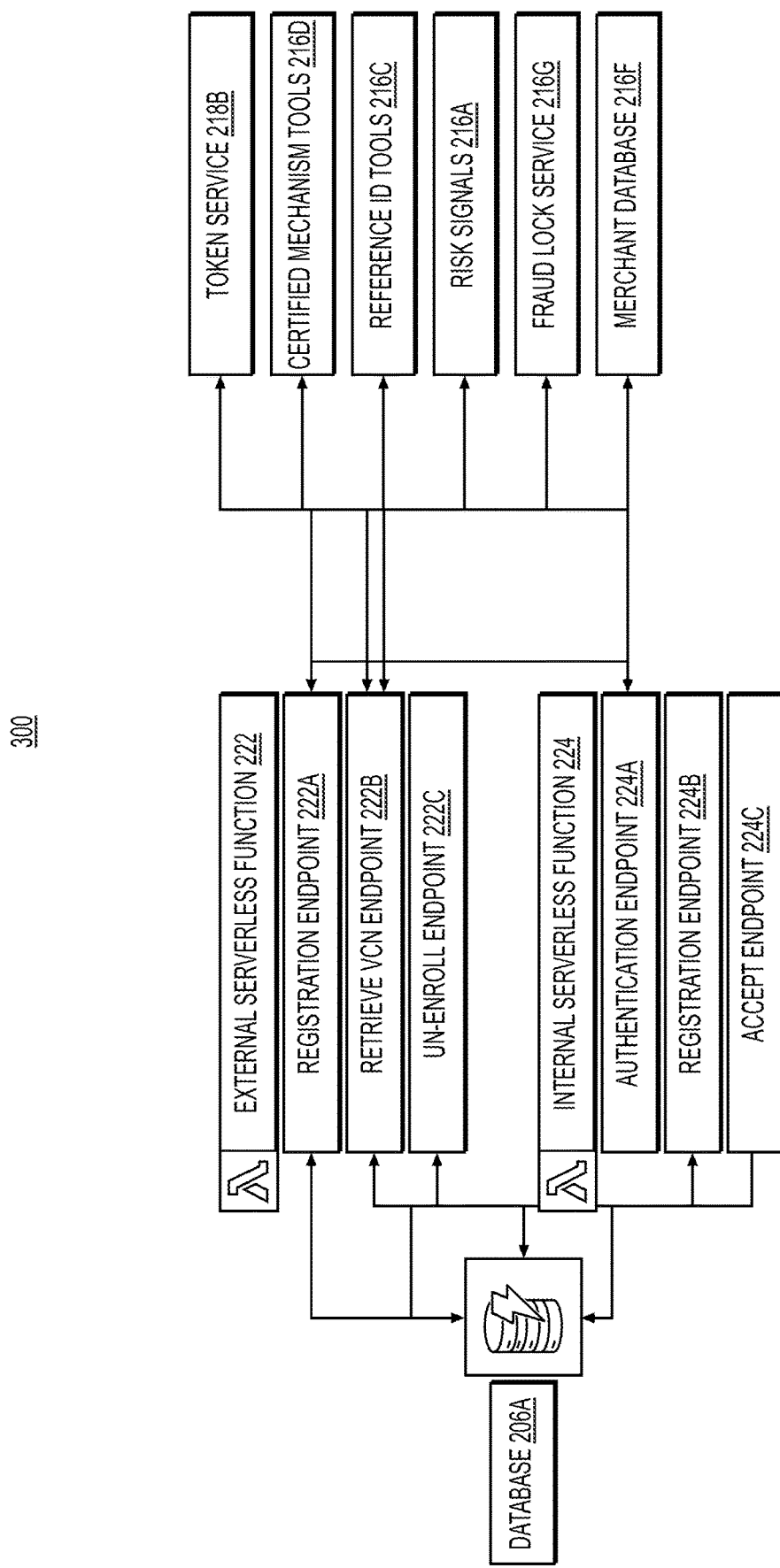
FIG. 3 depicts a dataflow for VCN registration and use, according to one or more embodiments.

FIG. 3 depicts an exemplary dataflow 300 which may be used with the systems and techniques presented herein. As shown, database 206A may communicate with an external serverless function 222 and internal serverless function 224. External serverless function 222 may include a registration endpoint 222A, a retrieve VCN endpoint 222B, and an un-enroll endpoint 222C. Internal serverless function 224 may include an authentication endpoint 224A, registration endpoint 224B, and an accept endpoint 224C. Internal serverless function 222 may, for example, facilitate registration checks (e.g., as described in reference to step 404 of FIG. 4 herein), may facilitate eligibility checks to determine if a user or certification mechanism is eligible for VCN registration, may facilitate or manage consents, or the like. Internal serverless function 224 and/or external serverless function 222 may communicate with system components and/or modules such as token service 218B, certification mechanism tools module 216D, reference ID tools module 216C, risk signal module 216A, fraud lock service 216G, and/or source database 216F.

Internal serverless function 224 and/or external serverless function 222 may be or include compute services that facilitate execution of run code without provisioning or managing servers. Internal serverless function 224 and/or external serverless function 222 may be configured to run secure entity code on a high-availability compute infrastructure to perform the administration of the compute resources, including server and operating system maintenance, capacity provisioning and automatic scaling, and logging. Internal serverless function 224 and/or external serverless function 222 may be used to run code for application or backend services disclosed herein. Internal serverless function 224 and/or external serverless function 222 may be configured to run functions when needed and may be configured to scale automatically based on a number, frequency, density, or demand of applicable requests. System environment 210 and dataflow 300 are further disclosed herein.

Figure 4:
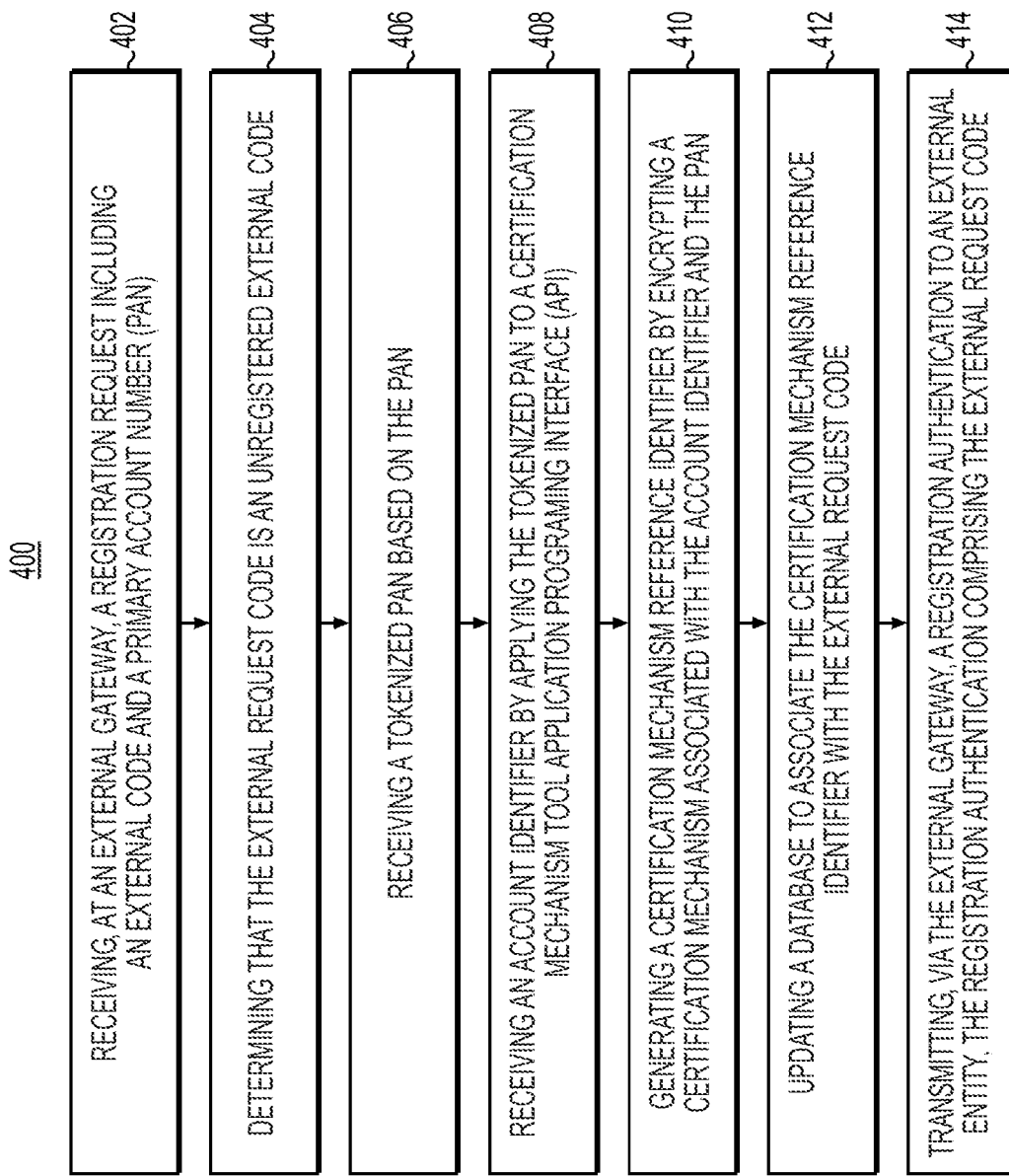
FIG. 4 depicts a flowchart for registering VCN use from an external entity, according to one or more embodiments.

FIG. 4 depicts a flowchart 400 for registering use of a VCN at a secure entity. Flowchart 400 corresponds to registering use of a VCN, where the registration is triggered by an external entity (e.g., by a user using an external entity platform or portal). As shown in flowchart 400, at step 402, a registration request including an external request code and a PAN may be received. The registration request may be received at an external gateway (e.g., external gateway 218D and/or partner gateway 218E). The registration request may be generated by external entity 202 based on user input via user device 105. A user may use user device 105 to trigger the registration request by providing the PAN via an external entity portal 202C using an external entity platform 204 (e.g., web platform 204A or operating system 204B). For example, user inputs via user device 105 may indicate that the user intends to use one or more VCNs for the PAN. Accordingly, external entity 202 may generate the external request code using external request code generator 202D based on the indication.

The external request code may be unique to secure entity 206, where the PAN is associated with secure entity 206. For example, the PAN may be issued by, managed by, or may otherwise be associated with secure entity 206. External request code generator 202D may generate the external request code such that the external request code is associated with secure entity 206 and an external entity 202 user account. The external request code and its associations (e.g., secure entity 206, external entity 202 user account, etc.) may be stored in external entity 202 database 202A. The external request code may include or may be based on a secure entity 206 identifier (e.g., a secure entity 206 code, a secure entity 206 numerical or alphanumeric identifier, a secure entity 206 encrypted value, etc.). The secure entity 206 identifier may be retrieved from external entity 202 database 202A and may be provided too external request code generator 202D. The external request code may further be based on the PAN and/or a secure entity 206 user account (e.g., a user account identifier). For example, the external request code may be a combination (e.g., an encrypted combination, a hash value, a cypher, etc.) of the secure entity 206 identifier and user account identifier.

External entity 202 may transmit the registration request including the external request code and the PAN to secure entity 206 via the external gateway. The registration request may be received at registration endpoint 224B of internal serverless function 224 which may process the registration request through authentication service 212A (e.g., part of authentication endpoint 224A) and registration service 212B. The registration request may be encrypted and registration endpoint 224B may decrypt the registration request to validate data fields included in the registration request. Validating the data fields may include determining that the data fields included in the registration request meet the minimum threshold of data fields required for secure entity 206 to process the registration request. Validating the data fields may further or alternatively include determining that the format of one or more fields matches approved formats for corresponding fields.

At step 404, a determination that the external request code is an unregistered external request code may be made. The determination may be made based on determining whether use of a VCN associated with the PAN or user account associated with the external request code has previously been registered with secure entity 206. Registration endpoint 224B may transmit one or more components of the decrypted registration request (e.g., all or a portion of the external request code) to database 206A (e.g., via authentication service 212A and/or authentication endpoint 224A).

Database 206A and/or authentication service 212A may be configured to determine whether the external request code is previously registered or previously unregistered with secure entity 206. Database 206A and/or authentication service 212A may determine previous registration based on an overlap between data in database 206A and the external request code. Alternatively, or in addition, database 206A and/or authentication service 212A may use a registration machine learning model to generate a machine learning model output that provides a registration confidence score. The registration confidence score may be a score that indicates the likelihood that the external request code corresponds to a previous registration. The registration machine learning model may be trained based on historical external request codes, historical determinations of registration, likelihoods of registration, or the like. If the overlap or the registration machine learning model output indicates that no prior registration corresponds to the external request code, then a determination that the external request code or associated item (e.g., the PAN, a combination of the PAN and the external entity 202, a user account, etc.) is unregistered. The determination may be provided to registration endpoint 224B.

Based on determining that the external request code is unregistered, authentication service 212A may further determine whether the registration request corresponds to an authenticated registration request for VCN use. Registration endpoint 224B may transmit a request to authentication service 212A to verify whether the registration request corresponds to an authenticated registration request for VCN use. Authentication service 212A may perform an authentication verification process to determine if the registration request and/or one or more components of the registration request meet the criteria for VCN use. For example, authentication service 212A may compare a PAN value (e.g., the PAN, a derived PAN value, or a portion of the PAN) to authorized PAN values. If the comparison results in a match, authentication service 212A may output an indication that the registration request corresponds to an authenticated registration request for VCN use. Authenticated registration requests for VCN use are further discussed herein (e.g., in reference to FIG. 7).

At step 406, based on an indication that the registration request corresponds to an authenticated registration request for VCN use, an encrypted PAN or a tokenized PAN may be generated based on the PAN. According to an implementation, an encrypted PAN may be generated using any applicable encryption technique such as, but not limited to, data encryption standard (DES) encryption, triple DES encryption, Advanced Encryption Standard (AES) encryption, Rivest-Shamir-Adleman (RSA) encryption, hashing, cyphering, or the like or a combination thereof. According to an example, the encrypted PAN may be encrypted such that a key may be used to generate the encrypted PAN from a source and a decryption key may be used to return the encrypted PAN back to the original source.

According to an implementation, authentication service 212A may transmit the PAN to a token service 218B. Token service 218B may be configured to tokenize the PAN using VCN service provider 218A, by generating a secure entity 206 internal tokenized PAN (tokenized PAN). The tokenized PAN may be a secure entity 206 identifier that masks the PAN. Secure entity 206 may use the tokenized PAN instead of the actual PAN such that the actual PAN is not distributed within the secure entity 206 past the encryption step 406. Accordingly, as the PAN itself is sensitive and may be susceptible to be targeted (e.g., by spam entities), using the tokenized PAN (e.g., as generated by token service 218B using a tokenizing technique) may limit the dispersion of the actual PAN. The tokenized PAN may be generated using a technique such that secure entity 206 may be able to reference the tokenized PAN to map to the PAN.

At step 408, an account identifier may be generated by applying the tokenized PAN to a certification mechanism tool module 216D API. The tokenized PAN may be transmitted from registration endpoint 224B to certification mechanism tool module 216D via an applicable API configured to communicate with certification mechanism tool module 216D. Certification mechanism tool module 216D may be configured to identify a secure entity 206 user account associated with the PAN based on the tokenized PAN. Certification mechanism tool module 216D may convert the tokenized PAN to secure entity 206 readable value without extracting the PAN from the tokenized PAN. For example, the tokenized PAN may be used with a transform function that generates the secure entity 206 readable value. According to an implementation, certification mechanism tool module 216D may reference the tokenized PAN to locally identify the PAN, without transmitting the PAN to another component (e.g., a secure entity 206 component). In either implementation, the secure entity 206 readable value or the referenced tokenized PAN are referenced herein as the secure entity 206 readable value at the certification mechanism tool module 216D.

Certification mechanism tool module 216D may identify a secure entity 206 user account based on the secure entity 206 readable value. For example, the Certification mechanism tool module 216D may identify the secure entity 206 user account identifier associated with the PAN. Certification mechanism tool module 216D may identify the secure entity 206 user account identifier associated with the PAN by comparing the secure entity 206 readable value to known secure entity 206 user account identifiers. Certification mechanism tool module 216D may transmit the secure entity 206 user account identifier associated with the secure entity 206 readable value to registration endpoint 224B.

At step 410, a certification mechanism reference identifier may be generated by identifying a certification mechanism associated with an encrypted PAN or tokenized PAN and the secure entity 206 user account identifier. For example, the secure account associated with the secure entity 206 user account identifier may include a plurality of certification mechanisms. Accordingly, the encrypted PAN or tokenized PAN may be used to identify a single certification mechanism associated with the PAN and the secure entity 206 user account. The certification mechanism reference identifier may be an encrypted version of the single certification mechanism. The certification mechanism reference identifier may mask the secure entity 206 user account identifier and the certification mechanism such that secure entity 206 uses the certification mechanism reference identifier in a secure manner when compared to using the secure entity 206 user account identifier or certification mechanism. By using the certification mechanism reference identifier, references to the secure entity 206 user account identifier or certification mechanism (e.g., at database 206A, as further discussed herein) may be mitigated.

At step 412, the database 206A may be updated to associate the certification mechanism reference identifier with the external request code. Database 206A may be updated based on determining that the external request code is an unregistered external request code, identifying the secure entity 206 user account identifier associated with the encrypted PAN, and/or one or more security analyses, as further disclosed herein. Database 206A may be updated based on a registration identifier, where the registration identifier may be used to track the registration request and/or the registration process disclosed herein. For example, the registration identifier may be associated with the registration request and/or external request code. Accordingly, the registration identifier may track or implement changes via database 206A. Database 206A may be updated such that a subsequent request including the certification mechanism reference identifier is used to look-up the external request code. Database 206A may update a relational entry such that the certification mechanism reference identifier corresponds to the external request code, and/or such that the external request code corresponds to the secure entity 206 user account associated with the user of the PAN.

At step 414, a registration authentication may be transmitted to external entity 202 and may include the external request code. The registration authentication may be transmitted via the external gateway (e.g., external gateway 218D and/or partner gateway 218E). The registration authentication may indicate that the PAN associated with the external request code is registered for VCN use. Accordingly, external entity 202 may update database 202A to indicate that the PAN provided by the user is registered for VCN use. As further discussed herein, the user may generate a VCN for the PAN at a source portal such that the VCN can be used instead of the PAN for the given source.

Accordingly, flowchart 400 provides a techniques for registering use of a virtual certification number (VCN) at a secure entity. The registration authentication generated at step 414 may enable a user to use a VCN instead of a PAN at one or more sources, as further discussed herein. By registering use of a VCN for PAN, using the secure techniques provided in flowchart 400, a VCN for a given source may be generated and used, the use of the PAN within secure entity 206's systems may be limited, and the use of a secure entity 206 user account identifier may also be limited. By limited use of the PAN and/or secure entity 206 user account identifiers, the opportunity for spam entities obtaining access to either of the same may also be limited. For example, as disclosed herein, subsequent request to generate VCNs and/or use VCNs may be secured based on the registration authentication process disclosed in flowchart 400.

It will be understood that although a certification mechanism reference identifier and encrypted/tokenized PANs are disclosed herein, the techniques disclosed herein may be implemented without using a certification mechanism reference identifier or an encrypted/tokenized PANs. In such implementations, the PAN may be associated with a user account, and the user account may be registered for VCN use directly. Although such an implementation may reduce the security afforded by using a certification mechanism reference identifier and encrypted/tokenized PANs, other secure techniques disclosed herein (e.g., source matching) may provide sufficient security with VCN use).

According to an implementation of the disclosed subject matter, the registration request received at step 402 of flowchart 400 may also include one or more external risk signals. The external risk signals may be generated by external entity 202. The external risk signals may be based on the external entity 202 user account information, user device 105 information (e.g., a user device used to trigger the registration request and/or registered with external entity 202 user account), or the like. The external risk signals may include, but are not limited to, one or more of an internet protocol (IP) address, a location, a user device identifier, or the like. The external risk signals may transmitted via the external gateway, as disclosed herein.

The external risk signals may be mapped to an internal risk module such as risk signals module 216A of secure entity 206, which may be part of the risk authenticator 206B of secure entity 206. The mapping may be implemented by matching identifiers associated with the external risk signals to the same or similar identifiers used at the internal risk module. For example, an IP address included in the external risk signals may have a header comprising the letters "I" and "P" next to or proximate to each other. The header may be parsed and the letters "I" and "P" may be correlated to an IP address internal risk module component. Alternatively, or in addition, the format of an external risk signal may be identified based on known identifiers, and the type of external risk signal may be determined based on identifying the format. Based on identifying the format, the external risks signal may be mapped to a corresponding internal risk module component.

According to an implementation, a risk mapping machine learning model may receive the external risk signals. The risk mapping machine learning model may output a confidence score for each external risk identifier, where the confidence score may identify the likelihood that a given external risk identifier corresponds to an internal risk module component. Based on the confidence score for a given external risk identifier, the given external risk identifier may be mapped to a corresponding internal risk module component. The mapping machine learning model may be trained based on historical external risk identifier, historical mappings, historical confidence scores, and/or feedback based on the same.

A risk analysis may be conducted based on mapping the external risk signals to the internal risk module. The risk analysis may determine if the PAN and/or secure entity 206 user account associated with the PAN meets a risk threshold for VCN use. For example, the risk analysis may determine if an IP address provided via the external risk identifiers has a high risk associated with it (e.g., based on a location associated with the IP address, risk history of the IP address, etc.). If the risk analysis outputs a favorable result (e.g., a risk score that meets or exceeds a risk threshold), then the certification mechanism reference identifier may be generated at step 410 of flowchart 400. If the risk analysis outputs an unfavorable result (e.g., a risk score that does not meet the risk threshold), then the secure entity 206 may reject the registration request received at step 402. According to implementations of the disclosed subject matter, the risk analysis may be further based on internal risk signals in addition to or instead of the external risk signals. It will be understood that although a favorable risk-based result is disclosed as meeting or exceeding a risk threshold, the techniques herein may be implemented such that a favorable result is risk below a risk threshold and an unfavorable result is risk that meets or exceeds the threshold.

According to an implementation of the disclosed subject matter, a user may provide a consent for registering use of a VCN. The user may provide the consent via an external portal, external platform, or secure platform. The consent may indicate that the user agrees to terms and conditions associated with VCN use. A consent indication may be provided as part of the registration request at step 402 of flowchart 400. The consent indication may include a consent version (e.g., indicating a version of the terms and conditions that the user consented to) and/or a consent time stamp. The consent indication may be verified and/or stored at consent module 216E.

Secure entity 206 may verify the consent and if the consent meets secure entity 206 consent criteria, then the certification mechanism reference identifier may be generated at step 410 of flowchart 400. If the consent does not meet secure entity 206 consent criteria, then the secure entity 206 may reject the registration request received at step 402. The secure entity 206 consent criteria may include approved consent versions, a timestamp that corresponds to a time within a threshold amount of a time (e.g., a time between the consent and registration request), receipt of the consent indication, and/or the like.

Figure 5:
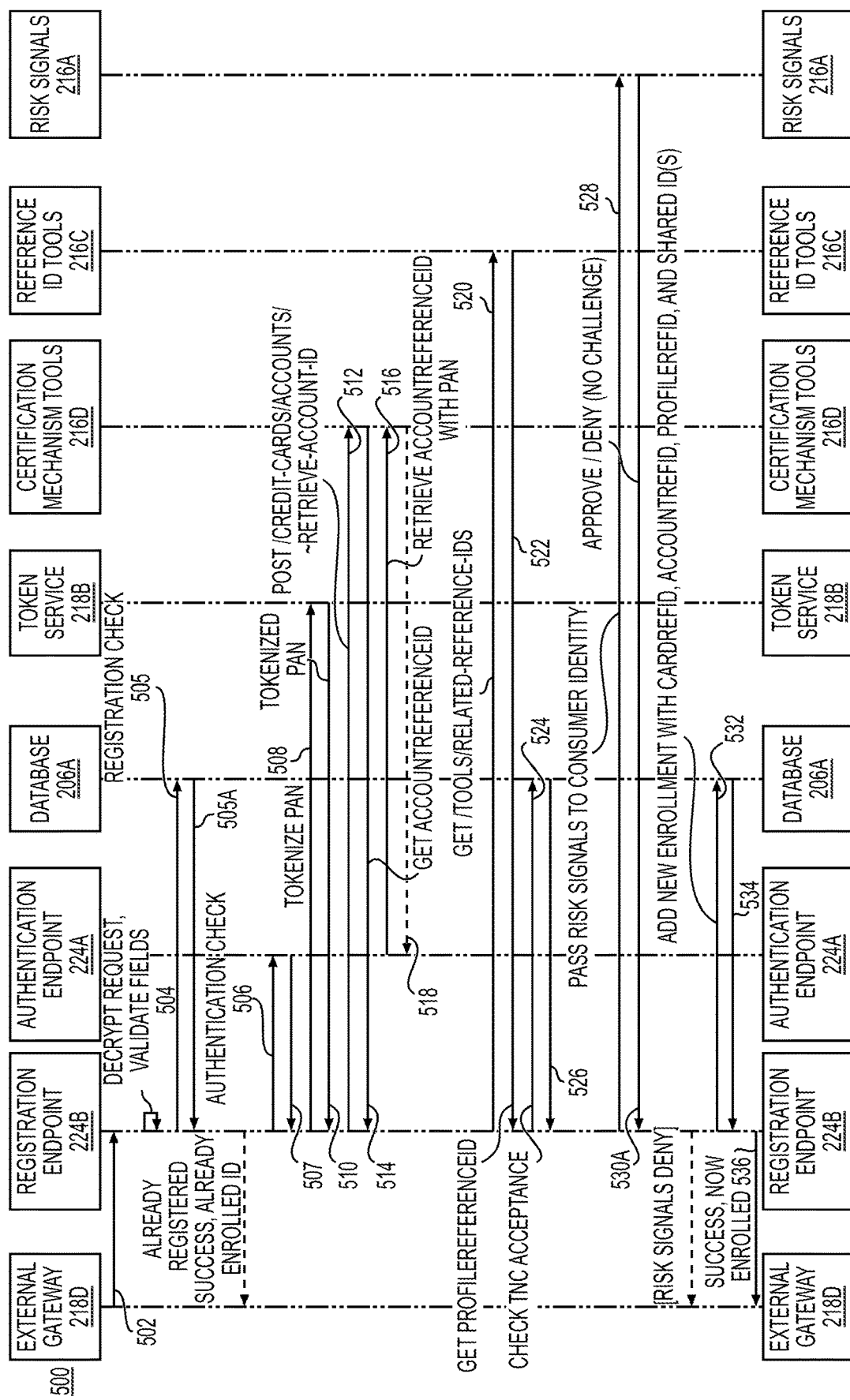
FIG. 5 depicts a dataflow for registering VCN use, according to one or more embodiments.

FIG. 5 depicts an example dataflow 500 for registering VCN use in accordance with the flowchart 400 of FIG. 4. At step 502, external gateway 218D may transmit a registration request for VCN use to registration endpoint 224B. As shown in FIG. 3, registration endpoint 224B may be part of internal serverless function 224 and, more specifically, be part of a registration serverless function. The registration request may be generated in accordance with step 402 of flowchart 400.

At step 504, the registration request may be decrypted and one or more fields associated with the registration request may be validated, as disclosed in reference to step 402 of flowchart 400. At step 505, a registration check may be sent to database 206A. At step 505A, a determination may be made that an external request code and/or PAN associated with the registration request is not previously registered at secure entity 206. The determination may be made based on pinging database 206A. Alternatively, at step 505B, a determination may be made that the registration request corresponds to a previously registered external request code and/or PAN. Accordingly, at step 505B, an indication of an approved or previous registration may be transmitted to external entity 202 via external gateway 218D.

At step 506, registration endpoint 224B may submit an authentication check to authentication endpoint 224A. The authentication check is further discussed herein in reference to FIG. 7. At step 507, authentication endpoint 224A may indicate that the PAN associated with the registration request is authenticated for VCN use. At step 508, registration endpoint 224B may transmit a request to tokenize the PAN at token service 218B. Token service 218B may tokenize the PAN in accordance with step 406 of flowchart 400. Token service 218B may transmit the tokenized PAN to registration endpoint 224B at step 510.

At step 512, registration endpoint 224B may transmit a request to retrieve an account identifier using the tokenized PAN. Certification mechanism tools module 216D may receive the request to retrieve the account identifier and may provide an account reference identifier to registration endpoint 224B at step 514. At step 516, registration endpoint 224B and/or authentication endpoint 224A may submit a request to retrieve a certification mechanism reference identifier from certification mechanism tool module 216D based on the account reference identifier. For example, a given account associated with the account reference identifier may have a plurality of certification mechanisms associated with the account reference identifier. The tokenized PAN may be used to identify the certification mechanism associated with the PAN. At step 518, a certification mechanism reference identifier generated based on the identified certification mechanism may be provided to authentication endpoint 224A or registration endpoint 224B (not shown), in accordance with step 410 of flowchart 400.

In accordance with an implementation of the disclosed subject matter, registration endpoint 224B may request a profile reference identifier associated with the certification mechanism reference identifier from reference ID tools module 216C at step 520. The profile reference identifier may correspond to a profile associated with the certification mechanism (e.g., a sub profile associated with the corresponding certification mechanism). At 522, reference ID tools module 216C may provide the profile reference identifier associated with the certification mechanism reference identifier to registration endpoint 224B. According to this implementation, the certification mechanism reference identifier may be associated with the profile reference identifier.

According to an implementation of the disclosed subject matter, at step 524, registration endpoint 224B may transmit a terms and condition (TnC) verification request to database 206A. Database 206A may provide a TnC verification at step 526.

At 528, registration endpoint 224B may submit external and/or internal risk signals to risk signals module 216A. Risk signal module 216A and/or one or more other components of risk authenticator 206B may map external risk signals to internal risk signals, as discussed herein. At step 530A, risk signals module 216A may output a risk verification to registration endpoint 224B. The risk verification may indicate that the risk associated with the registration request meets or exceeds a risk threshold. Alternatively, at 530B, risk signals module 216A may output a risk denial based on the risk associated with the registration request not meeting or exceeding the risk threshold.

At step 532, registration endpoint 224B may transmit a request to update database 206A to register the certification mechanism reference identifier for VCN use. The registration may include updating database 206A to include a flag or marker designating the certification mechanism reference identifier as registered for VCN use. Database 206A may be updated to associate the certification mechanism reference identifier with the account reference identifier, external request code, and/or profile reference identifier. At 534, database 206A may send a confirmation to registration endpoint 224B of the registration of the certification mechanism reference identifier for VCN use and/or of the one or more associations. At 536, registration endpoint 224B may transmit an indication to the external entity 202, indicating registration of the PAN for VCN use. The indication may include the external request code.

Figure 6:
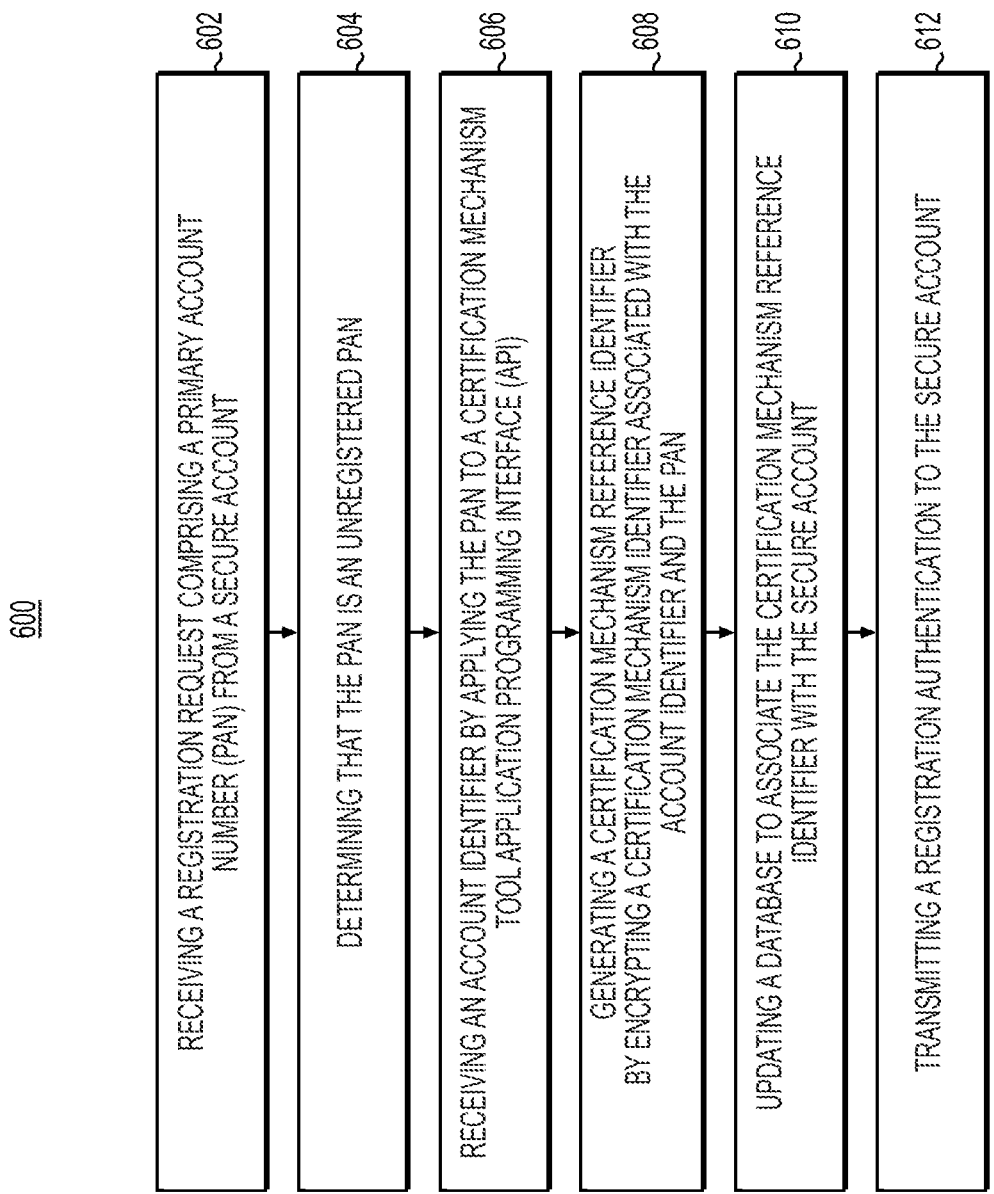
FIG. 6 depicts a flowchart for registering VCN use from a secure entity, according to one or more embodiments.

FIG. 6 depicts a flowchart 600 for registering use of a VCN at a secure entity. Flowchart 600 corresponds to registering use of a VCN, where the registration is triggered at a secure entity portal. To submit the registration request via the secure entity portal, the user may access the user's secure entity 206 user account using access credentials (e.g., log-in credentials, biometric data, etc.). The secure entity portal may provide the user with an option to trigger the registration request by selecting a PAN (e.g., from one or more PANs associated with the secure entity 206 user account). As shown in flowchart 600, at step 602, a registration request including the selected or provided PAN may be received. The registration request may be generated based on user input via user device 105. A user may use user device 105 to trigger the registration request by providing the PAN via secure entity portal 206C. For example, user inputs via user device 105 may indicate that the user intends to use one or more VCNs for the PAN.

At step 604, a determination that the registration request corresponds to an unregistered PAN may be made. The determination may be made based on determining whether use of a VCN associated with the PAN or secure entity 206 user account has previously been registered with secure entity 206. Registration endpoint 224B may transmit one or more components of the registration request to database 206A (e.g., via authentication service 212A).

Database 206A and/or authentication service 212A may be configured to determine whether the PAN is previously registered or previously unregistered with secure entity 206. Database 206A and/or authentication service 212A may determine previous registration based on an overlap between data in database 206A the PAN and/or the secure entity 206 user account information. Alternatively, or in addition, database 206A and/or authentication service 212A may use a registration machine learning model to generate a machine learning output that provides a registration confidence score. The registration confidence score may be a score that indicates the likelihood that the registration request corresponds to a previous registration. The registration machine learning model may be trained based on historical external request codes, historical determinations of registration, likelihoods of registration, or the like. If the overlap or the registration machine learning model output indicates that no prior registration corresponds to the registration request, then a determination that the registration request or associated item (e.g., the PAN, a combination of the PAN and the secure entity 206 user account information, secure entity 206 user account information, etc.) is unregistered. The determination may be provided to registration endpoint 224B.

According to an implementation, based on an indication that the registration request corresponds to an authenticated registration request for VCN use, an encrypted or tokenized PAN may be generated based on the PAN. The encrypted or tokenized PAN may be generated using any applicable encryption technique such as those disclosed herein in reference to step 406 of flowchart 400.

According to an implementation, authentication service 212A may transmit the PAN to a token service 218B. Token service 218B may be configured to tokenize the PAN using VCN service provider 218A, by generating a secure entity 206 internal tokenized PAN (tokenized PAN). The tokenized PAN may be a secure entity 206 identifier that masks the PAN. By generating the tokenized PAN, secure entity 206 may use the tokenized PAN instead of the actual PAN such that the PAN is not distributed within the secure entity 206. Accordingly, as the PAN itself is sensitive and may be susceptible to be targeted (e.g., by spam entities), using the tokenized PAN (e.g., as generated by token service 218B using a tokenizing technique) may limit the dispersion of the actual PAN. The tokenized PAN may be generated using a technique such that secure entity 206 may be able to reference the tokenized PAN to map to the PAN.

At step 606, an account identifier may be generated by applying the PAN or tokenized PAN to a certification mechanism tool module 216D API. The PAN or tokenized PAN may be transmitted from registration endpoint 224B to certification mechanism tool module 216D via an applicable API configured to communicate with certification mechanism tool module 216D. According to an implementation, certification mechanism tool module 216D may convert the tokenized PAN to a secure entity 206 readable value without extracting the PAN from the tokenized PAN. For example, tokenized PAN may be used with a transform function that generates the secure entity 206 readable value. According to an implementation, certification mechanism tool module 216D may use a service to reference tokenized PAN to locally identify the PAN, without transmitting the PAN to another component (e.g., a secure entity 206 component). In either implementation, the secure entity 206 readable value or the tokenized PAN are referenced herein as the secure entity 206 readable value at the certification mechanism tool module 216D.

At step 608, a certification mechanism reference identifier may be generated by identifying a certification mechanism associated with the PAN or tokenized PAN and the secure entity 206 user account. For example, the secure entity 206 user account may include a plurality of certification mechanisms. Accordingly, the tokenized PAN may be used to identify a single certification mechanism associated with the PAN and the secure entity 206 user account. The certification mechanism reference identifier may be an encrypted version of certification mechanism identifier (e.g., a secure entity internal identifier for the PAN). The certification mechanism reference identifier may mask the secure entity 206 user account identifier and the PAN such that secure entity 206 uses the certification mechanism reference identifier in a secure manner when compared to using the secure entity 206 user account identifier or PAN. By using the certification mechanism reference identifier, references to the secure entity 206 user account identifier or certification mechanism (e.g., at database 206A, as further discussed herein) may be mitigated.

At step 610, the database 206A may be updated to associate the certification mechanism reference identifier with secure entity 206 user account. Database 206A may be updated based on determining that the PAN is an unregistered PAN, identifying the secure entity 206 user account identifier associated with the PAN or tokenized PAN, and/or one or more security analysis, as disclosed herein. Database 206A may be updated such that a subsequent call (e.g., request) including the certification mechanism reference identifier is used to look-up the secure entity 206 user account and the specific tokenized PAN associated with the PAN. Database 206A may update a relational entry such that the certification mechanism reference identifier corresponds to the secure entity 206 user account associated with the user of the PAN.

At step 612, a registration authentication may be transmitted to the secure entity 206 user account via the secure entity portal 206C. The registration authentication may indicate that the PAN is registered for VCN use. As further discussed herein, the user may generate a VCN for the PAN at a source portal such that the VCN can be used instead of the PAN for the given source.

Figure 7:
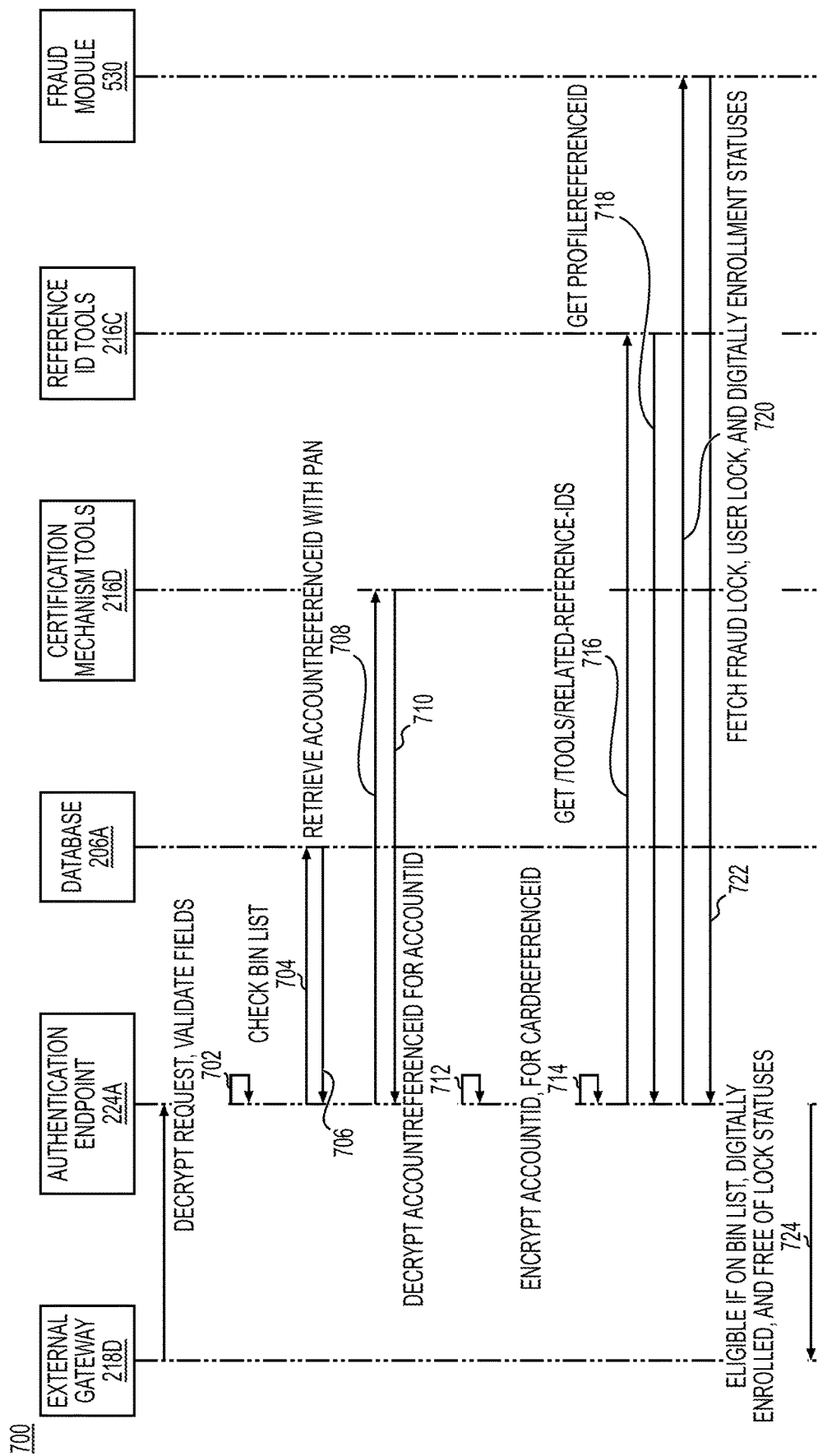
FIG. 7 depicts a dataflow for determining an authentication of a registration request, according to one or more embodiments.

FIG. 7 depicts an example dataflow 700 for determining whether a registration request corresponds to an authenticated registration request for VCN use. In accordance with flowchart 400 for an external entity registration request, an external gateway 218D may transmit a registration request to authentication endpoint 224A, as shown in FIG. 7 (e.g., via registration endpoint 224B, not shown in FIG. 7). Alternatively, in accordance with flowchart 600 for secure entity registration requests, registration endpoint 224B (not shown) may transmit the request to authentication endpoint 224A instead of the external gateway 218D. At step 702, authentication endpoint 224A may decrypt the registration request and validate one or more fields. At step 702, a PAN may be extracted from the registration request and a portion of the PAN (e.g., a subset of the numbers associated with the PAN such as one or more bank identification numbers (BINs)) or a transformed version of the PAN may be provided to database 206A at step 704. The database may compare the portion or transformation of the PAN to an authorized group of entries (e.g., a list of authenticated numbers) stored at database 206A. If there is an authentication match between the portion or transformation of the PAN and the authorized group of entries, then database 206A may provide a PAN authentication to the authentication endpoint 224A at step 706.

At step 708, authentication endpoint 224A may transmit a request to the certification mechanism tools module 216D to identify the account identifier discussed herein, based on the PAN, the tokenized PAN, and/or the portion or transformation of the PAN. At step 710, the certification mechanism tools module 216D may provide the account identifier. At step 712 and 714, the account identifier may be decrypted and the certification mechanism reference identifier may be generated based on the decrypted account identifier and at least a portion of the PAN. At step 716, authentication endpoint 224A may transmit a request to the reference ID tools module 216C to retrieve a profile reference identifier. The profile reference identifier may correspond to a profile associated with the certification mechanism associated with the PAN (e.g., a sub profile associated with the corresponding certification mechanism). At step 718, the reference ID tools module 216C may provide the profile reference identifier to the authentication endpoint 224A.

At step 720, authentication endpoint 224A may transmit a fraud check request to a fraud module 530. Fraud module 530 may be configured to determine whether the profile associated with the profile reference identifier triggers any fraud markers. The fraud markers may be based on use of the certification mechanism associated with the PAN. The fraud check may verify that the certification mechanism is free of applicable fetch fraud locks, user locks, and/or blocking registration status. If fraud module 530 determines that the profile associated with the profile reference identifier meets one or more fraud thresholds, then an approved profile status may be provided from fraud module 530 to authentication endpoint 224A at step 722. Based on the PAN authentication at step 706, successful retrieval of the account identifier at step 708, and approved profile status at step 722, authentication endpoint 224A may output an indication that the registration request corresponds to an authenticated registration request for VCN use at step 724. Alternatively, or in addition, fraud lock service 216G may receive a fraud check (e.g., from authentication endpoint 224A). Fraud lock service 216G may determine if a PAN or an identifier associated with the PAN is locked due to fraud.

Figure 8:
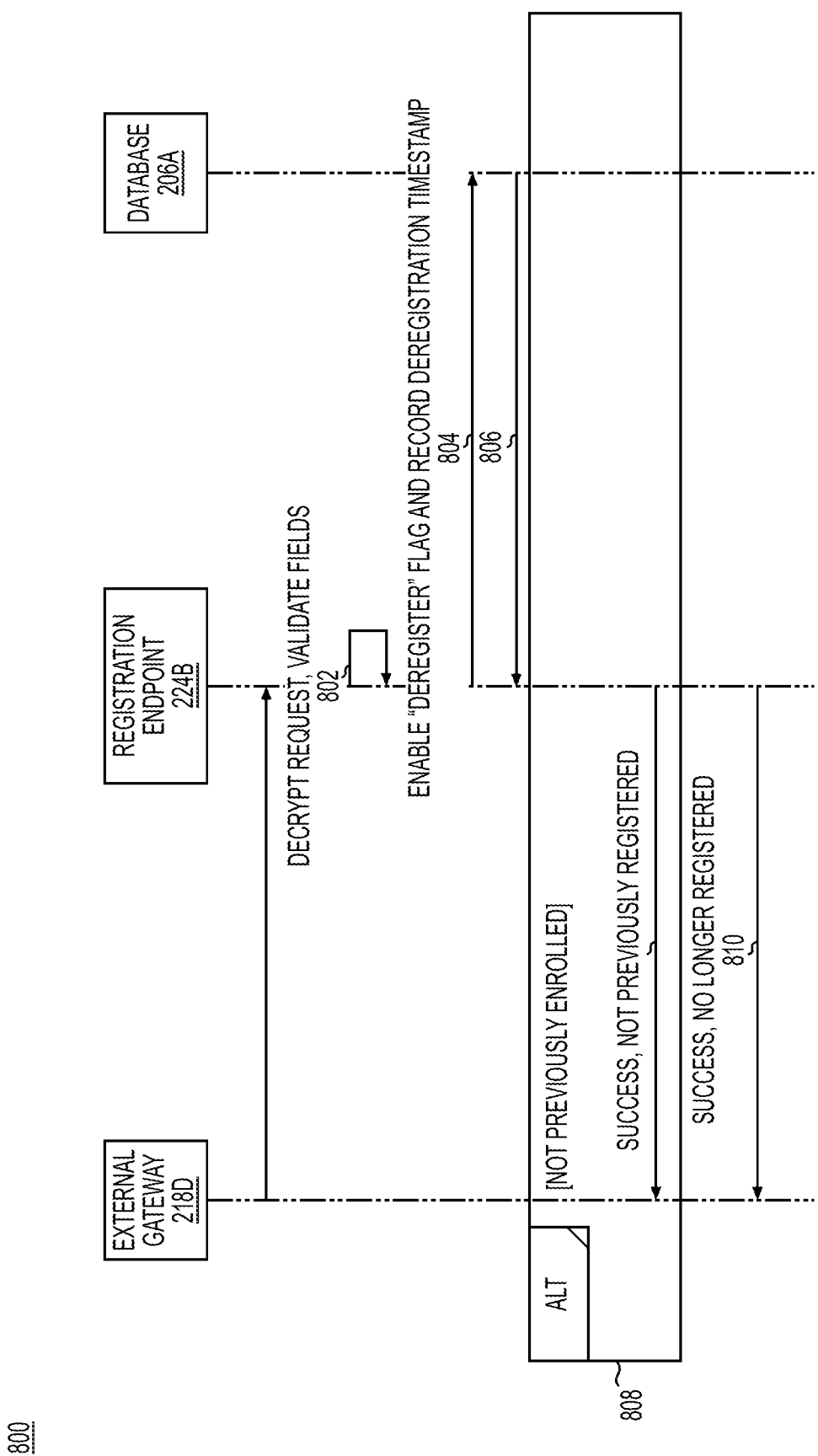
FIG. 8 depicts a dataflow for deregistering VCN use, according to one or more embodiments.

According to an implementation of the disclosed subject matter, a user may elect to de-register VCN use for a PAN. The user may elect to de-register VCN use based on a preference to use PANs instead of VCNs for any applicable reason. FIG. 8 shows an example dataflow 800 for de-registering use of a VCN for a PAN. At step 802, an external gateway 218D may submit a deregistration request to registration endpoint 224B. According to this implementation, the deregistration request may be generated at an external portal 202C or external platform 204. Alternatively, the deregistration request may be generated at a secure portal 206C (not shown), where a user may access a secure entity 206 user account via the secure portal 206C.

At step 802, the deregistration request may be decrypted and one or more fields associated with the deregistration request may be validated. At step 804, registration endpoint 224B may transmit a deregistration request to database 206A. The deregistration request at step 804 may cause database to enable a deregistered flag associated with the external request code, PAN, user account, and/or profile associated with the deregistration request received at step 802. Database 206A may store a deregistration time-stamp associated with the deregistration request received at step 802. Database 206A may provide a confirmation of deregistration to registration endpoint 224B at step 806. Alternatively, at step 808, registration endpoint 224B may determine that the deregistration request corresponds to an unregistered external request code or PAN, and may transmit an indication of the unregistered status via external gateway 218D or secure entity 206 user account (not shown) at step 810.

According to an implementation of the disclosed subject matter, a deregistration request may be automatically generated by any applicable system component disclosed herein. The deregistration request may be automatically generated based on one or more of a duration of time, an event, or a risk trigger. For example, a duration of time may be set for a given PAN or user account. The duration of time may be set by a user or automatically by a system component based on one or more of a user history, PAN history, risk history, user profile, or the like. An expired duration of time may be calculated based on updating database 206A to associate the certification mechanism reference identifier with the external request code, a last VCN use, a first VCN use, a predetermined time, and/or the like. When the expired duration of time meets of the set duration of time, the deregistration request may be automatically triggered and the processes disclosed in dataflow 800 may be triggered.

According to an implementation of the disclosed subject matter, one or more rules associated with a given VCN may be received. The one or more rules may be automatically generated by external entity 202, secure entity 206, and/or may be provided based on user input. The rule may dictate use of one or more VCNs associated with a user such as, for example, maximum transaction amounts, types of sources, frequency of use, or the like. Accordingly, a VCN generated in accordance with techniques disclosed herein may be associated with the one or more rules. When VCN use is triggered, as further disclosed herein, the use may be filtered through the one or more rules such that use of the VCN may be allowed or blocked based on the rule. The one or more rules discussed herein may be implemented at external entity 202 or secure entity 206.

According to implementations of the disclosed subject matter, source-based VCNs may be generated once a registration authentication for a user account or PAN has been generated. The registration authentication may designate the user account or PAN as a user account or PAN approved for VCN use, as disclosed herein. For example, a user may trigger VCN generation based on registering for VCN use, as discussed herein in reference to FIGS. 4, 5, 6, and 7. VCNs may provide a secure way to transact with sources (e.g., brands, companies, sellers, marketplaces, etc.) using source portals (e.g., source websites, source applications, source extensions, etc.). Such secure transactions are facilitated by using VCNs without disclosure, transmission, and/or use of PANs to or by a source, such that the likelihood of a fraudulent entity obtaining the PAN is eliminated or severely mitigated. A VCN may be linked to a PAN and/or a user account as well as a given source, such that a given VCN may be authenticated for use for a given source, mitigating the risk of a fraudulent entity obtaining the PAN and eliminating the risk that of a fraudulent entity using the VCN at any other source.

A user may register a PAN and/or user account for VCN use, as discussed herein. The user may register a PAN for VCN use using an external entity platform, an external entity portal, or a secure entity portal, as discussed herein. Registering for VCN use may also be triggered at a source portal accessed via an external entity platform or an external entity portal. For example, a user may access a brand's website and may reach a checkout page of the brand website. From the checkout page, a determination may be made regarding whether a user account or PAN associated with the user is registered for VCN use. If no account or PAN is registered for VCN use, then the user may be presented an option to register for VCN use. Alternatively, or in addition, if an account of PAN is registered for VCN use, the user may also be presented an option for VCN use for a different account or PAN. The external entity may facilitate the VCN use registration, in accordance with the techniques disclosed herein.

Figure 9A:
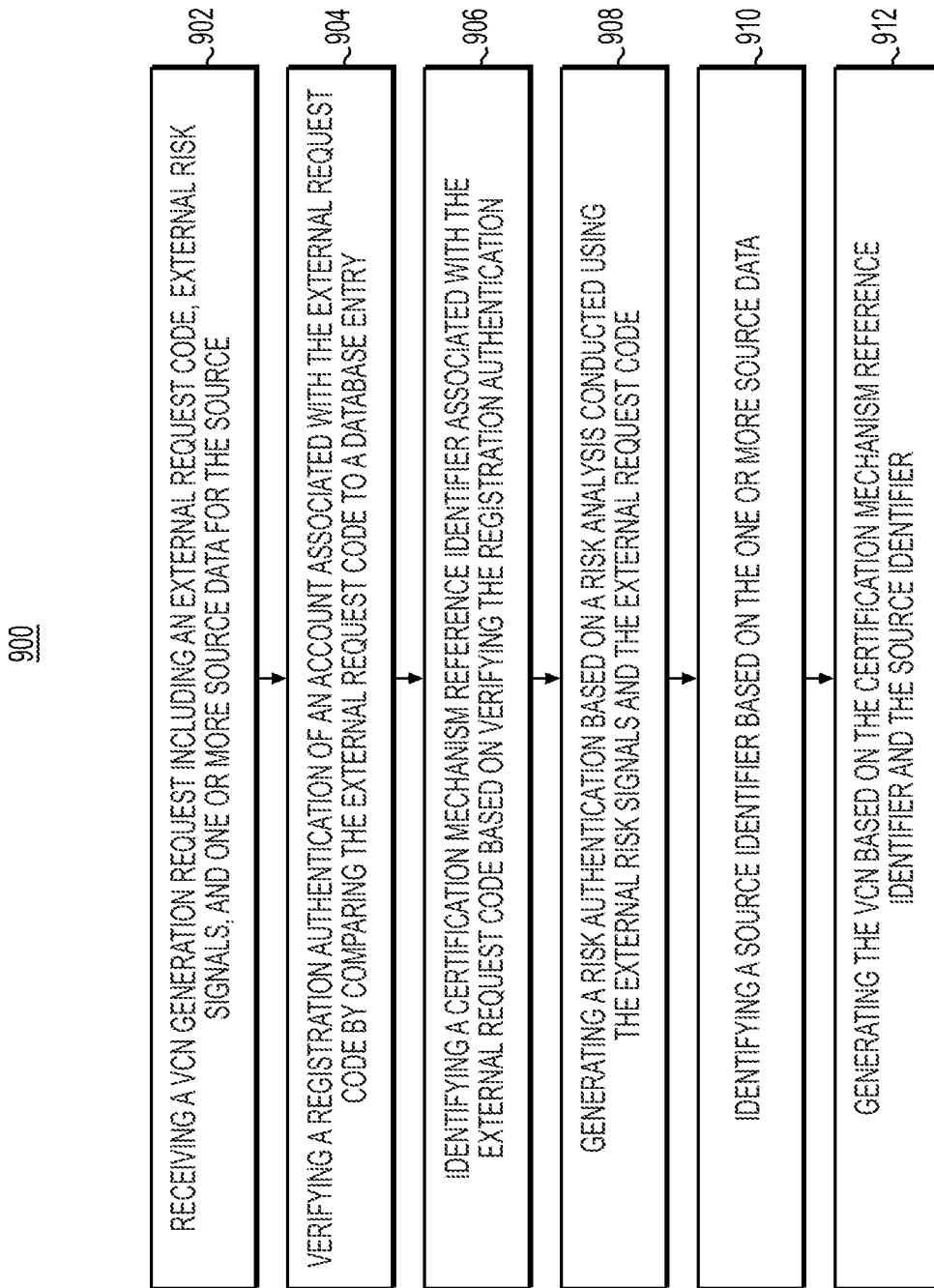
FIG. 9A depicts a flowchart for generating a VCN for an external entity, according to one or more embodiments.

According to implementations of the disclosed subject matter, once an account or PAN is registered for VCN use, a source-specific VCN associated with the PAN may be generated. FIG. 9A depicts a flowchart 900 for generating a VCN based on a certification mechanism identifier and a source identifier. In flowchart 900, a VCN generation request may be received at VCN registration module 206D. VCN registration module 206D may be configured to receive the VCN generation request via external gateway 218D. The VCN generation request may be generated at a source portal, as discussed herein. The source portal may be accessed using an external platform 204 such as web platform 204A and/or operating system 204B, as further discussed herein.

The VCN generation request may include the external request code associated with a corresponding VCN use registration discussed herein. For example, external entity 202 may generate a unique external request code when registering use of a VCN for an account or PAN, as disclosed in flowchart 400 of FIG. 4. The external request code may be associated with the account and/or PAN such that both the external entity 202 and the secure entity 206 may associate the account and/or PAN with the same external request code.

The VCN generation request may further include external risk signals associated with the VCN generation request. The external risk signals may be similar to the external risk signals discussed herein in reference to the VCN registration request (e.g., in reference to FIG. 4) and may be generated by external entity 202. The VCN generation request may also include the registration identifier (e.g., corresponding to a PAN) to be associated with the VCN. The registration identifier may be determined based on an indication or user input selecting a PAN from one or more PANs that are registered for VCN use. The VCN generation request may also include one or more source data associated with the source to be associated with the VCN.

The one or more source data may be provided by external entity 202 (e.g., based on the source portal being accessed via an external entity platform 204). The one or more source data may include any source identification information including, but not limited to, a source domain, a source application code, a source name, a source brand, source relationships (e.g., affiliate or subsidiary data), or the like. The one or more source data may be encrypted. For example, a user may access a source portal, such as a brand website, via external entity 202 web platform 204A, such as an external entity 202 browser. Accordingly, the source data may include domain information associated with the brand website. The domain information may be provided by the external entity 202 browser, which accesses the domain based on website code, the URL associated with the brand website, or the like. As another example, a user may access a source portal, such as a brand application, via external entity 202 operating system 204B, such as an external entity 202 mobile operating system. Accordingly, the source data may include an application identifier associated with the brand application. The application identifier may be provided by the external entity operating system, which access the application identifier based on resources used by the brand application to execute on the external entity 202 operating system 204B.

The source data may be extracted from the source portal by external entity 202. For example, external entity 202 may access or retrieve source data such as a domain or other address used to access the source portal via an external entity platform 204. External entity 202 may receive a source domain or other address based on a user input or other trigger that causes the source portal to be made available via the external entity platform 204. Accordingly, external entity 202 may have access to source data based on the source domain or other address. Alternatively, or in addition, external entity 202 may store source data at database 202A based on a given source being accessed via an external entity platform 204. The stored source data may include, but is not limited to, code, content, domain or other address information, headers, payloads, or the like associated with a source accessed via an external entity platform 204. External entity 202 may retrieve the stored source data from 202A and may include the retrieved source data in the VCN generation request.

At step 904, a registration authentication for the external entity 202 user account or registration identifier received as part of the VCN generation request received at step 902 may be verified by secure entity 206. The verification may include comparing the external request code and/or the registration identifier to a database entry in database 206A. If a corresponding entry in the database 206A is mapped to the external request code and/or the registration identifier, then the registration authentication for the external entity 202 user account or registration identifier may be verified.

According to an alternative implementation, a user may trigger VCN generation via source portal, as disclosed herein. The user may select a PAN from one or more PANs via an external entity platform 204 interface or a source portal interface. External entity 202 may receive a registration identifier associated the PAN and may verify that an indication of a registration authentication associated with the registration identifier is stored in database 202A. For example, the registration identifier may be provided to database 202A and database 202A may identify a profile or data associated the registration identifier. If a flag indicating that a registration authentication for the registration identifier is available in database 202A, then the registration authentication for the registration identifier may be verified.

At step 906 of flowchart 900, a certification mechanism reference identifier associated with the external request code may be identified based on verifying the registration authentication. Secure entity 206 may receive the external request code and registration identifier from the VCN generation request at step 902. Secure entity 206 may identify a certification mechanism reference identifier based on the external request code and/or registration identifier.

According to an implementation, the external request code may be used to lookup an entry in database 206A. The entry may include the certification mechanism reference identifier associated with the external request code and/or registration identifier. Accordingly, the external request code and/or registration identifier may be used to determine the corresponding secure entity 206 certification mechanism reference identifier. As discussed herein, by using the certification mechanism reference identifier at the secure entity 206, storage and access to the PAN may be limited. By limiting storage and access to the PAN, the likelihood of fraudulent access to the PAN may also be limited.

At step 908 of flowchart 900, a risk authentication may be generated based on a risk analysis conducted using the external risk signals and/or the external request code. External risk signals provided at step 902 may be generated by external entity 202, as disclosed herein. As also disclosed herein, the external risk signals may be mapped to one or more risk modules of secure entity 206. For example, external entity 202 risk signal generator 202B may generate the external risk signals. Risk signal generator 202B may generate the external risk signals based on an external entity 202 user account, the PAN, the registration identifier, user history, source data, source history, and/or the like. The external risk signals may be mapped to secure entity 206 risk modules by risk authenticator 206B, as disclosed herein.

Risk authenticator 206B may use one or more of the mapped external risk signals for the risk authentication by evaluating the mapped external risk signals to secure risk criterion. Alternatively, or in addition, risk authenticator 206B may also use internal risk signals generated at secure entity 206. The internal risk signals may be based on the certification mechanism reference identifier, data associated with the external request code, user information, source data, and/or the like. The risk modules may be used to determine if risk authentication thresholds for one or more risk criterion of a plurality of risk criterion are met. Risk criteria may include, but are not limited to a device verification, an IP address verification, a number of requests (e.g., VCN generation requests, VCN user requests, request from a user or device, etc.). For example, a risk module may be used to determine if a fraud score associated with a user device meets a fraud score risk criterion.

Risk authenticator 206B may output an unfavorable risk authentication if the risk analysis results in one or more risk criterion that do not meet applicable risk thresholds. If an unfavorable risk authentication is output by risk authenticator 206B, then a step up process may be triggered, as further discussed herein, or the VCN generation process may stop and an indication of the same may be transmitted to the external entity 202. If the risk criteria meet applicable risk authentication thresholds, then no additional verification may be required. If the risk criteria does not meet applicable risk authentication thresholds, then additional verification may be required.

Figure 9B:
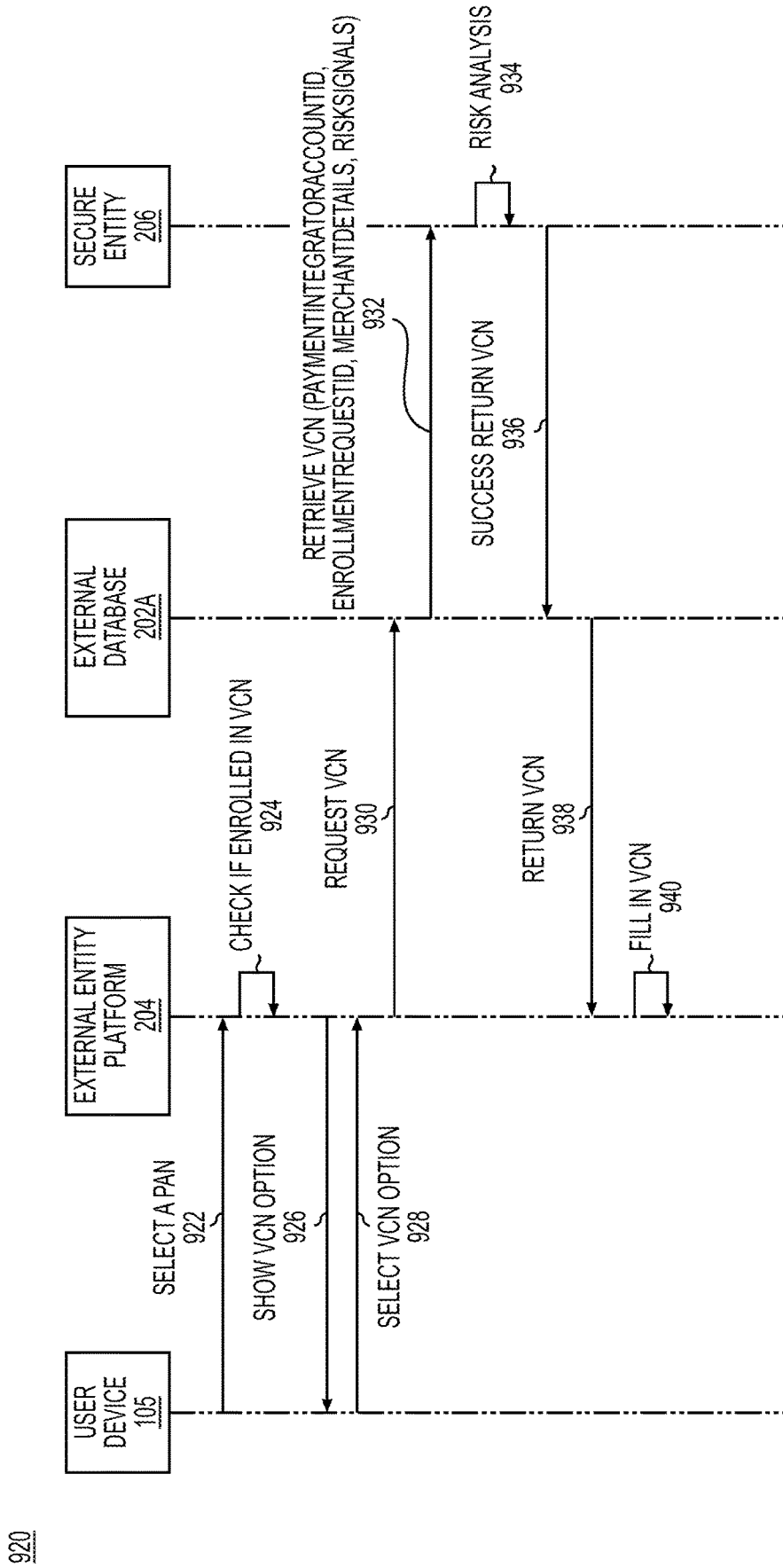
FIG. 9B depicts a dataflow for generating a VCN, according to one or more embodiments.
Figure 9C:
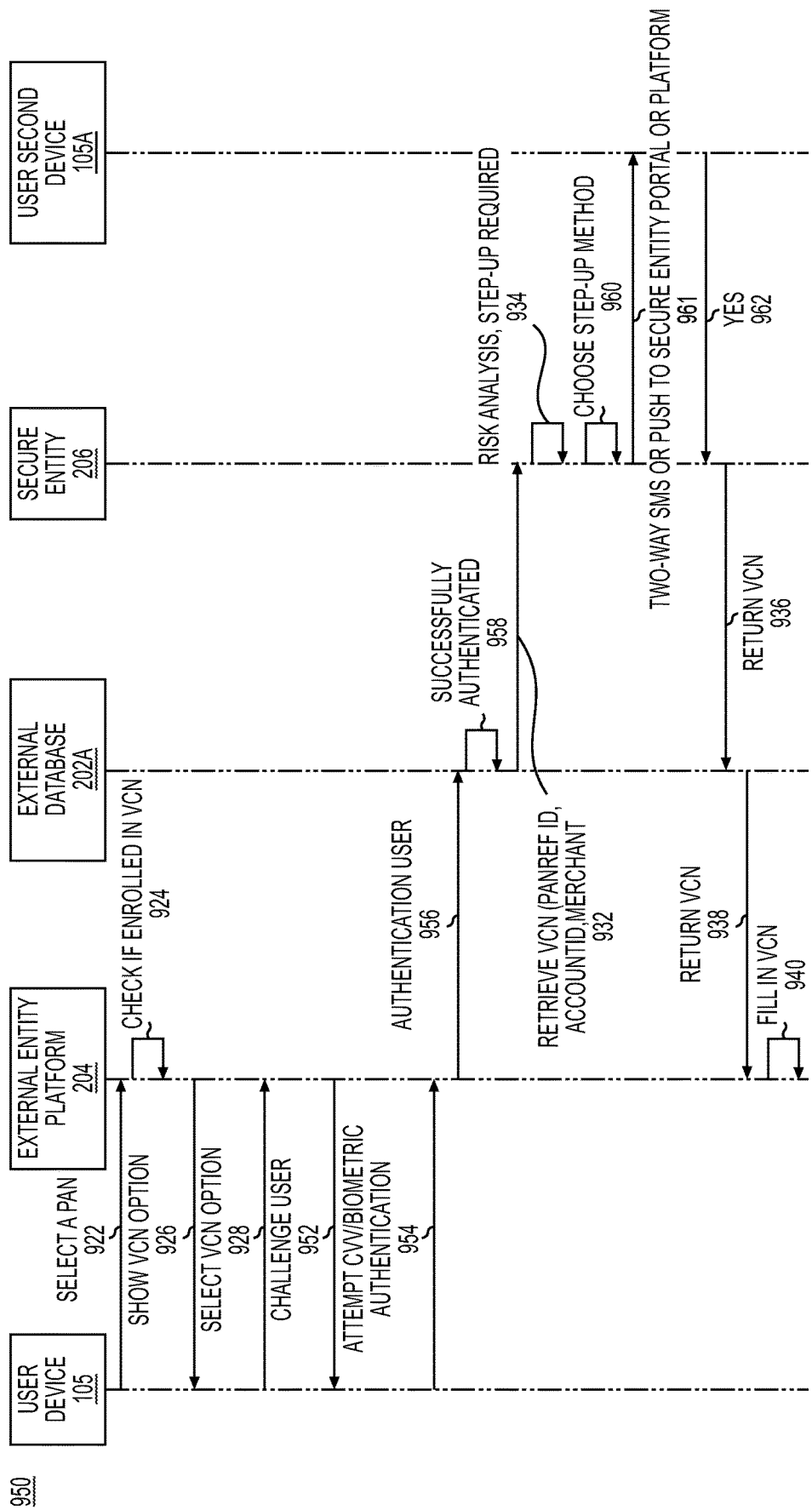
FIG. 9C depicts a dataflow for generating a VCN using step up verification, according to one or more embodiments.

As discussed in reference to FIG. 9C herein, an additional verification may be a step up verification. A step up request may be a request for additional verification information or a verification action. The step up request may be sent to the user device used to request VCN generation and/or to an application or a second device. The step up request may be, for example, a short message service (SMS) verification request, a multimedia message service (MMS) verification request, a push verification request, an application verification request, a numerical verification request, a code verification request, a credential verification request, a biometric verification request, or the like. According to an implementation, a step up initiation request with a plurality of step up options may be sent to a user. According to an implementation, the step up initiation request may be sent to the user via an external entity platform 204 or external entity portal 202C. The user may select an option (e.g., SMS verification) and the selection may be received at secure entity 206. Based on the selection, a corresponding step up request may be sent to the user. The response to the step up request may be provided by a user input (e.g., confirming a verification number), by a user action (e.g., clicking on a link), a user log in, or the like. The response may be received from the user to the secure entity 206 or may be provided via external entity 202. If the response to the step up performance meets a corresponding step up threshold (e.g., a value match, an action match, a device match, a credential match, etc.), then a risk authentication may be generated.

Risk authenticator 206B may output a favorable risk authentication if the risk analysis and/or additional verification results in one or more risk criterion that meet or exceed applicable risk thresholds or performances. A favorable risk authentication may indicate an approval of the risk component of the VCN generation.

At step 910 of flowchart 900, a source identifier may be identified based on the one or more source data. The source identifier may be identified at secure entity 206. The source identifier may be identified from a group of potential source identifiers based on correlating the one or more source data to information associated with the group of potential source identifiers. For example, database 206A may include the group of potential source identifiers and associated information for each of the group of potential source identifiers. The one or more source data may be compared to associated information for each of the group of potential source identifiers. Based on the comparison, a source identifier may be identified if a match exists between the one or more source data and the associated information for each of the group of potential source identifiers.

According to an implementation, a comparison score may be generated for all or a subset of the group of potential source identifiers. The comparison score may indicate the likelihood that a given source identifier corresponds to a given one of the group of potential source identifiers. The comparison score may be based on an overlap or correlation between the source data and the associated information for respective potential source identifiers. A potential source identifier with the highest comparison score may be identified as a likely potential source based on the one or more source data. The comparison score for the likely potential source may be compared to a comparison score threshold. If the comparison score for the likely potential source meets or exceeds the comparison score threshold, then the source identifier for the likely potential source may be identified as associated with the one or more source data.

According to an implementation, an identifier machine learning model may be trained to output the comparison score. The identifier machine learning model may receive, as inputs, the one or more source data and the associated information for each of the group of potential source identifiers. Based on the inputs, the identifier machine learning model may output a plurality of comparison scores and/or the highest comparison score and an indication of which source identifier corresponds to the highest comparison score.

According to an implementation of the disclosed subject matter, none of the source identifiers from the group of potential source identifiers may correspond to the one or more source data. For example, the highest comparison score for any of the potential source identifiers may not meet the comparison score threshold. If none of the source identifiers from the group of potential source identifiers correspond to the one or more source data, then a new source identifier may be generated. The new source identifier may be stored at database 206A. Additionally, the one or more source data may be associated with the new source identifier and may be stored at database 206A. Accordingly, at step 910, the new source identifier may be identified as the source identifier based on the one or more source data.

At step 912, a VCN may be generated at secure entity 206. The VCN may be generated based on the certification mechanism reference identifier and the source identifier. The VCN may be associated with both the certification mechanism reference identifier and the source identifier such that the VCN may only be used for a source corresponding to the source identifier. The VCN may be stored at database 206A and the corresponding entry may be relationally correlated with the source identifier and may further be correlated with the associated information of the source identifier.

The VCN generated at step 912 may be provided from secure entity 206 to external entity 202. The VCN may be provided with the external request code. External entity 202 may receive the VCN and/or the external request code and may associate the VCN with the registration identifier provided at step 902 (or a respective PAN) for VCN generation. External entity 202 may associate the VCN generated at step 912 with the registration identifier provided with the VCN generation request and with the source corresponding to the source data. Accordingly, the external entity may provide the VCN as a certification mechanism option when the user initiates a transaction with the given source. Accordingly, the VCN may be used for the source, as further discussed herein.

According to an implementation of the disclosed subject matter, a second VCN generation request may be received at secure entity 206, from the external entity 202. The second VCN generation request may include the external request code, second external risk signals, the same registration identifier corresponding to the same PAN as the registration identifier/PAN received at step 902 of FIG. 9A, and one or more source data corresponding to the same source as the source discussed in FIG. 9A. The source data may be different from, similar to, or the same as the source data received at step 902. Accordingly, the second VCN generation request may be for the same registration identifier and respective PAN and source as the VCN generation request received at step 902.

Based on the second VCN generation request, a registration authentication of the account associated with the external request code and/or PAN may be conducted by comparing the external request code and/or registration identifier to a database entry (e.g., at database 206A). A certification reference identifier associated with the external request code and/or PA registration identifier N may be identified based on verifying the registration authentication of the second VCN generation request.

Similar to step 910 of FIG. 9A, a source identifier may be identified based on the one or more source data received as part of the second VCN generation request. A determination may be made, based on the certification mechanism reference identifier and the source identifier, that a VCN corresponding to the second VCN generation request was previously generated. The determination may be made by comparing the certification mechanism reference identifier and the source identifier to source entries and corresponding VCNs that were previously generated (e.g., based on flowchart 900 of FIG. 9A). Based on the determination that a VCN has been previously generated, the previously generated VCN may be transmitted to the external entity. Accordingly, duplicate VCNs may not be generated for the same PAN/registration identifier and source combination, avoiding duplicity and minimizing storage and security resource use associated with generating and/or storing VCNs.

FIG. 9B depicts a dataflow 920 for triggering VCN generation, in accordance with implementations disclosed herein. At step 922, a user device 105 may provide a user input selecting a PAN. The PAN may be selected via a source portal accessed using an external entity platform 204. A registration identifier may be identified based on the PAN. The registration identifier may be received at the external entity platform 204 and, at step 924 external entity platform 204 or an external entity 202 system component may determine if a VCN associated with the registration identifier is previously registered. The external entity platform 204 or an external entity 202 system component make the determination based on a lookup of database 202A. For example, a determination may be made that an external content request associated with the registration identifier previously received a registration authentication. Alternatively, or in addition, a secure entity 206 system component may determine if the registration identifier/corresponding PAN is previously registered for VCN use (e.g., based on a database 206A lookup).

At step 926, a VCN associated with the registration identifier may be provided, to user device 105. At step 928, a user may provide another user input selecting the VCN option associated with the registration identifier and the selection may be received at external entity platform 204. At step 930, a VCN request may be generated by an external entity 202 component (e.g., by external database 202A). The VCN request of step 930 may be provided to secure entity 206, such as at VCN generator 206F) at step 932. VCN generator 206F may identify a certification mechanism reference identifier associated with the VCN request (e.g., based on the PAN, an associated external request code, etc.).

At step 932, VCN generator 206F (of secure entity 206) may also retrieve the registration authorization associated with the registration identifier or external request code. The VCN request may also include a merchant reference identifier as identified at step 906 of flowchart 900. Additionally, the VCN request may include external risk signals. As discussed in reference to step 908 of flowchart 900, at step 934, risk authenticator 206B (of secure entity 206) may conduct a risk analysis based, at least in part, on mapping the external risk signals to internal risk modules of secure entity 202.

If the risk analysis results in a favorable result at step 934, then VCN generator 206F (of secure entity 206) may generate a VCN based on the certification mechanism reference identifier, registration authentication, merchant identifier, and favorable risk result. The VCN may be associated with the merchant identifier in database 206A. The VCN may be sent to external entity 202 at step 936 and may be stored in external database 202A. The VCN may be returned to the external entity platform 204 at step 938 and external entity platform 204 may fill in the VCN (e.g., in an applicable certification mechanism field of the source portal interface) at step 940.

FIG. 9C depicts a dataflow 950 for triggering VCN generation with a step up process, in accordance with implementations disclosed herein. Steps that overlap with the dataflow 920 of FIG. 9B are referenced using the same reference numbers in dataflow 950. At step 922, a user device 105 may provide a user input selecting a PAN. The PAN may be selected via a source portal accessed using an external entity platform 204. The user input may be received at the external entity platform 204 and a registration identifier associated with the PAN may be identified. At step 924 external entity platform 204 or an external entity 202 system component may determine if a VCN associated with the registration identifier is previously registered. The external entity platform 204 or an external entity 202 system component make the determination based on a lookup of database 202A. For example, a determination may be made that an external content request associated with the registration identifier previously received a registration authentication. Alternatively, or in addition, a secure entity 206 system component may determine if the registration identifier is previously registered for VCN use (e.g., based on a database 206A lookup).

At step 926, a VCN associated with the registration identifier may be provided, via user device 105. At step 928, a user may provide another user input selecting the VCN option associated with the registration identifier and the selection may be received at external entity platform 204. At step 952, an external entity challenge module may trigger a challenge based on the selection of the VCN option selected at step 928. The challenge may be triggered based on pre-determined challenge criteria, based on a first VCN use, based on a time since last VCN use, or the like. The challenge may include requests for challenge data such as, but not limited to, a card verification value (CVV), user credential information, biometric authentication information or the like. At step 954, challenge responses to the request for challenge data may be received from user device 105.

At step 956, the challenge responses may be submitted to an external entity 202 component such as the external database 202A. At step 958, the user associated with user device 105 may be authenticated based on verifying the challenge responses. For example, the challenge responses may be compared to entries in external database 202A or may be provided to a challenge machine learning model configured to determine a confidence score that the challenge responses correspond to a user associated with the registration identifier. A successful authentication may be generated at step 958.

The VCN request of step 930 may be provided to secure entity 206, such as at VCN generator 206F) at step 932. VCN generator 206F may identify a certification mechanism reference identifier associated with the VCN request (e.g., based on the registration identifier, an associated external request code, etc.).

At step 932, VCN generator 206F may also retrieve the registration authorization associated with the registration identifier or external request code. The VCN request may also include a merchant reference identifier as identified at step 906 of flowchart 900. Additionally, the VCN request may include external risk signals. As discussed in reference to step 908 of flowchart 900, at step 934, risk authenticator 206B may conduct a risk analysis based, at least in part, on mapping the external risk signals to internal risk modules of secure entity 202.

If the risk analysis results in an unfavorable result at step 934, then a step up method may be selected at step 960 to further verify the user requesting the VCN generation. The step up method may be selected based on user preferences, risk level, stored data, or the like. At step 961, a step up request may be sent to a second user device 105A. The second user device may be an application accessed via user device 105 or may be a separate device than user device 105. The step up request may be, for example, a short message service (SMS) verification request, a multimedia message service (MMS) verification request, a push verification request, an application verification request, a numerical verification request, a code verification request, a credential verification request, a biometric verification request, or the like. The response to the step up request may be received at step 962.

If the response to the step up request received at step 962 is favorable, then VCN generator 206F may generate a VCN based on the certification mechanism reference identifier, registration authentication, merchant identifier, and favorable risk result. The VCN may be associated with the merchant identifier in database 206A. The VCN may be sent to external entity 202 at step 936 and may be stored in external database 202A. The VCN may be returned to the external entity platform 204 at step 938 and external entity platform 204 may fill in the VCN (e.g., in an applicable certification mechanism field of the source portal interface) at step 940.

According to an implementation of the disclosed subject matter, prior to generating a VCN at step 912 of flowchart 900, a fraud lock check may be performed. The certification mechanism reference identifier identified at step 906 may be provided to fraud module 530 of secure entity 206. The fraud module may be configured to determine if a fraud lock exists for the certification mechanism reference identifier. Fraud lock module 530 may determine whether the certification mechanism reference identifier and/or a PAN associated with the certification mechanism reference identifier has an associated lost, stolen, or replacement (LSRP) event.

An LSRP event may indicate the PAN associated with the VCN generation request is locked. Accordingly, fraud lock module 530 may trigger a step up request based on the LSRP event. The step up request may be a request for additional verification information or a verification action. The step up request may be sent to the user device used to request VCN generation, to an application, and/or a second device. The step up request may be, for example, a short message service (SMS) verification request, a multimedia message service (MMS) verification request, a push verification request, an application verification request, a numerical verification request, a code verification request, a credential verification request, a biometric verification request, or the like. According to an implementation, a step up initiation request with a plurality of step up options may be sent to the user. According to an implementation, the step up initiation request may be sent to the user via an external entity platform 204 or external entity portal 202C. The user may select an option (e.g., SMS verification) and the selection may be received at fraud module 530. Based on the selection, corresponding step up request may be sent to the user. The response to the step up request may be provided by a user input (e.g., confirming a verification number), by a user action (e.g., clicking on a link), a user log in, or the like. The response may be received from the user to the fraud module 530 or may be provided via external entity 202.

If the response to the step up performance meets a corresponding step up threshold (e.g., a value match, an action match, a device match, a credential match, etc.), then one or more user certification mechanism numbers from a certification mechanism API associated with the secure entity 206 user account may be received. The user certification mechanism numbers may correspond to the one or more certification mechanism numbers currently assigned to the secure entity 206 user account. Based on the user certification mechanism numbers, an updated certification mechanism number to replace the certification mechanism number that triggered the LSRP event may be identified. The updated certification mechanism number may be identified based on a flag indicating that the updated certification mechanism number replaced the previous certification mechanism number. Alternatively, or in addition, the updated certification mechanism number may be identified based on analyzing field identifiers associated with each of the received user certification mechanism numbers, and identifying the updated certification mechanism number based on the field identifiers. The filed identifiers may include, but are not limited to, dates (e.g., certification mechanism number creation date, use date, expiration date, etc.).

Based on identifying the updated certification mechanism number, a VCN may be generated based on the updated certification mechanism number. If a VCN was previously generated based on a previous certification mechanism number, then an updated VCN may be generated and may replace the previous VCN number. For example, a previous VCN may be removed from database 206A and may be replaced with the updated certification mechanism number. Accordingly, a subsequent VCN request may result in the updated VCN number being provided, based on identifying a corresponding source identifier.

Figure 10:
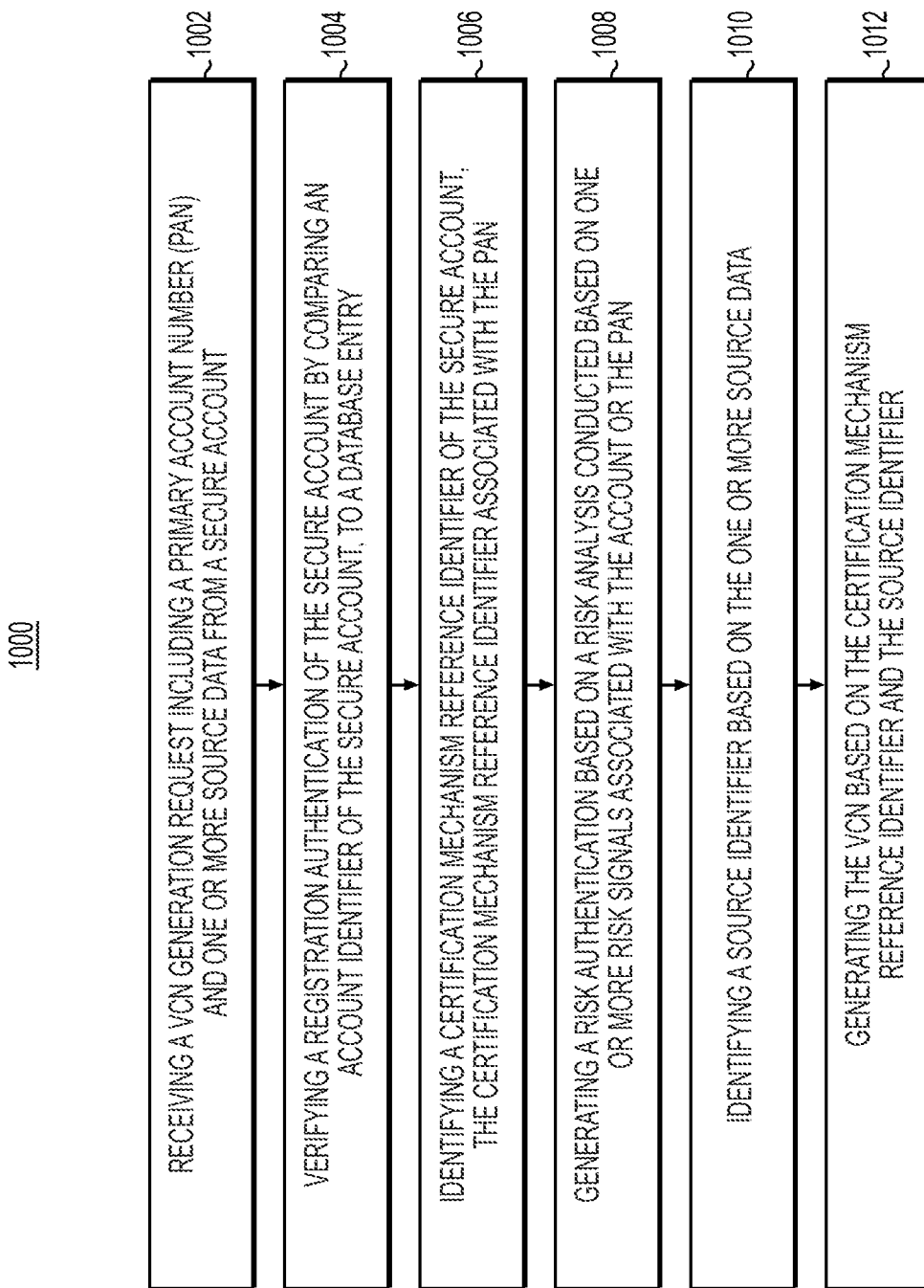
FIG. 10 depicts a flowchart for generating a VCN for a secure entity, according to one or more embodiments.

According to implementations of the disclosed subject matter, once an account or PAN is registered for VCN use, a source specific VCN associated with the PAN may be generated after a user successfully accesses a secure entity 206 user account, in accordance with techniques disclosed herein. FIG. 10 depicts a flowchart 1000 for generating a VCN based on a certification mechanism identifier and a source identifier. At step 1002 of flowchart 1000, a VCN generation request may be received at VCN registration module 206D. The VCN generation request may be generated at a secure entity portal or a source portal, as discussed herein. The source portal may be accessed while the user has accessed a secure entity 206 user account, as discussed herein. As an example, the source portal may be accessed using a browser with an activated source browser extension. The activated source browser extension may be activated by a user accessing the secure browser extension using a log-in or other credentials.

The VCN generation request may include the PAN that the user elects to use for VCN generation. If the VCN generation request is initiated at a secure entity 206 portal, then the VCN generation request may also include one or more source data (e.g., as provided by a user or as determined by secure entity 206, such as by a browser extension associated with a browser used to access the secure account).

The one or more source data may include any source identification information including, but not limited to, a source domain, a source application code, a source name, a source brand, source relationships (e.g., affiliate or subsidiary data), or the like. The one or more source data may be encrypted.

At step 1004, a registration authentication for a secure entity 206 user account received and/or PAN as part of the VCN generation request received at step 1002 may be verified by secure entity 206. The verification may include comparing the secure entity 206 user account and/the PAN to a database entry in database 206A. If a corresponding entry in the database 206A is mapped to the secure entity 206 user account and/or the PAN, then the registration authentication for the secure entity 206 user account or PAN may be verified.

A user may trigger VCN generation via source portal, as disclosed herein. The user may select a PAN from one or more PANs via a source portal interface. Secure entity 206 may receive the PAN and may verify that an indication of a registration authentication associated with the PAN is stored in database 206A. If a flag indicating that a registration authentication for the PAN is available in database 206A, then the registration authentication for the PAN may be verified.

At step 1006 of flowchart 1000, a certification mechanism reference identifier associated with the PAN may be identified based on verifying the registration authentication. Secure entity 206 may receive the secure entity 206 user account and PAN from the VCN generation request at step 1002. Secure entity 206 may identify a certification mechanism reference identifier based on secure entity 206 user account and/or PAN.

As discussed herein, by using the certification mechanism reference identifier at the secure entity 206, storage and access to the PAN may be limited. By limiting storage and access to the PAN, the likelihood of fraudulent access to the PAN may also be limited.

At step 1008 of flowchart 1000, a risk authentication may be generated based on a risk analysis conducted using the secure entity 206 user account or PAN. Risk authenticator 206B may use internal risk signals generated at secure entity 206 to conduct the risk analysis. The internal risk signals may be based on the certification mechanism reference identifier, data associated with the secure entity 206 user account, PAN, user information, source data, and/or the like.

Risk authenticator 206B may output an unfavorable risk authentication if the risk analysis results in one or more risk values that do not meet applicable risk thresholds. If an unfavorable risk authentication is output by risk authenticator 206B, then a step up process may be triggered, as discussed herein, or the VCN generation process may stop and an indication of the same may be transmitted to the external entity 202. Risk authenticator 206B may output a favorable risk authentication if the risk analysis results in one or more risk values that meet or exceed applicable risk thresholds. A favorable risk authentication may indicate an approval of the risk component of the VCN generation.

At step 1010 of flowchart 1000, a source identifier may be identified based on the one or more source data. The source identifier may be identified at secure entity 206. The source identifier may be identified from a group of potential source identifiers based on correlating the one or more source data to information associated with the group of potential source identifiers. For example, database 206A may include the group of potential source identifiers and associated information for each of the group of potential source identifiers. The one or more source data may be compared to associated information for each of the group of potential source identifiers. Based on the comparison, a source identifier may be identified if a match exists between the one or more source data and the associated information for each of the group of potential source identifiers.

According to an implementation, a comparison score may be generated for all or a subset of the group of potential source identifiers, as discussed herein. According to an implementation, an identifier machine learning model may be trained to output the comparison score, as discussed herein. According to an implementation of the disclosed subject matter, none of the source identifiers from the group of potential source identifiers may correspond to the one or more source data, as discussed herein. If none of the source identifiers from the group of potential source identifiers correspond to the one or more source data, then a new source identifier may be generated.

At step 1012, a VCN may be generated at secure entity 206. The VCN may be generated based on the certification mechanism reference identifier and the source identifier. The VCN may be associated with both the certification mechanism reference identifier and the source identifier such that the VCN may only be used for a source corresponding to the source identifier. The VCN may be stored at database 206A and the corresponding entry may be relationally correlated with the source identifier and may further be correlated with the associated information of the source identifier.

The VCN generated at step 1012 may be provided from secure entity 206 to the user via the secure entity 206 user account or source portal. The user may use the VCN as a certification mechanism option when the user initiates a transaction with the given source. Accordingly, the VCN may be used for transactions associated with the source, as further discussed herein.

According to an implementation of the disclosed subject matter, a second VCN generation request may be received at secure entity 206, via a source portal or a secure entity 206 portal. The second VCN generation request may include the second external risk signals, the same PAN as the PAN received at step 1002 of FIG. 10, and one or more source data associated as the same source as discussed in FIG. 10. The one or more source data may be different from, similar to, or the same as the source data received at step 1002. Accordingly, the second VCN generation request may be for the same PAN and source as the VCN generation request received at step 1002.

Based on the second VCN generation request, a registration authentication of the account associated with the secure entity 206 user account and/or PAN may be conducted by comparing the secure entity 206 user account and/or PAN to a database entry (e.g., at database 206A). A certification reference identifier associated with the secure entity 206 user account and/or PAN may be identified based on verifying the registration authentication of the second VCN generation request.

Similar to step 1010 of FIG. 10, a source identifier may be identified based on the one or more source data received as part of the second VCN generation request. A determination may be made, based on the certification mechanism reference identifier and the source identifier, that a VCN corresponding to the second VCN generation request was previously generated. The determination may be made by comparing the certification mechanism reference identifier and the source identifier to source entries and corresponding VCNs that were previously generated (e.g., based on of FIG. 10). Based on the determination that a VCN has been previously generated, the previously generated VCN may be provided in response to the second VCN request. Accordingly, duplicate VCNs may not be generated for the same PAN and source combination, avoiding duplicity and minimizing storage and security resource use associated with generating and/or storing VCNs.

Figure 11:
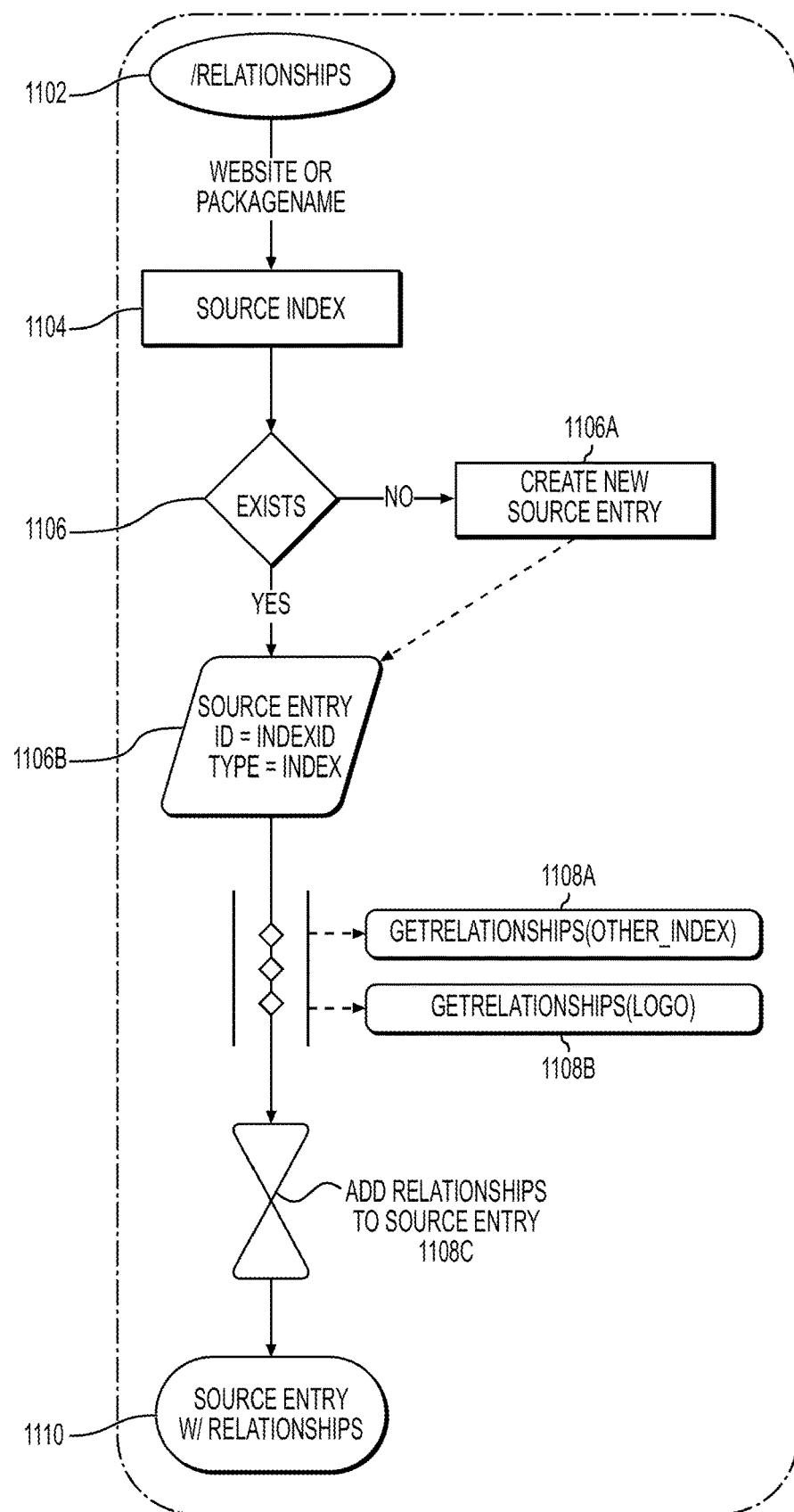
FIG. 11 depicts a dataflow for identifying a source identifier, according to one or more embodiments.

FIG. 11 depicts dataflow 1100 for identifying a source identifier based on the one or more source data, as discussed in reference to step 910 of FIG. 9A and step 1010 of FIG. 10. At step 1102, one or more source data such as a domain name, package name, domain information, source name, source attributes, and/or the like may be received. The one or more source data may be provided by an external entity 202 component (e.g., an external entity platform 204), a source portal, a secure entity 206 user account, or the like.

At step 1104, a source index may be accessed. The source index may be a component of database 206A or may be a separate component. The source index may include known source entries, their associated source identifiers, and associated information, as discussed herein. At 1106, a determination may be made whether the one or more source data corresponds to a source entry. As disclosed herein, if no source entry corresponds to the source data, a new source entry may be created at step 1106A. If a source entry exits, the source entry may be identified at step 11066. As discussed herein, the identified entry at step 11066 may be new source entry created at 1106A. The identified source entry may include a source identifier and/or a source type (e.g. type of source, a product, a service, a trust level, an authorization level, etc.).

At 1108A, source relationships may be identified. Source relationships may be any associations corresponding to the source entry identified a step 11066. The source relationships may include, for example, one or more entities associated with the source identifier such as a parent entity or a subsidiary entity. At step 11086, source information (e.g., a source logo, source name, source information) or the like may be identified. The source relationships identified at 1108A and/or the source information identified at 11086 may be identified, for example, based on the associated information corresponding to the source entry identified at step 11066. Alternatively, or in addition, the source relationships and/or source information may be identified based on the one or more source data received at step 1102.

At step 1108C, the source relationships identified at 1108A and/or the source information identified at 1108B may be added to the source entry identified at 11066. At step 1110, the source entry including a source identifier, source relationships, and/or source information may be provided (e.g., as an output to step 910 of FIG. 9A and/or step 1010 of FIG. 10).

Figure 12:
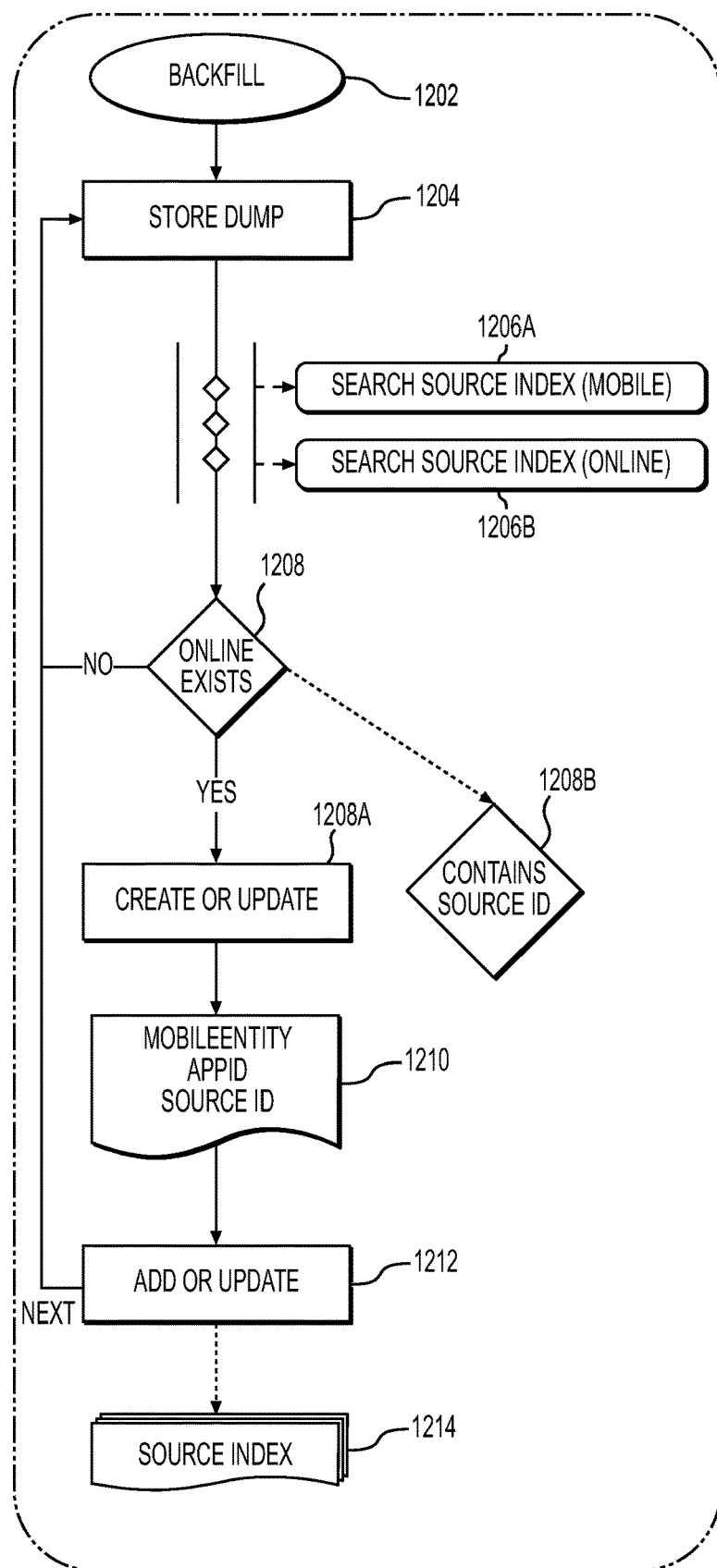
FIG. 12 depicts a dataflow for generating and/or updating source entries in a source index, according to one or more embodiments.

FIG. 12 depicts a dataflow 1200 for generating and/or updating source entries in a source index. At step 1202, a backfill process may be triggered. The backfill process may be triggered at periodic time periods or may be triggered based on an indication of a new or updated source entry. The backfill process may be conducted at secure entity 206 and may be conducted for o applications accessible via external entity operating system 204B. For example, operating system 204B may be a closed platform that can be used to access approved applications. At least a subset of the approved applications may be associated with sources (e.g., merchant applications) and, accordingly, may have source identifiers and associated data corresponding to such applications.

Upon triggering a backfill process, at step 1204 an operating system 204B store dump may be received at secure entity 206. The store dump may include source data including any new sources (e.g., new applications) and/or updates to existing sources. At 1206A, the store dump received at step 1204 may be searched and/or indexed for mobile sources (e.g., mobile applications). Similarly, at 1206B, the store dump received at step 1204 may be searched and/or indexed for online sources (e.g., web applications).

At step 1208, a determination may be made whether a threshold amount of information is available for a given source identified in steps 1206A or 1206B. The threshold amount of information may correspond to whether a source can be identified based on the available information. If the threshold amount of information does not exist, then the source may be added or updated at step 1212, and information about the source may be stored with fields that may be filled in at a later time. If the threshold amount of information exists, then a determination may be made whether the data for a given source included in the store dump matches existing information in the source index. If a match is determined, then a corresponding entry for that source may remain unchanged. If a difference is determined or if the given source is not in the source index, then at step 1208A, the source entry for that given source may be created or updated. If the source does not exist in the source index, then a source identifier for the source may be generated at step 1208B, and the source entry for the given source may be associated with the created source identifier.

At step 1210, if the source is a mobile entity, then an application identifier and a source identifier may be associated with each other in the source entry. At step 1212, if the source entry for a given source with the threshold amount of information was created or updated, then an indication of the addition or update may be stored. At step 1214, the updated source index may be stored (e.g. at database 206A).

According to implementations of the disclosed subject matter, once a VCN corresponding to a given PAN and a given source has been generated, the VCN may be used to conduct transactions related to the given source. A user may use user device 105 to access a source portal. The source portal may be accessed via any applicable platform including an external entity platform 204 (e.g., via a web platform 204A or via an application activated using operating system 204B. For example, a user may access the source portal when the VCN generation disclosed in FIG. 9A or FIG. 10 is submitted. The user may initiate a transaction at the source portal using the VCN associated with the source.

Figure 13A:
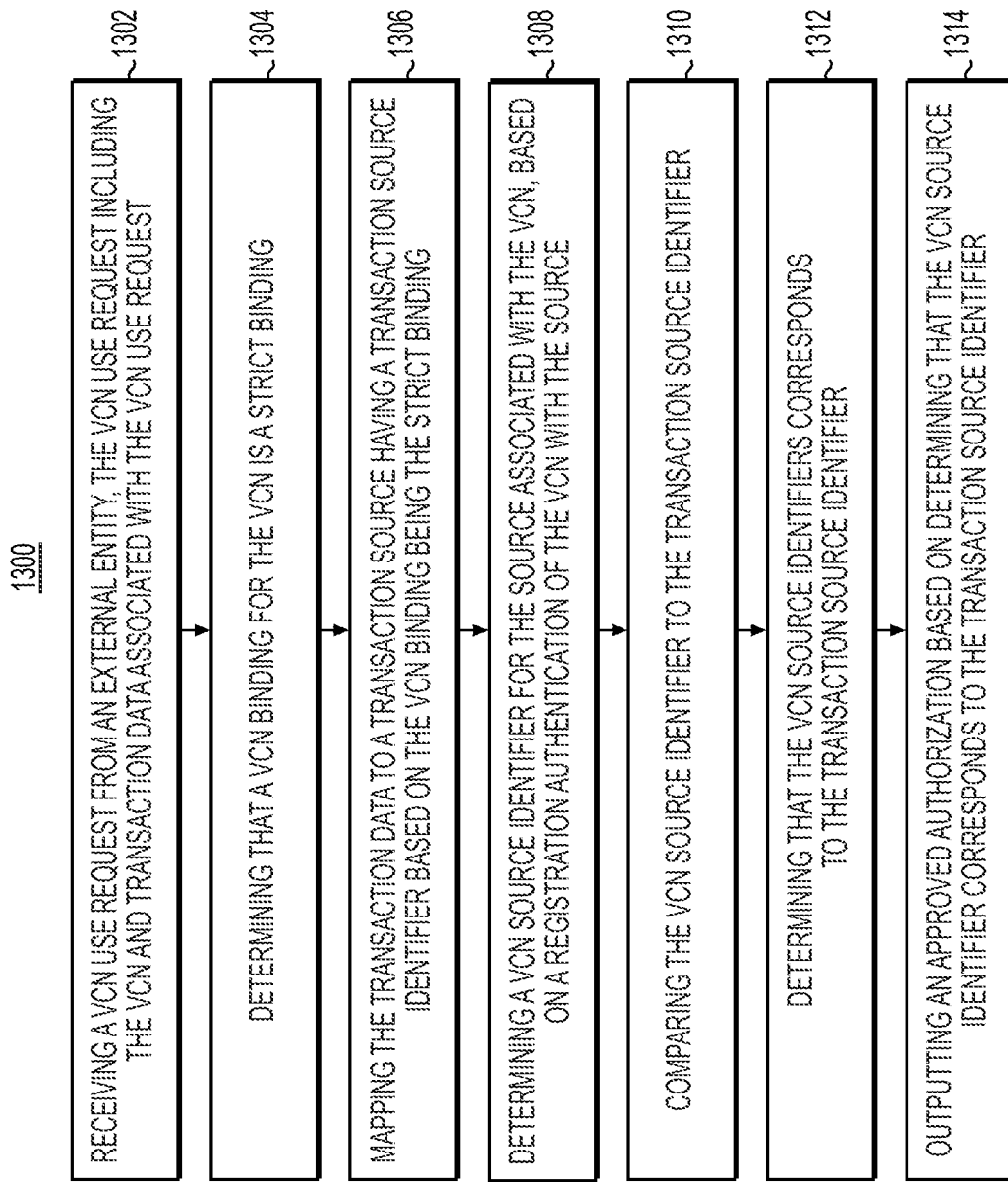
FIG. 13A depicts a flowchart for authorizing a source for VCN use based on a strict binding, according to one or more embodiments.

Secure entity 206 may receive a VCN use request based on the user initiating a transaction using the VCN at a given source. Based on the VCN use request, a VCN source verification process may be initiated at secure entity 206. FIG. 13A depicts a flowchart 1300 for authorizing a source for VCN use based on the VCN use request and a strict binding. At step 1302, the VCN use request may be received from a source portal (e.g., via an external entity platform 204). The VCN use request may include the VCN and transaction data associated with the VCN use request. The transaction data may be generated by a payment processor such as, but not limited to a certification card processing institution, a banking institution, or the like.

The transaction data may include a transaction identifier generated based on the VCN use being triggered at the transaction source (e.g., the source portal). The transaction identifier may be an encrypted identifier such as a hash value. The transaction identifier may be generated based on source data, transaction information (e.g., product, service, subscription, quantity, etc.). Accordingly, the transaction data and/or transaction identifier may be generated at the time that the VCN use is triggered by the user at the source portal.

At step 1304 of flowchart 1300, a determination may be made that a VCN binding for the VCN is a strict binding. The VCN binding may be determined from one of a strict binding, a first authorization binding, or an unbound binding. A strict binding may correspond to a VCN that is bound to a known qualified source. A known qualified source may be a source that is designated as a qualified source at secure entity 206. The known qualified source may be a qualified source based on one or more of a volume of transactions associated with the source, a prior qualification of the source as a qualified source, known source information available in database 206A, or the like. Accordingly, a strict binding may correspond to a binding specific to the known qualified source.

A first authorization binding may be a VCN binding for unqualified sources. Unqualified sources may be known or unknown to secure entity 206 and may be sources that have not been previously qualified, do not meet a qualification threshold, do not meet a volume threshold, and/or do not meet a minimum criteria for information available at database 206A.

An unbound VCN binding may correspond to a VCN binding that is not associated with a source. An unbound VCN may for a source unknown to secure entity 206. Upon determining that a VCN corresponds to an unbound binding, the VCN use may be approved an approved authorization indicating that a source associated with transaction data of the VCN use request is associated with the VCN.

A type of binding for a given VCN may be determined based on properties of transaction data (e.g., domain information, a uniform resource locator (URL), etc.), based on properties of the VCN, based on a strict binding identifier including in the VCN, and/or may be based on a look-up of the transaction data and/or VCN. For example, a source URL associated with a VCN use request may be received. The source URL may be compared to a binding table and the binding type may be determined based on the comparison. As another example, a portion of the VCN may be used to identify the type of binding for the VCN. As another example, a filter may be applied to the VCN or a portion thereof, and the result of applying the filter may output a value that corresponds to a type of binding. As another example, the VCN or a portion thereof may be compared to values in a binding list, and the comparison may result in determining the type of binding associated with the VCN.

At step 1306, based on the VCN binding being a strict binding, the transaction data may be mapped to a transaction source having a transaction source identifier. The transaction data may be provided to source verifier 206E and source verifier 206E may extract information from the transition data to identify the transaction source identifier. The transaction data may be parsed to extract source information such as, but not limited to, a source name, a source identifier, source relationships, or the like.

According to an implementation, the transaction data may be provided to an authorization machine learning model. The authorization machine learning model may be trained to output the transaction source identifier based on the transaction data. The authorization machine learning model may be trained based on historical approved authorizations, historical transaction data, or the like. The authorization machine learning model may receive the transaction data and may break up the transaction data into a plurality of components. The plurality of components may be identified based on breaks in the transaction data, fields associated with the transaction data, delimiters, or the like. The plurality of components may be fed to components of the authorization machine learning model such as one or more nodes, weights, layers, biases, and/or the like. The nodes, weights, layers, biases, and/or the like may be configured (e.g., during training and based on the historical approved authorizations, historical transaction data, etc.) to output a transaction source identifier associated with the transaction data. According to an implementation, the authorization machine learning model may output a confidence score associated with an output transaction source identifier. If the confidence score meets a confidence threshold, then the transaction data may be mapped to the transaction source associated with the transaction source identifier. Accordingly, at step 1306, the transaction data may be used to identify a transaction source associated with the VCN use request received at step 1302.

According to an implementation, the transaction data may be provided to a cache or database 206A. The cache or database 206A may include one or more historical approved authorizations. The historical approved authorizations may include historical transaction data. The cache or database 206A may break up the transaction data into a plurality of components. The plurality of components may be identified based on breaks in the transaction data, fields associated with the transaction data, delimiters, or the like. The transaction data may be mapped to a first historical approved authorization of the one or more historical approved authorizations based on comparing the transaction data and/or the components to the historical transaction data and/or components of the historical transaction data. Based on a successful mapping of the transaction data to a historical transaction data, the transaction source identifier of the mapped historical transaction data may be identified as the transaction source identifier based on the transaction data.

At step 1308, a VCN source identifier for the source associated with the VCN may be identified. The VCN source identifier may be determined based on the VCN, whereas the transaction source identified at step 1306 may be identified based on the transaction data. The VCN source identifier may be determined based on providing the VCN to database 206A. Database 206A may compare the VCN to VCN entries stored at database 206A. The VCN source identifier corresponding to the VCN may be identified based on the VCN entry associated with the VCN.

At step 1310, the VCN source identifier may be compared to the transaction source identifier. The VCN source identifier may be in the same format as the transaction source identifier or, alliteratively, the VCN source identifier may be in a different format than the transaction source identifier. If the VCN source identifier and the transaction source identifier have different formats (e.g., different numbering schemes, different characters or values, etc.), then the VCN source identifier and/or transaction source identifier may be converted into a format such that the VCN source identifier and the transaction source identifier can be compared to each other. The conversion may include applying a transformation, applying a constant, applying an algorithm, or the like.

If the comparison results in a match between the VCN source identifier and the transaction source identifier, then, at step 1312, a determination may be made that the VCN source identifier corresponds to the transaction source identifier. Based on the determination, the source verification may be approved. Accordingly, a match between the transaction source and the VCN source may indicate that the transaction source corresponds to the source for which the VCN use is approved. If the comparison results in a mismatch, then the source verification may output an error and the VCN use request received at step 1302 may be denied.

At step 1314, if the source verification is approved at step 1312, then an approved authorization may be output. The approved authorization may be output based on determining that the VCN source identifier corresponds to the transaction source identifier. The approved authorization may indicate that the VCN received at step 1302 is associated with the source, and that the source is transaction source, as determined based on the transaction data.

Figure 13B:
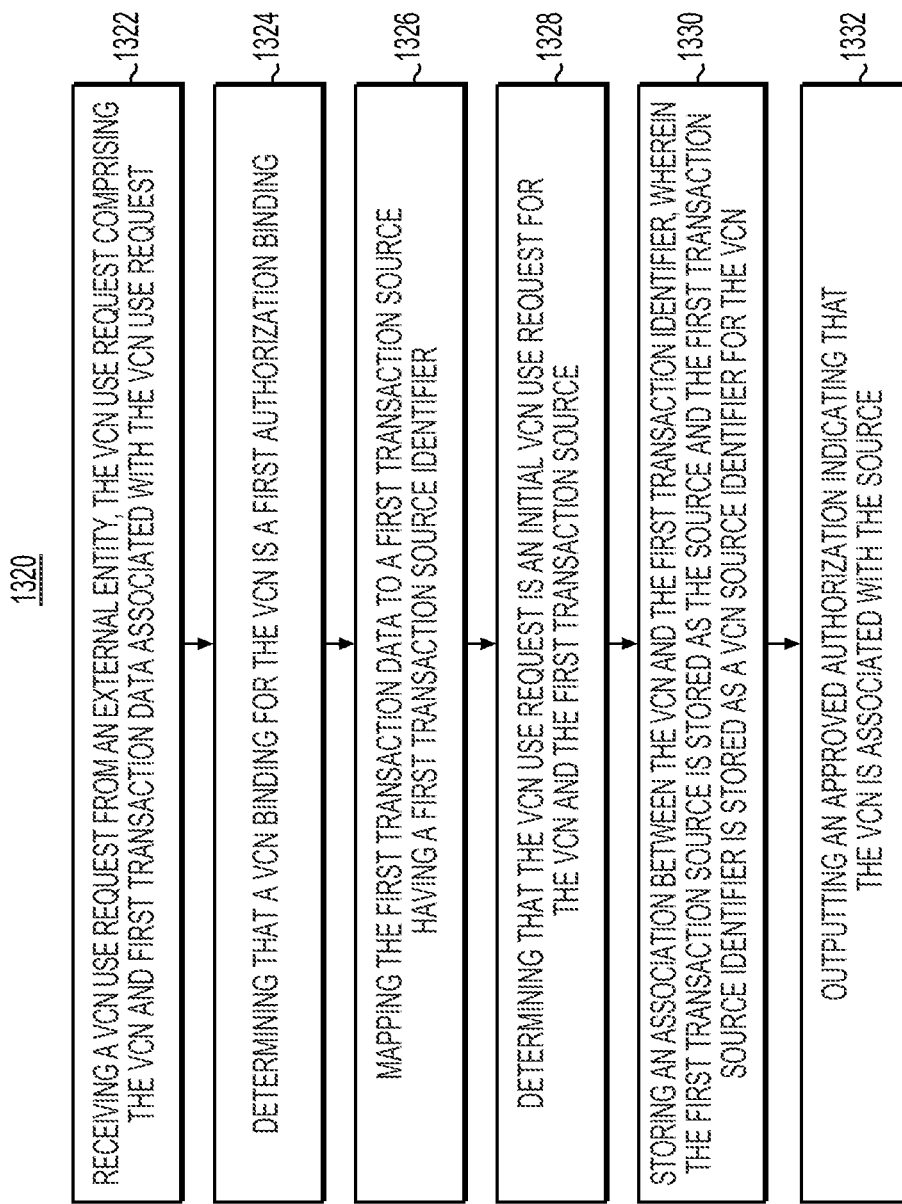
FIG. 13B depicts a flowchart for authorization of a source for VCN use based on a first authorization binding, according to one or more embodiments.

FIG. 13B depicts a flowchart 1320 for authorizing a source for VCN use based on the VCN use request and a first authorization binding. At step 1322, the VCN use request may be received from a source portal (e.g., via an external entity platform 204). The VCN use request may include the VCN and transaction data associated with the VCN use request. The transaction data may be generated by a payment processor such as, but not limited to a certification card processing institution, a banking institution, or the like.

The transaction data may include a transaction identifier generated based on the VCN use being triggered at the transaction source (e.g., the source portal). The transaction identifier may be an encrypted identifier such as a hash value. The transaction identifier may be generated based on source data, transaction information (e.g., product, service, subscription, quantity, etc.). Accordingly, the transaction data and/or transaction identifier may be generated at the time that the VCN use is triggered by the user at the source portal.

At step 1324 of flowchart 1300, a determination may be made that a VCN binding for the VCN is a first authorization binding, as discussed herein. A first authorization binding may be a VCN binding for unqualified sources. Unqualified sources may be known or unknown to secure entity 206 and may be sources that have not been previously qualified, do not meet a qualification threshold, do not meet a volume threshold, and/or do not meet a minimum criteria for information available at database 206A. The binding for the VCN may be determined in accordance with techniques disclosed herein to determine a type of binding for a VCN. For example, the VCN binding for the VCN may be determined to be a first authorization binding based on identifying a first authorization binding identified included in or associated with the VCN.

At step 1326, based on the VCN binding being a first authorization binding, the transaction data may be mapped to a transaction source having a transaction source identifier. The transaction data may be provided to source verifier 206E and source verifier 206E may extract information from the transition data to identify the transaction source identifier. The transaction data may be parsed to extract source information such as, but not limited to, a source name, a source identifier, source relationships, or the like. As disclosed herein, a transaction source identifier for the transaction source may be identified using an authorization machine learning model, a cache mapping, and/or a database mapping.

At step 1328, a determination may be made whether the VCN use request is an initial VCN request for the VCN and the transaction source associated with the identified transition source identifier. This determination may be made based on a database 206A or other applicable database lookup to determine if the VCN was previously used to process a transaction associated with the identified transaction source.

If it is determined that the VCN use request is not an initial VCN use request for the VCN and the transaction source (e.g., if a prior VCN use request exists), then the transaction source may be designated as the source associated with the VCN and an approved authorization in response to the VCN use request received at step 1322 may be output. Accordingly, if the binding type for the VCN is a first authorization binding, then, based on a prior authorization of the transaction source for VCN use with the VCN, a subsequent VCN use request by the same transaction source may be approved.

If it is determined that the VCN use request is an initial VCN use request, then an association between the VCN and the transaction source identifier may be made. At step 1330, the association may be stored at a secure entity 206 database (e.g., database 206A or a source verification database). The association may designate the transaction source as the source associated with the VCN and the transaction source identifier or an identifier based on the transaction source identifier may be stored as the VCN source identifier for the VCN. Accordingly, for VCNs having a first authorization binding, a source may be associated with the VCN upon receiving a VCN use request. The transaction data included in the VCN use request may be used to associate a source with the VCN. At step 1332, an approved authorization indicating that the VCN is associated with the source (e.g., the transaction source) may be output.

According to an implementation, after the initial VCN use request, a subsequent VCN use request including the same VCN received at step 1322 may be received. The subsequent VCN use request may include subsequent transaction data based on a subsequent source that triggers the subsequent VCN request. A determination may be made that the VCN binding for the same VCN is the first authorization binding. The subsequent transaction data may be mapped to a subsequent transaction source identified (e.g., based on an overlap between at least a first portion of the second transaction data and the initial transaction data, as further discussed herein).

A VCN source identifier associated with the VCN may be identified. The VCN source identifier may be identified based on the association at step 1330 designating the transaction source from the initial VCN use request as the source associated with the VCN. Accordingly, the transaction source from the initial VCN use request may be identified as the VCN source identifier. The VCN source identifier may be compared to the subsequent transaction source identifier. A determination may be made whether the subsequent transaction source identifier corresponds to the VNC source identifier. If the subsequent transaction source identifier is the same as the initial transaction source identifier, then the determination may result in a match. Accordingly, if the subsequent VCN request is triggered by the same source as the initial VCN request at step 1322, then the subsequent transaction source identifier would be the same as the initial transaction source identifier and a match may be determined. If, however, the subsequent VCN request is triggered by a different source than the initial transaction source, then a mismatch may be determined.

If a match between the VCN source identifier and the subsequent transaction source identifier, then the source verification for the subsequent transaction source for the subsequent VCN use request may be approved. Accordingly, a match between the subsequent transaction source and the VCN source may indicate that the subsequent transaction source corresponds to the initial source for which VCN use is approved. An approved authorization may be output, based on the match, and may indicate that the VCN received in the subsequent VCN use request is associated with the subsequent transaction source. If a mismatch is determined, then the source verification may output an error and the subsequent VCN use request may be denied.

Based on an approved authorization, secure entity 206 may authorize the corresponding VCN use. The VCN use authorization provided by secure entity 206 may be one authorization in a group of authorizations needed to complete the transaction at the source. Based on the approved authorization output at step 1314 or based on the subsequent VCN use, the PAN associated with the VCN and/or an indication of the PAN (e.g., the associated certification mechanism identifier) may be output to a transaction processor. The transaction processor may authorize completion of the transaction initiated at the source portal. One or more risk analyses and/or fraud lock checks discussed herein may also be performed, and completion of the transaction initiated at the source portal may further be authorized based on the risk analyses and/or fraud lock checks.

Figure 14:
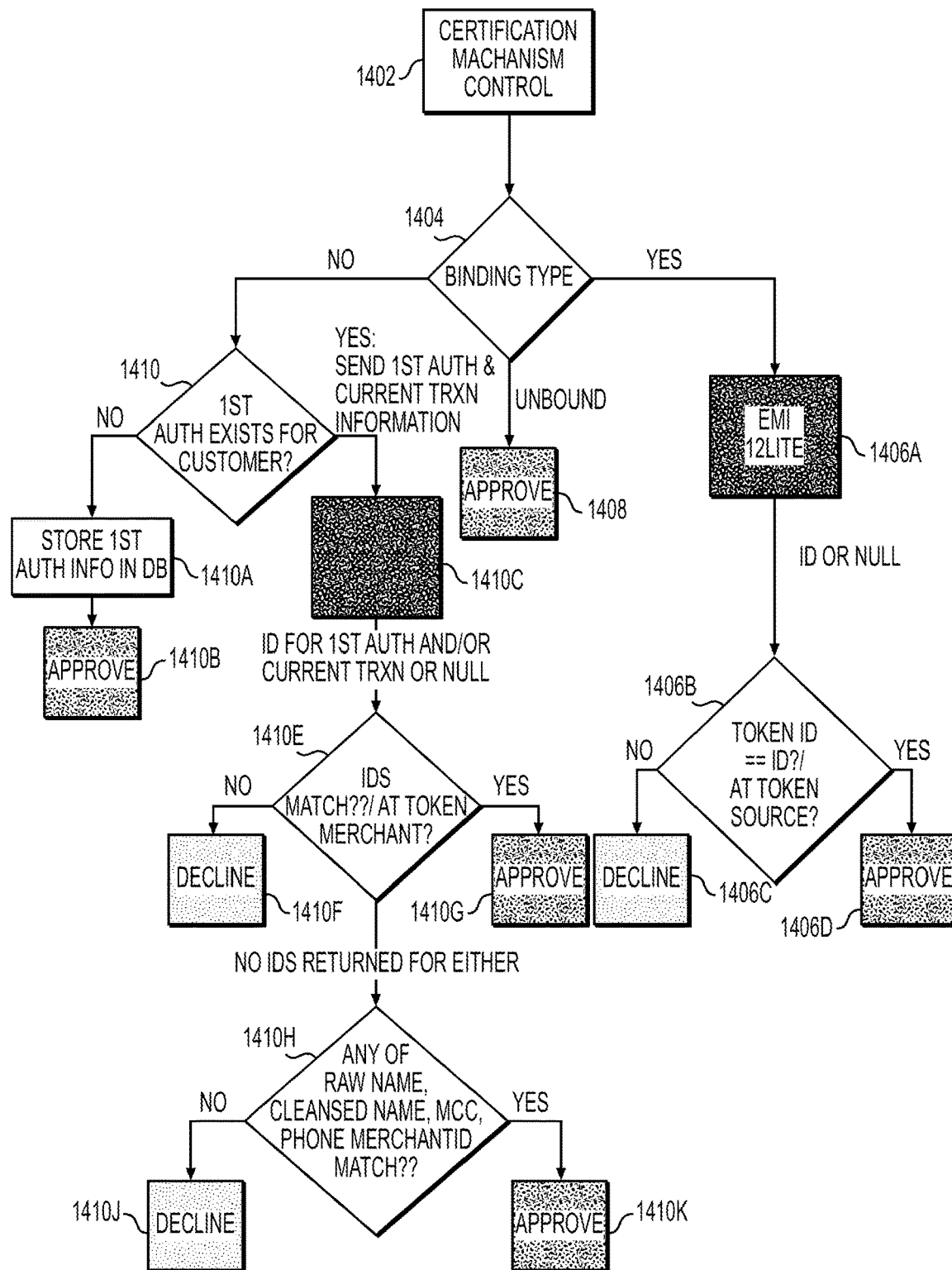
FIG. 14 depicts a dataflow for authorization of a source for VCN use, according to one or more embodiments.

FIG. 14 depicts a dataflow 1400 for authorizing VCN use based on determining if a source corresponds to a VCN. At step 1402, a certification mechanism control module may receive a request for authorizing a source for VCN use for a VCN. The request may include transaction data such as, but not limited to a source name, a source identifier, a location, account information, token information, source information, domain information, application information, and the like.

At step 1404, a binding type associated with the VCN received at step 1402 may be determined, as disclosed herein. The binding type may be a strict binding, a first authorization binding, or an unbound binding. According to an implementation, identifying a binding type may indicate a strict binding and the lack of a binding type may indicate a first authorization binding or an unbound binding.

If a strict binding is determined at step 1404, then, at 1406A, a transaction source identifier may be determined, in accordance with the techniques disclosed herein. At step 1406B, the transaction source identifier may be compared to a VCN source identifier associated with the VCN, as disclosed herein. If the transaction source identifier matches the VCN source identifier, then an approved authorization indicating that the VCN source of the VCN use request corresponds to the transaction source associated with the VCN use request may be output at 1406D. If the transaction source identifier does not match the VCN source identifier, then the VCN use request may be declined at 1406C.

If an unbound binding is determined at step 1404, then, at 1408, an approved authorization indicating that the VCN source of the VCN use request corresponds to the transaction source associated with the VCN use request may be output. At step 1408, the VCN may be associated with the transaction source associated with the VCN use request.

If a first authorization binding is determined at step 1404, then, at 1410, a determination may be made whether the VCN and transaction data associated with the VCN use request is an initial (e.g., a first) VCN use request for the VCN and the transaction data. If the VCN use request is determined to be a first VCN use request for the VCN and transaction data, then, at step 1410A, the VCN may be associated with the transaction data and the first authorization binding may be stored at a database (e.g., database 206A or a source verification database). At step 1410B, an approved authorization indicating that a VCN source of the VCN use request corresponds to the transaction source associated with the VCN use request may be output. Accordingly, for subsequent VCN use requests for the VCN associated with the first authorization binding and the transaction data, the stored transaction data and associated source may be used to approve such subsequent VCN use requests.

If the VCN use request is determined to be a subsequent VCN use request for the VCN and transaction data at step 1410, then, at 1410C, a determination may be made whether a VCN source identifier exists for the source associated with the initial VCN use request. If a VCN source identifier exits, then a match between the VCN source identifier and a transaction source identifier may be determined, in accordance with the techniques disclosed herein. If, at step 1410E, the transaction source identifier matches the VCN source identifier (e.g., as determined during an initial VCN use request), then an approved authorization indicating that the VCN source of the VCN use request corresponds to the transaction source associated with the VCN use request may be output at 1410G. If the transaction source identifier does not match the VCN source identifier (e.g., as determined during an initial VCN use request), then the VCN use request may be declined at 1410F.

According to an implementation, if, at step 1410E, it is determined that no source identifier for the VCN exists, then initial transaction data stored during an initial VCN use request may be compared to the subsequent transaction data at 1410H. If the subsequent transaction data matches the initial transaction data, then an approved authorization indicating that the VCN source of the initial VCN use request corresponds to the subsequent transaction source associated with the subsequent VCN use request may be output at 1410K. If the subsequent transaction data does not match the initial transaction data, then then the VCN use request may be declined at 1410J.

Figure 15:
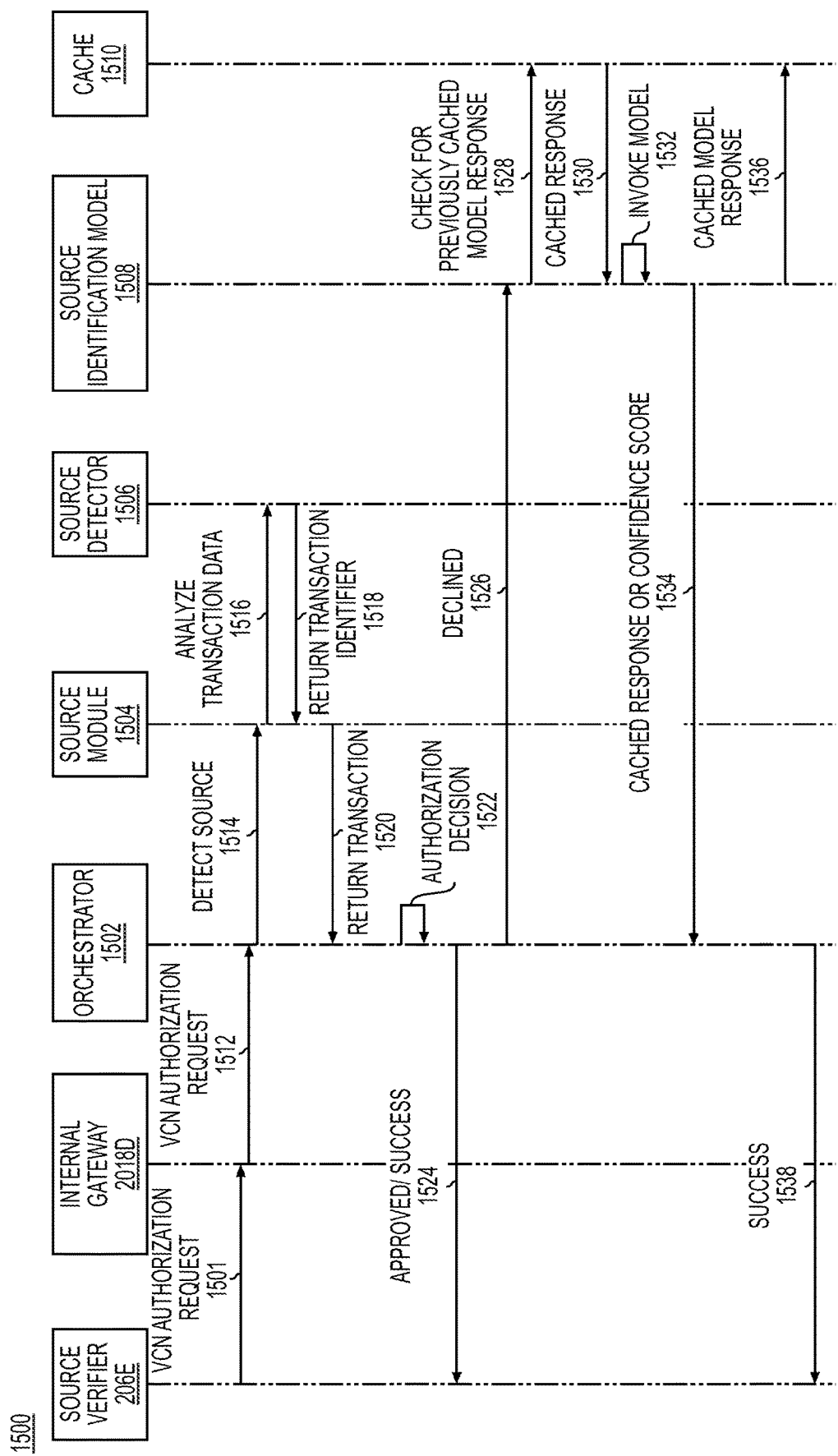
FIG. 15 depicts another dataflow for authorization of a source for VCN use, according to one or more embodiments.

FIG. 15 depicts a dataflow 1500 for authorizing VCN use based on determining if a source corresponds to a VCN. At step 1501, source verifier 206E may submit a VCN authorization request via internal gateway 2018D which may forward the request to an orchestrator 1502 at step 1512. The VCN authorization request may include the VCN and transaction data, as disclosed herein. Orchestrator 1502 may submit a request to detect a source associate with the transaction data to a source module 1504, at step 1514. At step 1516, source detector 1506 may receive a request to analyze transaction data. Source detector 1506 may analyze the transaction data to identify a transaction source identifier associated with the transaction data, as disclosed herein. At step 1518, the transaction source identifier may be provided to the source module 1504 which may transmit the transaction source identifier to orchestrator 1502, at step 1520. At step 1522, orchestrator 1502 may compare the transaction source identifier to a source identifier associated with the VCN, as disclosed herein. If the comparison results in a match at step 1522, then an approved authorization indicating that the VCN source of the VCN authorization request corresponds to the transaction source associated with the transaction data may be output at step 1524.

If, at step 1522, the comparison does not result in a match, then a declined indication and the VCN authorization request may be submitted to source identification model 1508 and/or directly to cache 1510, at step 1526. Alternatively, the source identification model 1508 may submit the VCN authorization request to the cache 1510, at step 1528. Cache 1510 may compare the VCN authorization request to historical VCN authorization request and/or historical transactions, as disclosed herein. At step 1530, if a match between a historical authorization request and/or a historical transaction is identified at cache 1510, then an approved cache response may be output by cache 1510. The approved cache response may be submitted to the orchestrator 1502 at step 1534, which may output an approved authorization indicating that the VCN source of the VCN authorization request corresponds to the transaction source associated with the transaction data. If no match is identified at cache 1510, then a denial cache response may be submitted to the orchestrator 1502 at step 1534.

According to an implementation, if no match between a historical authorization request and/or a historical transaction is identified at cache 1510 at step 1530, then the denial cache response may be output to source identification model 1508. The source identification model 1508 may be a machine learning model trained to determine if a transaction source associated with transaction data corresponds to a VCN source. The machine learning model may be a deep learning model trained using supervised training techniques disclosed herein. The machine learning model may be trained based on historical VCN authorization requests and/or historical transactions. According to an implementation, the machine learning model may be trained to determine if a transaction source corresponds a source associated with first authorization, as discussed herein. For example, the VCN may have a first authentication binding source and an initial VCN use request may result in associating an initial transaction source as the VCN source for the given VCN, as discussed herein. The machine learning model may be trained using a character embedding step, may be trained to compare block inputs (e.g., components of transaction data) to VCN source information and/or first authentication source inputs, an attention transformer, one or more dense layers, or the like. The machine learning model may be configured to generate a confidence score based on determining whether components of transaction data match with components of source data for VCN source or first authorization source. At step 1532, the VCN, transaction source identifier, transaction data, transaction location, device location, and/or source identifier may be input into the source identification model 1508.

The source identification model 1508 may output a confidence score indicating a level of confidence that the transaction source determined based on the transaction data is associated with the VCN source. At step 1534, the confidence score may be provided to orchestrator 1502. Orchestrator 1502 may determine if the confidence score meets a confidence threshold. If the confidence score meets the confidence threshold, then, at step 1538, orchestrator 1502 may output an approved authorization indicating that the VCN source of the VCN authorization request corresponds to the transaction source associated with the transaction data. At step 1536, the model response (e.g., confidence score) generated at step 1532 may be cached at cache 1510.

According to an implementation of the disclosed subject matter, external entity 202 may receive authorization data from secure entity 206. External entity 202 may receive authorization data based on transactions authorized using a VCN, as disclose herein. External entity 202 may receive the authorization data for transactions authorized for VCN use via external entity platform 204. For example, a user may access a source portal via an external entity platform 204. The user may initiate a transaction at the source portal using a VCN, where the user and/or PAN associated with the VCN is registered for VCN use. The VCN use may be approved, as disclosed herein, based on one or more of a source verification, a risk analysis, a fraud lock verification, or the like.

Based on a transaction authorized based on the approved VCN use at the source, authorization data for the transaction may be generated. The user may have access to the authorization data via secure entity portal 206C or external entity portal 202C. Access to the authorization data via external entity portal 202C may be based on providing applicable authorization data from secure entity 202 to external entity portal 202C.

Figure 16:
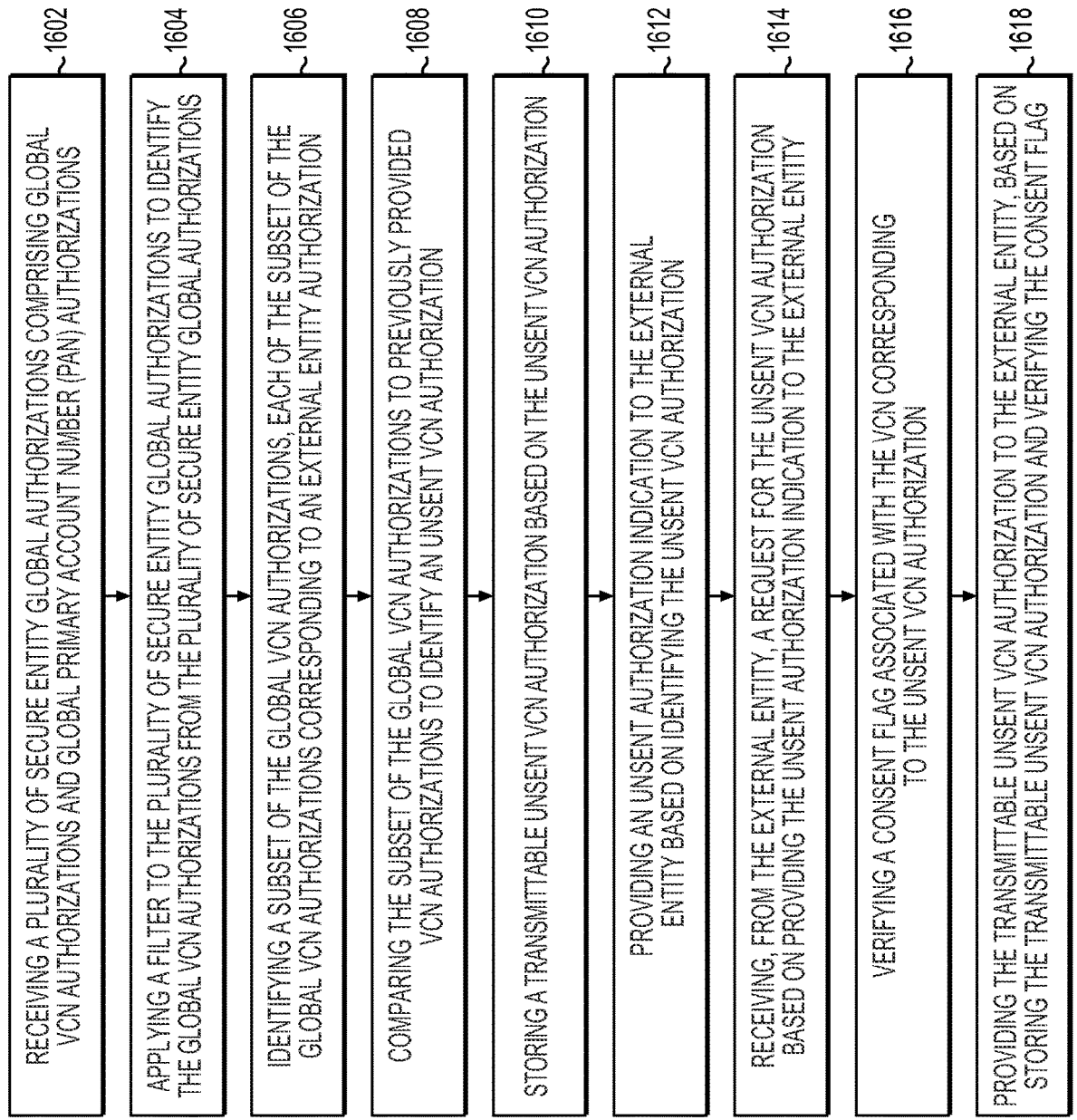
FIG. 16 depicts a flowchart for transmitting VCN authorizations, according to one or more embodiments.

FIG. 16 depicts a flowchart 1600 for providing VCN authorizations to external entity 202. At step 1602, a distributed event streaming platform associated with secure entity 206 may receive a plurality of secure entity global authorizations. The plurality of secure entity global authorizations may include authorizations associated with secure entity 206 including, but not limited to, VCN authorizations (e.g., related to transactions authorized based on VCN use), PAN authorizations (e.g., related to transactions authorized without VCN use), or the like.

A distributed event streaming platform may an open-source or closed-source distributed event store and/or stream processing platform. The distributed event streaming platform may be a unified, high-throughput, low-latency platform for handling real-time data feeds. The distributed event streaming platform may connect to a secure entity 206 system for providing authorization data from secure entity global transactions. The distributed event streaming platform may provide the authorization data in real-time or real-time (e.g., within approximately ten seconds) from authorization data being generated based on respective transaction authorizations.

Each of the plurality of secure entity global authorizations may either correspond to external entity 202 authorizations or non-external entity authorizations. Non-external entity authorizations may corresponds to transactions authorized outside external entity platform 204. For example, external entity 202 authorizations may be transactions conducted using web platform 204A or via a source application accessed using operating system 204B.

External entity 202 authorizations may be identified based on an external entity authorization flag associated with a subset of the plurality of secure entity global authorizations that are external entity 202 authorizations. Alternatively, a VCN associated with a secure entity global authorization may be determined. A VCN entry corresponding to the VCN may be identified, at a secure entity database. An external entity data field such as a data field that includes a value corresponding to external entity 202 may be identified. Accordingly, a secure entity global authorizations may be identified as an external entity 202 authorization based on identifying the external entity data field.

At step 1604, a filter may be applied to the plurality of secure entity global authorizations to identify the global VCN authorizations from the plurality of secure entity global authorizations. The global VCN authorizations may correspond to transactions authorized based on VCN use. These authorizations may be distinct from PAN authorizations for transactions authorized without VCN use. The filter may be configured to identify global VCN authorizations based on a VCN marker associated with each of the global VCN authorizations. The VCN marker may be a portion of a VCN associated with a respective global VCN authorization. Alternatively, or in addition, the VCN marker may be identified based on a database 206A lookup of VCNs (e.g., VCN entries at the database). It will be understood that a filter may be a VCN marker lookup such that the result of applying the filter may exclude non-VCN.

At step 1606, a subset of the global VCN authorizations may be identified. The subset of the global VCN authorizations may correspond to external entity authorizations, which may be identified as discussed herein. Accordingly, the subset of the global VCN authorizations may be the secure entity global authorizations that are associated with both VCN use and are associated with external entity 202.

At step 1608, the subset of the global VCN authorizations may be compared to previously provided VCN authorizations, to identify one or more unsent VCN authorization. The unsent VCN authorizations may VCN authorizations associated with external entity 202 that may be not be previously provided to external entity 202. For example, an unsent VCN authorization may be a new VCN authorization received at step 1602 that was received at secure entity 206 after a previous transfer of VCN authorizations to external entity 202. The comparison may be conducted by comparing a log of previously sent VCN authorizations to the subset of the global VCN authorizations.

At step 1610, one or more transmittable unsent VCN authorizations may be stored based on the one or more unsent VCN authorizations. A transmittable unsent VCN authorization may be generated based on stripping one or more data fields associated with an unsent VCN authorization to generate the transmittable unsent VCN authorization. The striping may be implemented by identifying one or more external entity data from an unsent VCN authorization. External entity data may be one or more fields of a VCN authorization to be sent to external entity 202 and removing all other fields of the unsent VCN authorization to generate the transmittable unsent VCN authorization. The one or more fields may be identified based on external entity 202 preferences, user preferences (e.g., as may be associated with a VCN corresponding to an unsent VCN authorization), a risk analysis, or the like. The stripping may be implemented by creating an empty transmittable unsent VCN authorization and populating the transmittable unsent VCN authorization with the one or more identified fields. The one or more transmittable unsent VCN authorizations may be stored at a secure entity 206 database (e.g. database 206A) accessible by an external serverless function, as further discussed herein.

At step 1612, an unsent authorization indication may be sent from secure entity 206 to external entity 202. The unsent authorization indication may include an external request code or VCN associated with each unsent VCN authorization identified at step 1608. Accordingly, external entity 202 may receive the unsent authorization indication and may determine which external entity 202 user accounts have unsent authorizations pending at secure entity 206. According to an implementation, a consent flag associated with transmission of VCN authorizations may be verified, prior to transmitting the unsent authorization indication to external entity 202. Consent flags may be retrieved from a consent API on a per VCN basis, such that each VCN associated with a respective unsent authorization indication may have a corresponding consent flag. If an applicable consent flag is identified, then the unsent authorization indication may include an indication of the VCN or external request code associated with the consent flag. If a consent flag is not identified or is marked as revoked, then an unsent authorization indication associated with the not identified or revoked VCN may not be provided to external entity 202.

At step 1614, a request for the one or more unsent VCN authorizations may be received at secure entity 206, from external entity 202. The request may be received at an external serverless function in communication with external entity 202. The request may be a request for all unsent VCN authorizations or may be targeted requests for unsent VCN authorizations associated with given VCNs and/or given external request codes.

At step 1616, a consent flag (e.g., the consent flag discussed in reference to step 1612) associated with transmission of VCN authorizations may be verified, prior to providing a transmittable unsent authorization to external entity 202 at step 1618. Consent flags may be retrieved from a consent API on a per VCN basis, such that each VCN associated with a respective transmittable unsent authorization may have a corresponding consent flag. If an applicable consent flag is identified, then the corresponding transmittable unsent authorization may be provided to external entity 202 via an external serverless function. If a consent flag is not identified or is marked as revoked, then a transmittable unsent authorization associated with the not identified or revoked VCN may not be provided to external entity 202. Accordingly, at step 1618, one or more transmittable unsent VCN authorizations may be provided to the external entity, based on storing a respective transmittable unsent VCN authorization at step 1610 and verifying the consent flag at step 1616.

Figure 17:
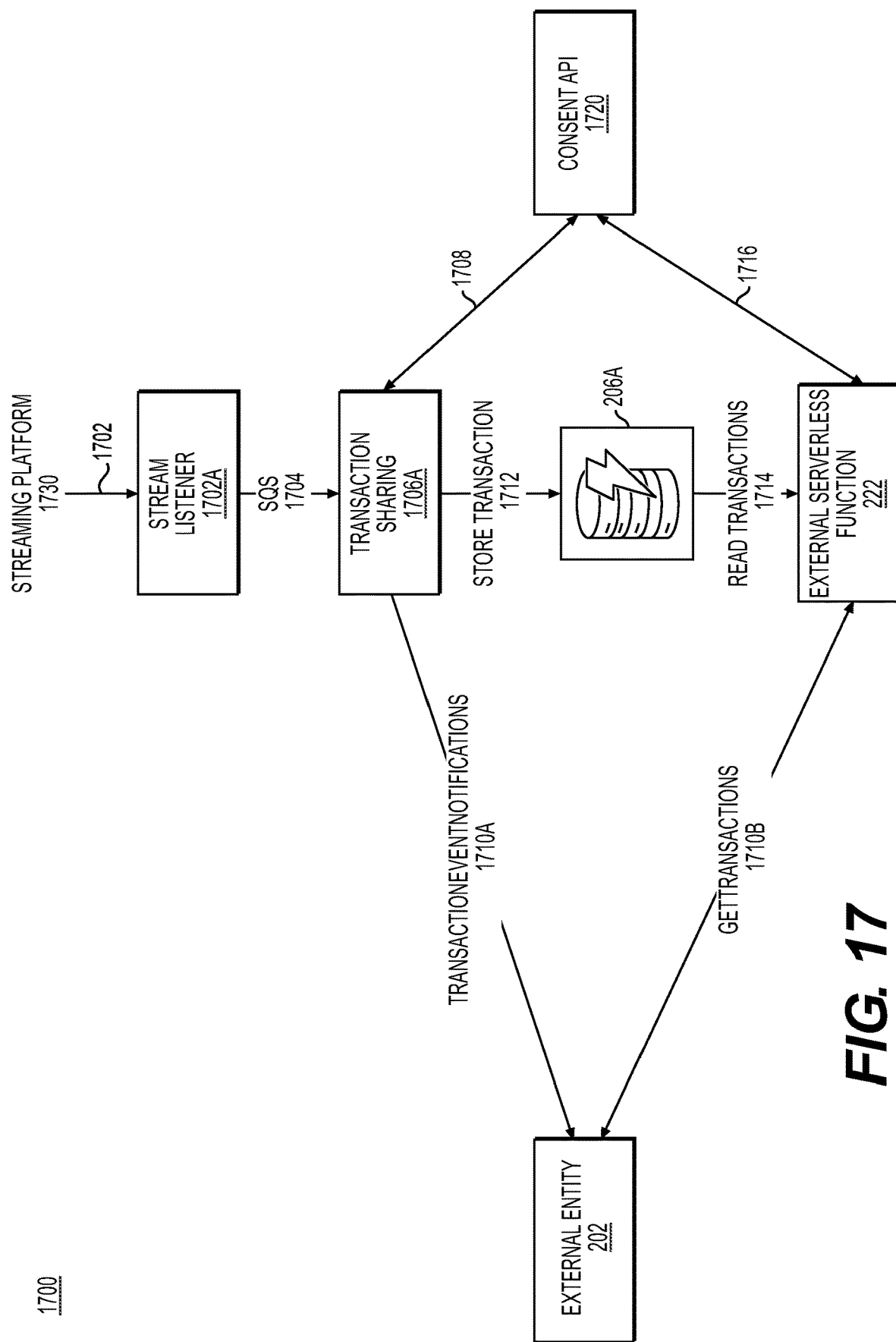
FIG. 17 depicts a flow diagram for transmitting VCN authorizations, according to one or more embodiments.

FIG. 17 depicts a dataflow 1700 for providing VCN authorizations to external entity 202. At 1702, a distributed event streaming platform 1730 may provide a plurality of secure entity global authorizations including global VCN authorizations and global PAN authorizations, as discussed at step 1602 of flowchart 1600. Each of the plurality of secure entity global authorizations may be an external entity authorization or a non-external entity authorization. Accordingly each of the plurality of secure entity global authorizations may correspond to external entity 202 (e.g., may be triggered using an external entity platform 204 or external entity portal 202C, may be associated with an external request code, etc.) or may not correspond to external entity 202. The plurality of secure entity global authorizations may be received at stream listener 1702A. Stream listener 1702A may be configured to receive the plurality of secure entity global authorizations including the global VCN authorizations and global PAN authorizations. Stream listener 1702A or other applicable component may be configured to apply a filter to the plurality of secure entity global authorizations to identify the global VCN authorizations from the plurality of secure entity global authorizations, as discussed at step 1604 of flowchart 1600. It will be understood that the filter may be applied using any applicable technique that extracts the global VCN authorizations from the plurality of secure entity global authorizations. The filter may be applied based on an algorithm, based on code or instructions to extract or retain authorizations based on criteria, or the like.

Stream listener 1702A or other applicable component may further identify a subset of the global VCN authorizations corresponding to an external entity authorization. A global VCN authorization may be identified as an external entity authorization based on techniques discussed in reference to steps 1602-1606 of flowchart 1600.

At step 1704, a query service may be used to transmit the subset of the global VCN authorizations, corresponding to external entity authorizations, to transaction sharing component 1706A. Transaction sharing component 1706A may be configured to compare the subset of the global VCN authorizations to VCN authorizations that were previously provided to external entity 202. Based on the comparison, one or more unsent VCN authorizations may be identified. For example, transaction sharing component 1706A may compare a log of previously provided transmittable VCN authorizations to the subset of the global VCN authorizations to determine which VCN authorizations have not previously been provided to external entity 202.

Transaction sharing component 1706A may generate one or more transmittable unsent VCN authorizations, based on the identified unsent VCN authorization. The transmittable unsent VCN authorizations may be stripped versions of the unsent VCN authorizations, as discussed herein. At step 1712, transaction sharing component 1706A may provide the transmittable unsent VCN authorizations to database 206A or any other applicable database associated with secure entity 206.

Additionally, at step 1710A, transaction sharing component 1706A may generate and/or provide an unsent authorization indication to external entity 202, based on identifying the unsent VCN authorizations. According to an implementation, at step 1708, a consent API 1720 may be accessed to determine whether one or more VCNs associated with the one or more unsent authorization indications have a corresponding consent to provide authorizations to external entity 202 (e.g., a consent provided by a user associated with a respective VCN, where the consent provides approval to transmit authorizations associated with that VCN to external entity 202).

At step 1710B, external entity 202 may request for the unsent VCN authorizations received at step 1710A. External entity 202 may request all unsent VCN authorizations for all VCNs, or may batch request VCN authorizations by given VCNs, as discussed herein. External serverless function 222 may receive the request for the unsent VCN authorizations and, as discussed at step 1616 of flowchart 1600, at step 1716, external serverless function 222 may access or communicate with consent API 1720 to determine whether one or more VCNs associated with the one or more unsent authorization indications have a corresponding consent to provide authorizations to external entity 202. The consent verification by external serverless function 222 may be in addition or as an alternative to the consent discussed in reference to transaction sharing component 1706A. For example, transaction sharing component 1706A may confirm consent at a first time (e.g., when unsent VCN authorizations are identified) and external serverless function 222 may confirm consent at a second time (e.g., when unsent VCN authorizations are requested).

At step 1714, external serverless function 222 may receive the transmittable unsent VCN authorizations corresponding to the unsent VCN authorizations requested at step 1710B. The transmittable unsent VCN authorizations may be provided to external entity 202.

According to an implementation of the disclosed subject matter, a VCN authorization may correspond to an approved VCN transaction approved at secure entity 206. A post authorization may be associated with an approved VCN transaction. A post authorization may be issued by a certification mechanism processor or other entity that facilitates a transaction to charge a user. The post authorization may correspond to a purchase or other transaction activity such as a return. The post authorization may be provided to secure entity 206, (e.g., to distributed event streaming platform 1730).

One or more post authorizations may be provided to external entity 202 in a manner similar to providing a VCN authorization, as discussed in FIGS. 16 and 17 herein. For example, a transmittable post authorization may be stored at database 206A. An unsent post authorization indication may be sent to external entity 202, based on receiving the post authorization at transaction sharing component 1706A. External entity 202 may request the post authorization. A post consent flag associated with the VCN corresponding to the post authorization may be verified and the transmittable post authorization may be provided to external entity 202.

According to implementations of the disclosed subject matter, the request for unsent VCN authorizations from external entity 202, at steps 1614 of flowchart 1600 and/or step 17106 of dataflow 1700, may be received using pretty good privacy (PGP) encryption. PGP encryption may use a public key system in which each entity (e.g., external entity 202, secure entity 206, etc.) may have a unique encryption key known publicly and a private key known by the respective entity. The request for unsent VCN authorizations may be encrypted when external entity 202 sends the request to secure entity 206 using an external entity 202 public key. Secure entity 206 may decrypt the request using a secure entity 206 private key.

According to implementations of the disclosed subject matter, the request for unsent VCN authorizations from external entity 202 may be sent using an OAuth protocol. An OAuth protocol may use a standard for access delegation to permit secure entity 206 to share the transmittable unsent VCN authorizations with external entity 202. The OAuth protocol may provide external entity 202 a secure delegated access to external serverless function 222, on behalf of secure entity 206. The OAuth protocol may specify a process for secure entity 206 to authorize external entity 202 access to external serverless function 222, without providing credentials.

Figure 18:
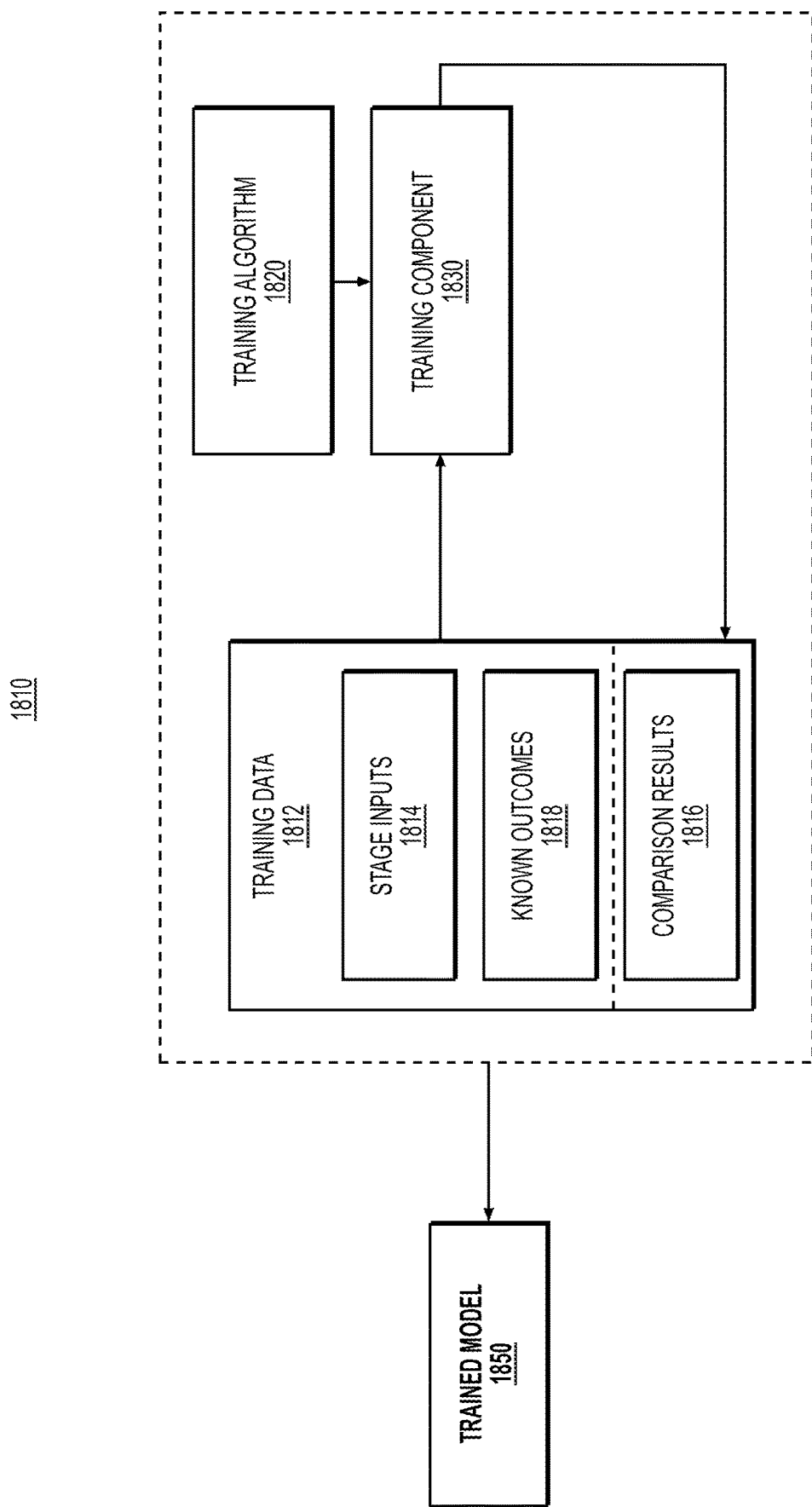
FIG. 18 depicts a flow diagram for training a machine learning model, according to one or more embodiments.

As disclosed herein, one or more implementations disclosed herein may be applied by using a machine learning model. A machine learning model as disclosed herein may be trained using one or more components or steps of FIGS. 1-17. As shown in flow diagram 1810 of FIG. 18, training data 1812 may include one or more of stage inputs 1814 and known outcomes 1818 related to a machine learning model to be trained. The stage inputs 1814 may be from any applicable source including a component or set shown in the figures provided herein. The known outcomes 1818 may be included for machine learning models generated based on supervised or semi-supervised training. An unsupervised machine learning model might not be trained using known outcomes 1818. Known outcomes 1818 may include known or desired outputs for future inputs similar to or in the same category as stage inputs 1814 that do not have corresponding known outputs.

The training data 1812 and a training algorithm 1820 may be provided to a training component 1830 that may apply the training data 1812 to the training algorithm 1820 to generate a trained machine learning model 1850. According to an implementation, the training component 1830 may be provided comparison results 1816 that compare a previous output of the corresponding machine learning model to apply the previous result to re-train the machine learning model. The comparison results 1816 may be used by the training component 1830 to update the corresponding machine learning model. The training algorithm 1820 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flowchart 1800 may be a trained machine learning model 1850.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously update based on feedback associated with use or implementation of the machine learning model outputs.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 19:
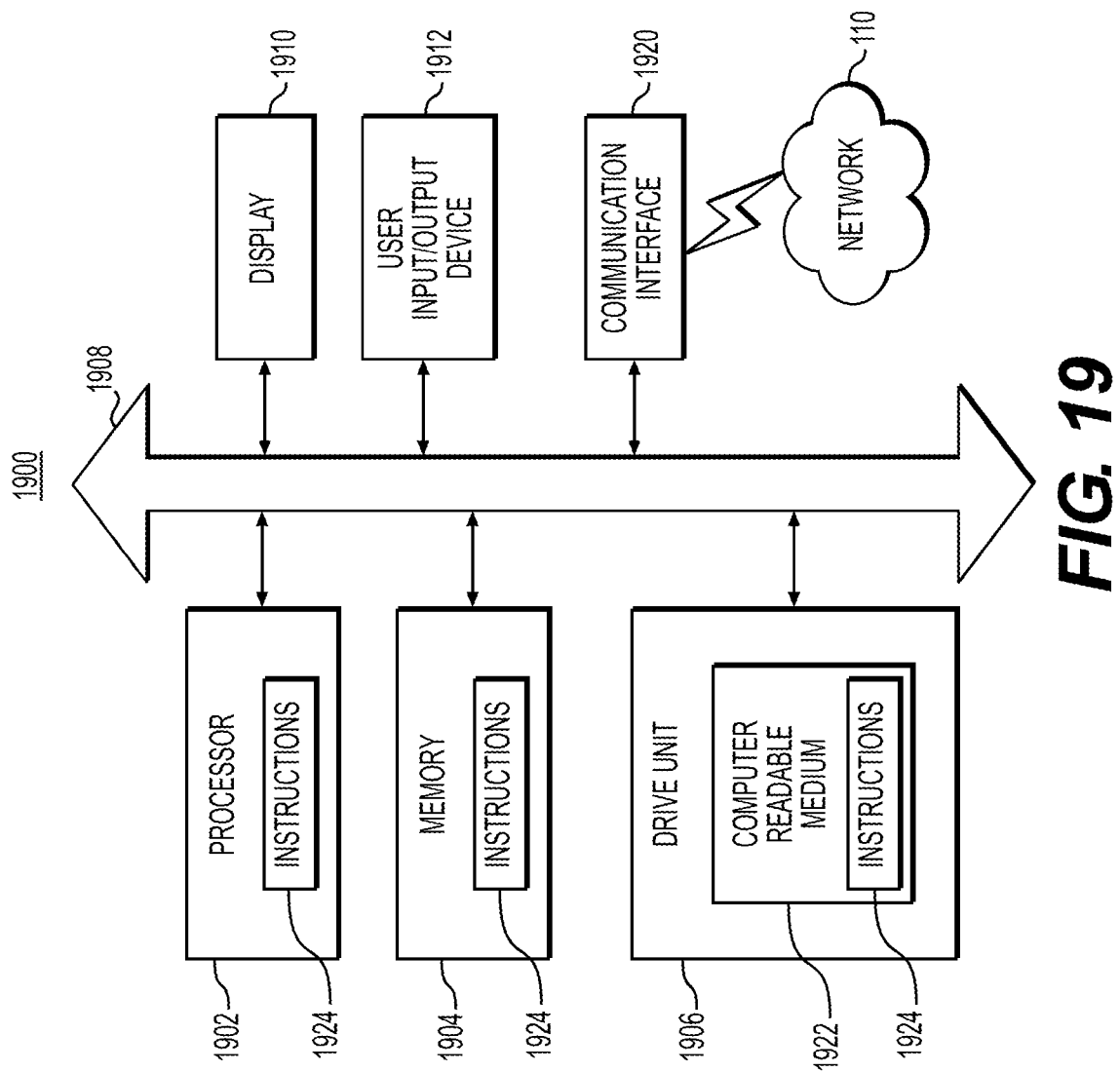
FIG. 19 depicts an example of a computing device, according to one or more embodiments.

FIG. 19 is a simplified functional block diagram of a computer 1900 that may be configured as a device for executing the methods disclosed here, according to exemplary embodiments of the present disclosure. For example, the computer 1900 may be configured as a system according to exemplary embodiments of this disclosure. In various embodiments, any of the systems herein may be a computer 1900 including, for example, a data communication interface 1920 for packet data communication. The computer 1900 also may include a central processing unit ("CPU") 1902, in the form of one or more processors, for executing program instructions. The computer 1900 may include an internal communication bus 1908, and a storage unit 1906 (such as ROM, HDD, SDD, etc.) that may store data on a computer readable medium 1922, although the computer 1900 may receive programming and data via network communications. The computer 1900 may also have a memory 1904 (such as RAM) storing instructions 1924 for executing techniques presented herein, although the instructions 1924 may be stored temporarily or permanently within other modules of computer 1900 (e.g., processor 1902 and/or computer readable medium 1922). The computer 1900 also may include input and output ports 1912 and/or a display 1910 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for registering use of virtual certification numbers (VCNs) for a primary account number (PAN) at a secure entity, the method comprising:
   receiving, at an external gateway, a registration request comprising an external request code and the PAN, wherein the external request code is generated at and provided by an external entity and is unique to the secure entity, the registration request being a request to register use of VCNs for the PAN at the secure entity;
   receiving, by a registration endpoint, a tokenized PAN based on the PAN;
   identifying, at a certification mechanism tools module, a secure entity account identifier by:
     applying the tokenized PAN to a certification mechanism tool application programing interface (API);
     converting the tokenized PAN into a secure entity readable format without extracting the PAN from the tokenized PAN;
     comparing the tokenized PAN converted into the secure entity readable format to a plurality of known secure entity account identifiers; and
     identifying the secure entity account identifier that matches the tokenized PAN converted into the secure entity readable format based on the comparing;
   generating, at the certification mechanism tools module, a certification mechanism reference identifier by encrypting a certification mechanism identifier associated with the identified secure entity account identifier and the tokenized PAN;
   associating the certification mechanism reference identifier with the external request code by updating a database;
   generating a registration authentication for the external request code in response to receiving the registration request and to associating the certification mechanism reference identifier with the external request code;
   receiving a first VCN request to generate a first VCN corresponding to only a first source portal, the first VCN request comprising a first external request code and a first source portal identifier associated with the first source portal;
   in response to receiving the first VCN request, determining that the first external request code matches the external request code having the registration authentication;
   in response to determining that the first external request code matches the external request code, generating the first VCN based on the first source portal identifier;
   receiving a second VCN request to generate a second VCN corresponding to only a second source portal, the second VCN request comprising a second external request code and a second source portal identifier associated with the second source portal;
   in response to receiving the second VCN request, determining that the second external request code is unregistered for VCN use; and
   in response to determining that the second external request code is unregistered for VCN use, rejecting the second VCN request.

2. The method of claim 1, further comprising receiving a plurality of external risk signals.

3. The method of claim 2, wherein the external risk signals comprise one or more of an internet protocol (IP) address, a location, or a user device identifier.

4. The method of claim 2, further comprising mapping the plurality of external risk signals to an internal risk module.

5. The method of claim 4, further comprising:
   conducting a risk analysis based on mapping the plurality of external risk signals to the internal risk module; and
   generating the certification mechanism reference identifier further based on the risk analysis.

6. The method of claim 1, further comprising:
   receiving a consent version and a consent timestamp; and
   receiving the tokenized PAN further based on receiving the consent version and the consent timestamp.

7. The method of claim 1, wherein the registration request is generated based on a user input received at an external portal, wherein the external request code is generated based on the user input received at the external portal.

8. The method of claim 1, further comprising determining that an account associated with the PAN is authorized for the registering use of the VCN by:
   determining an authentication match by comparing at least a portion of the PAN to an authorized group of entries, wherein the authentication match is determined when the portion of the PAN overlaps with at least one entry of the authorized group of entries;
   receiving a profile status based on account identifier, wherein the profile status meets a fraud threshold; and
   determining that the account associated with the PAN is authorized for the registering use of the VCN based on each of the determining the authentication match and receiving the profile status that meets the fraud threshold.

9. The method of claim 1, further comprising:
   receiving a deregistration request comprising at least one of the PAN or the VCN;
   decrypting at least a portion of the deregistration request to identify the certification mechanism reference identifier; and
   modifying the database to enable a deregistration flag associated with the certification mechanism reference identifier.

10. The method of claim 1, further comprising automatically deregistering the VCN based on at least one of a duration of time, an event, or a risk trigger.

11. The method of claim 10, wherein the duration of time is based on one of the updating the database to associate the certification mechanism reference identifier with the external request code, a last VCN use, a first VCN use, or a predetermined time.

12. The method of claim 1, further comprising:
   receiving a rule associated with the VCN;
   modifying the database to store a rule packet generated based on the rule; and
   configuring the database to transmit the rule packet when a VCN activation event is triggered.

13. A system for registering use of virtual certification numbers (VCNs) for a primary account number (PAN) at a secure entity, the system comprising:
   an external gateway;
   a registration endpoint;
   a database;
   a certification mechanism tools module;
   one or more memories configured to store processor-readable instructions; and
   one or more processors operatively connected to the one or more memories, the external gateway, the registration endpoint, the database, and the certification mechanism tools module, and configured to execute the instructions to perform operations that include:
      receiving, at the external gateway, a registration request comprising an external request code and the PAN, wherein the external request code is generated at and provided by an external entity and is unique to the secure entity, the registration request being a request to register use of VCNs for the PAN at the secure entity;
      receiving, by the registration endpoint, a tokenized PAN based on the PAN;
      identifying, at the certification mechanism tools module, a secure entity account identifier by:
         applying the tokenized PAN to a certification mechanism tool application programing interface (API);
         converting the tokenized PAN into a secure entity readable format without extracting the PAN from the tokenized PAN;
         comparing the tokenized PAN converted into the secure entity readable format to a plurality of known secure entity account identifiers; and
         identifying the secure entity account identifier that matches the tokenized PAN converted into the secure entity readable format based on the comparing;
      generating, at the certification mechanism tools module, a certification mechanism reference identifier by encrypting a certification mechanism identifier associated with the identified secure entity account identifier and the tokenized PAN;
      associating the certification mechanism reference identifier with the external request code by updating the database;
      generating a registration authentication for the external request code in response to receiving the registration request and to associating the certification mechanism reference identifier with the external request code;
      receiving a first VCN request to generate a first VCN corresponding to only a first source portal, the VCN request comprising a first external request code and a first source portal identifier associated with the first source portal;
      in response to receiving the first VCN request, determining that the first external request code matches the external request code having the registration authentication;
      in response to determining that the first external request code matches the external request code, generating the first VCN based on the first source portal identifier;
      receiving a second VCN request to generate a second VCN corresponding to only a second source portal, the second VCN request comprising a second external request code and a second source portal identifier associated with the second source portal;
      in response to receiving the second VCN request, determining that the second external request code is unregistered for VCN use; and
      in response to determining that the second external request code is unregistered for VCN use, rejecting the second VCN request.

14. The method of claim 1, wherein determining that the second external request code is unregistered for VCN use comprises determining that the second external request code does not match the external request code having the registration authentication.

* * * * *